US007435063B2

(12) United States Patent
Tadano et al.

(10) Patent No.: US 7,435,063 B2
(45) Date of Patent: Oct. 14, 2008

(54) COMPRESSOR, METHOD FOR MANUFACTURING THE COMPRESSOR, DEFROSTER OF REFRIGERANT CIRCUIT, AND REFRIGERATION UNIT

(75) Inventors: Masaya Tadano, Nitta-gun (JP); Haruhisa Yamasaki, Ora-gun (JP); Kenzo Matsumoto, Ora-gun (JP); Dai Matsuura, Ota (JP); Kazuya Sato, Ora-gun (JP); Takayasu Saito, Ora-gun (JP); Toshiyuki Ebara, Ota (JP); Satoshi Imai, Ota (JP); Atsushi Oda, Osaka (JP); Takashi Sato, Kumagaya (JP); Hiroyuki Matsumori, Ora-gun (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 803 days.

(21) Appl. No.: 10/790,085

(22) Filed: Mar. 2, 2004

(65) Prior Publication Data

US 2004/0165998 A1 Aug. 26, 2004

Related U.S. Application Data

(62) Division of application No. 10/225,442, filed on Aug. 22, 2002, now Pat. No. 7,128,540.

(30) Foreign Application Priority Data

| | | |
|---|---|---|
| Sep. 27, 2001 | (JP) | 2001-295634 |
| Sep. 27, 2001 | (JP) | 2001-295654 |
| Sep. 27, 2001 | (JP) | 2001-295663 |
| Sep. 27, 2001 | (JP) | 2001-295673 |
| Sep. 27, 2001 | (JP) | 2001-295678 |
| Sep. 27, 2001 | (JP) | 2001-295859 |
| Sep. 27, 2001 | (JP) | 2001-295866 |
| Sep. 27, 2001 | (JP) | 2001-296165 |
| Sep. 27, 2001 | (JP) | 2001-296180 |
| Oct. 9, 2001 | (JP) | 2001-311699 |
| Oct. 9, 2001 | (JP) | 2001-311702 |
| Oct. 12, 2001 | (JP) | 2001-315687 |
| Oct. 17, 2001 | (JP) | 2001-319401 |
| Oct. 17, 2001 | (JP) | 2001-319419 |
| Oct. 22, 2001 | (JP) | 2001-323757 |
| Oct. 22, 2001 | (JP) | 2001-323769 |
| Oct. 25, 2001 | (JP) | 2001-327809 |
| Oct. 25, 2001 | (JP) | 2001-327817 |
| Oct. 30, 2001 | (JP) | 2001-332796 |
| Nov. 30, 2001 | (JP) | 2001-366208 |

(51) Int. Cl.
*F04B 39/00* (2006.01)
*F16L 33/18* (2006.01)

(52) U.S. Cl. ........................ 417/572; 417/902; 285/353

(58) Field of Classification Search ................. 417/572, 417/902; 285/353
See application file for complete search history.

(56) References Cited

U.S. PATENT DOCUMENTS

| | | | | |
|---|---|---|---|---|
| 2,094,323 | A * | 9/1937 | Kenney et al. | 417/410.3 |
| 2,628,016 | A * | 2/1953 | Higham | 417/363 |
| 4,240,774 | A * | 12/1980 | Ladusaw | 418/248 |
| 4,991,765 | A * | 2/1991 | Sugiyama | 228/164 |
| 5,007,807 | A * | 4/1991 | Gannaway | 417/363 |
| 5,261,800 | A * | 11/1993 | Sakae | 418/63 |

FOREIGN PATENT DOCUMENTS

| | | |
|---|---|---|
| JP | 61-106992 | 5/1986 |
| JP | 2-294586 | 12/1990 |
| JP | 5-256285 | 10/1993 |
| JP | 8-93671 | 4/1996 |
| JP | 8-247065 | 9/1996 |
| JP | 2000-104690 | 4/2000 |
| WO | WO 01/73293 | 10/2001 |

OTHER PUBLICATIONS

European Patent Office Communication dated Dec. 23, 2002.
European Patent Office Communication dated Mar. 28, 2003.

* cited by examiner

*Primary Examiner*—Charles G Freay
(74) *Attorney, Agent, or Firm*—Kratz, Quintos & Hanson, LLP

(57) ABSTRACT

There is provided a rotary compressor capable of preventing deterioration of performance following plug fixing carried out to prevent falling-off of a spring member. The rotary compressor comprises a cylinder constituting a rotary compression element, a roller engaged with an eccentric portion formed in a rotary shaft of an electric element, and eccentrically rotated in the cylinder, a vane abutted on the roller to divide an inside of the cylinder into a low pressure chamber side and a high pressure chamber side, a spring member for always pressing the vane to the roller side, a housing portion of the spring member, formed in the cylinder, and opened to the vane side and a hermetically sealed container side, a plug positioned in the hermetically sealed container side of the spring member, and inserted into the housing portion to fit into a gap, and an O ring attached around the plug to seal a part between the plug and the housing portion. In this case, a space between the cylinder and the hermetically sealed container is set smaller than a distance from the O ring to an end of the plug on the hermetically sealed container side.

6 Claims, 32 Drawing Sheets

COMPRESSOR, METHOD FOR MANUFACTURING THE COMPRESSOR, DEFROSTER OF REFRIGERANT CIRCUIT, AND REFRIGERATION UNIT

This application is a Divisional of prior application Ser. No. 10/225,442 filed on Aug. 22, 2002 now U.S. Pat. No. 7,128,540.

BACKGROUND OF THE INVENTION

The present invention relates to a compressor including an electric element, and a compression element driven by the electric element in a container, its manufacturing method, a defroster of a refrigerant circuit, and a refrigeration unit.

In a rotary compressor of such a conventional type, especially in a rotary compressor of an internal intermediate pressure multistage compression type, refrigerant gas is supplied through a refrigerant introduction tube and a suction passage, and sucked from a suction port of a first rotary compression element into a low pressure chamber side of a cylinder (first cylinder). The refrigerant gas is then compressed by operations of a roller and a vane engaged with an eccentric part of a rotary shaft to become intermediate pressure, and discharged from a high pressure chamber side of the cylinder through a discharge port and a discharge muffler chamber into a hermetically sealed container. Then, the refrigerant gas of the intermediate presser in the hermetically sealed container is sucked from a suction port of a second rotary compression element into a low pressure chamber side of a cylinder (second cylinder). The refrigerant gas is then subjected to second stage compression by operations of a roller and a vane engaged with an eccentric part of a rotary shaft to become one of a high temperature and high pressure. Then, it is supplied from the high pressure chamber through the discharge port, the discharge passage and the discharge muffler chamber, and discharged from a refrigerant discharge tube to the refrigerant circuit. The refrigerant gas then flows into a radiator constituting the refrigerant circuit with the rotary compressor. After heat radiation, it is squeezed by an expansion valve, heat-absorbed by an evaporator, and sucked into the first rotary compression element. This cycle is repeated.

The eccentric parts of the rotary shafts are provided to have a phase difference of 180°, and connected to each other by a connecting portion.

If a refrigerant having a large high and low pressure difference, for example carbon dioxide ($CO_2$) as an example of carbon dioxide gas, is used for the rotary compressor, discharge refrigerant pressure reaches 12 MPaG at the second rotary compression element, in which pressure becomes high. On the other hand, it reaches 8 MPaG (intermediate pressure) at the first rotary compression element of a low stage side. This becomes pressure in the hermetically sealed container. Suction pressure of the first rotary compression element is about 4 MPaG.

The vane attached to such a rotary compressor is inserted in a groove provided in a radial direction of the cylinder so as to be freely moved in the radial direction of the cylinder. A spring hole (housing portion) opened to the outside of the cylinder is provided in a rear side of the vane (hermetically sealed container side), a coil spring (spring member) for always pressing the vane is inserted into the spring hole, an O ring is inserted into the spring hole from the opening outside the cylinder, and then sealed by a plug (pulling-out stopper) to prevent jumping-out of the spring.

In this case, eccentric rotation of the roller applies a force of extruding the plug from the spring hole to the outside.

Especially, in the rotary compressor of the internal intermediate pressure type, since pressure in the hermetically sealed container becomes lower than that in the cylinder of the second rotary compression element, the plug is also extruded by a pressure difference between inside and outside of the cylinder. Thus, in the conventional case, the plug was pressed into the spring hole to be fixed to the cylinder. However, such pressure insertion deformed the cylinder to expand, forming a gap between it and a support member (bearing) for sealing the opening surface of the cylinder. Consequently, it was impossible to secure sealing in the cylinder, reducing performance.

In the rotary compressor of the internal intermediate pressure multistage compression type, since pressure (high pressure) in the cylinder of the second rotary compression element was higher than pressure (intermediate pressure) in the hermetically sealed container as an oil reservoir on a bottom part, it was extremely difficult to supply oil from an oil hole of the rotary shaft into the cylinder by using a pressure difference. Consequently, lubrication was carried out only by oil blended in the sucked refrigerant, causing a shortage of oil supply.

In the rotary compressor of the internal intermediate multistage compression type, the opening surface of the cylinder constituting the second rotary compression element is sealed by the support member, and the discharge muffler chamber is installed in this support member. FIG. 20 shows in section a support member 291 according to a conventional art. A bearing 291A of a rotary shaft is erected on a center of the support member 291, and a bush 292 is attached in the bearing 291A. A discharge muffler chamber 293 is concaved in the support member 291 outside the bearing 291A, and the discharge muffler chamber 293 is sealed by a cover 294. The cover 294 has a peripheral part fixed on the support member 291 by a plurality of bolts.

Here, because of higher pressure in the discharge muffler chamber 293 of the second rotary compression element than intermediate pressure in the hermetically sealed container, sealing by the cover 294 is an important problem. A gasket 296 is accordingly held between the cover 294 and the support member 291, but sealing is deteriorated because the center bearing 291A side is away from the bolt. Thus, in the conventional case, a sealing surface 291B having a step was formed on a base of the bearing 291A, the gasket 296 was also held for sealing at this sealing surface 291B, a C ring 297 was attached to the bearing 291A, and an edge of the bearing 291A side of the cover 294 was pressed to the support member 291 side.

However, in the above-described conventional structure, the formation of the sealing surface reduced a capacity of the discharge muffler chamber, and necessitated the attaching of the C ring. Consequently, both processing and component costs were increased.

With regard to strength of the cover, if thin, the cover was deformed outside by the pressure difference between the discharge muffler chamber and the hermetically sealed chamber, causing gas leakage. Conversely, if too thick, it was impossible to secure an insulation distance from the electric element, causing an increase in a height dimension of the entire compressor.

The discharge pressure of the second rotary compression element becomes extremely high as described above. In the conventional case, however, each cylinder was fastened to the support member having the bearing by bolts arranged concentric circularly around the bearing. Consequently, there was a possibility of gas leakage from the cylinder.

When the high and low pressure difference is high as described above, if the connecting portion of the rotary shaft has a circular sectional shape coaxial to the rotary shaft, a sectional area to be physically secured is small, and the rotary shaft is easily deformed elastically. Thus, in the conventional case, in order to increase strength, a section of the connecting portion was formed in a rugby ball shape, in which a thickness in a direction orthogonal to the eccentric direction was larger than that in the eccentric direction of both eccentric portions. However, the number of processing steps was increased in a cutting process of the rotary shaft, deteriorating productivity.

In the compressor of the hermetically sealed type, the hermetically sealed container must be subjected to airtightness testing in a completion test of a manufacturing process. Pressure for this test is set to about 4 MPa in a normal compressor. However, if $CO_2$ is used as a refrigerant as described before, since pressure (intermediate pressure in the above-described case) of the hermetically sealed container becomes extremely high, test pressure of about 10 MPa as a design upper limit of intermediate pressure is required. Consequently, it was difficult to easily connect a compressed air generator for applying the test pressure into the hermetically sealed container to the compressor.

To carry out gas-liquid separation of the refrigerant gas sucked into the first rotary compression element, an accumulator is attached to the hermetically sealed container. This accumulator is attached to a bracket welded to a side face of the hermetically sealed container by welding or a band, and held along the outside of the hermetically sealed container. However, if there is a need to increase a capacity of the accumulator or the like, the accumulator and a pile such as a refrigerant introduction tube may interfere with each other.

Therefore, conventionally, a shape of the bracket itself was changed to be separated from the pipe, or the holding position of the accumulator was changed to separate the accumulator itself from the pipe. In the former case, since the bracket was hooked on a hanger of a production device during painting of the hermetically sealed container, the hanger for painting had to be changed. In the latter case, since the accumulator was held away from its center (or position of center of gravity), vibration of the accumulator itself was increased, resulting in larger noise.

When the refrigerant gas of intermediate pressure discharged into the hermetically sealed container is sucked through another refrigerant introduction tube located outside the hermetically sealed container into the second rotary compression element, the refrigerant introduction tubes of the first and second rotary compression elements are connected to the hermetically sealed container in positions adjacent to each other.

Thus, wiring becomes difficult because of mutual interference between both refrigerant introduction tubes. Especially, since the accumulator was normally connected to the refrigerant introduction tube to the first rotary compression element, and this accumulator was arranged above the connecting position of each refrigerant introduction tube, interference easily occurred between both refrigerant introduction tubes, and it was difficult to lower the position of the accumulator.

In such a rotary compressor, a terminal for feeding power to the electric element is attached to an end cap of the hermetically sealed container. FIG. 23 shows in section a terminal 299 of the conventional rotary compressor. The terminal 299 was fixed by welding to an upper surface of an end cap 298 exhibiting an asymmetrical sectional shape at a center as shown.

In the end cap 298, by receiving an effect of high internal pressure, its welded part with the terminal 299 is deformed in a direction of being swelled outside. In an upper part of FIG. 23, a result of actually measuring a deformation amount of the end cap 298 is shown by region by region. In the drawing, a deformation amount of a region indicated by Z4 is 0.2 μm. a deformation amount of a region indicated by Z5 is larger, i.e., 0.5 μm, and a deformation amount of a region indicated by Z6 is increased further more to a maximum 0.9 μm.

Thus, because of the largest deformation amount of the terminal 299, cracks or welding peeling-off occurred in the welded part between the terminal 299 and the end cap 298, consequently causing a reduction in pressure resistance performance.

FIG. 25 shows in section a terminal 300 of another rotary compressor. The terminal 300 includes a circular glass portion 302 provided with an electric terminal 307, and a metal attaching portion 303 formed around it. This attaching portion 303 was welded to a peripheral edge of an attaching hole 306 formed in a hermetically sealed container 304.

In this case, when the attaching portion 303 of the terminal 300 was too thin, strength (pressure resistance performance) against high pressure of refrigerant gas in the hermetically sealed container became insufficient, causing a failure such as cracks in the attaching portion 303. On the other hand, when too thick, a great amount of heat was necessary for welding the hermetically sealed container 304, causing damage to the glass portion 302 by the heat. Consequently, there was a danger of gas leakage or destruction.

An opening surface of a cylinder of such a rotary compressor is sealed by a support member constituting a discharge muffler chamber inside and, on a center of the support member, a bearing of a rotary shaft of an electric element is provided. Then, by providing a carbon bush capable of maintaining good sliding performance even in insufficient oil supply, and having high wear resistance performance even with respect to a high PV value (load applied per unit area) during a high load between the bearing and the rotary shaft, durability of the rotary compressor can be greatly improved. However, such a carbon bush was disadvantageous because a price was high, increasing competent costs.

The above-described refrigerant introduction and discharge tubes are connected to a cylindrical sleeve welded to a bent surface of the hermetically sealed container. Conventionally, however, a fixture was used to obtain perpendicularity of the sleeve with respect to an inner diameter of the hermetically sealed container. Consequently, assembling workability was deteriorated, lowering accuracy of perpendicularity.

For the rotary compression element to become high in pressure, a thin cylinder is used. Thus, since a suction passage or a discharge passage cannot be formed within the thickness range of the cylinder, a suction passage and a discharge passage are formed on the support member side sealing the opening surface of the cylinder and having a bearing and, in the cylinder, the suction and discharge ports for communicating the suction passage and the discharge passage with the inside of the cylinder are obliquely formed.

FIGS. 31 and 32 show a conventional processing method of such suction and discharge ports. In each drawing, a reference numeral 311 denotes a cylinder constituting a rotary compression element, 312 a suction port obliquely formed in the cylinder 311, and 313 a discharge port. In the case of forming the suction port 312, an end mill ML1 having a flat tip is set obliquely to the cylinder 311, i.e., in a direction perpendicular to a slope of the suction port 312, and moved in an inclining direction of the suction port 312 as indicated by an arrow in FIG. 31, thereby forming a groove inclined with respect to the cylinder 311.

On the other hand, in the case of forming the discharge port 313, the end mill ML1 is set obliquely to the cylinder 311, in this case, in an inclining direction of the discharge port 313, and extruded in the inclining direction of the discharge port 313 as indicated by an arrow in FIG. 32, thereby forming a notch inclined with respect to the cylinder 311.

Since the suction port 312 and the discharge port 313 were formed in the cylinder 311 in the conventional case as described above, an edge (right upper edge in FIG. 31) of a suction passage side of the suction port 312 was made linear, and an air flow of sucked gas on the connecting portion with the suction passage was disturbed, increasing passage resistance. In addition, since the end mill ML1 had to be set obliquely to the cylinder 311, processing was necessary separately from drilling similar to that for other screw holes or lightening holes, consequently increasing the number of processing steps, and production costs.

In the refrigerant circuit using the two-stage compression rotary compressor of the internal intermediate pressure type, a frost deposit is grown in the evaporator, and thus defrosting must be carried out. However, if a high-temperature refrigerant discharged from the second rotary compression element for defrosting in the evaporator is supplied to the evaporator without being pressure-reduced by a pressure reducing device (including a case of direct supplying to the evaporator, and a case of supplying with only passage through the pressure reducing device but without being pressure-reduced), suction pressure of the first rotary compression element is increased, thereby increasing discharge pressure (intermediate pressure) of the first rotary compression element.

This refrigerant is discharged through the second rotary compression element. However, because of no pressure reductions, discharge pressure of the second rotary compression element is set equal to the suction pressure of the first rotary compression element. Consequently, a reversal phenomenon occurred in pressure between the discharge (high pressure) and the suction (intermediate pressure) of the second rotary compression element in the conventional case.

Furthermore, in the rotary compressor of the internal intermediate multistage compression type, on the bottom portion, pressure (high pressure) in the cylinder of the second rotary compression element is set higher than pressure (intermediate pressure) in the hermetically sealed container as the oil reservoir. Consequently, it was extremely difficult to supply oil from the oil hole of the rotary shaft into the cylinder by using the pressure difference, and lubrication was carried out only by the oil blended in the sucked refrigerant, causing a shortage of oil supply.

SUMMARY OF THE INVENTION

The present invention was made to solve the foregoing problems inherent in the conventional art, and it is an object of the invention to provide a rotary compressor capable of preventing deterioration of performance following plug fixing carried out to prevent falling off of a spring member.

That is, a rotary compressor of the present invention comprises an electric element, and a rotary compression element driven by the electric element, both components being provided in a hermetically sealed container, a cylinder constituting the rotary compression element, and a roller engaged with an eccentric portion formed in a rotary shaft of the electric element, and eccentrically rotated in the cylinder, a vane abutted on the roller to divide an inside of the cylinder into a low pressure chamber side and a high pressure chamber side, a spring member for always pressing the vane to the roller side, a housing portion of the spring member, formed in the cylinder, and opened to the vane side and the hermetically sealed container side, a plug positioned in the hermetically sealed container side of the spring member, and inserted into the housing portion to fit into a gap, and an O ring attached around the plug to seal a part between the plug and the housing portion. In this case, a space between the cylinder and the hermetically sealed container is set smaller than a distance from the O ring to an end of the plug on the hermetically sealed container side.

A rotary compressor of the present invention comprises an electric element, first and second rotary compression elements driven by the electric element, these components being provided in a hermetically sealed container, gas compressed by the first rotary compression element being discharged into the hermetically sealed container, and the discharged gas of intermediate pressure being further compressed by the second rotary compression element, a cylinder constituting the second rotary compression element, a roller engaged with an eccentric portion formed in a rotary shaft of the electric element, and eccentrically rotated in the cylinder, a vane abutted on the roller to divide an inside of the cylinder into a low pressure chamber side and a high pressure chamber side, a spring member for always pressing the vane to the roller side, a housing portion of the spring member, formed in the cylinder, and opened to the vane side and the hermetically sealed container side, a plug positioned in the hermetically sealed container side of the spring member, and inserted into the housing portion to fit into a gap, and an O ring attached around the plug to seal a part between the plug and the housing portion. In this case, a space between the cylinder and the hermetically sealed container is set smaller than a distance from the O ring to an end of the plug on the hermetically sealed container side.

According to the present invention, the rotary compressor comprises the electric element, the rotary compression element driven by the electric element, both components being provided in the hermetically sealed container, the cylinder constituting the rotary compression element, the roller engaged with the eccentric portion formed in the rotary shaft of the electric element, and eccentrically rotated in the cylinder, the vane abutted on the roller to divide the inside of the cylinder into the low pressure chamber side and the high pressure chamber side, the spring member for always pressing the vane to the roller side, the housing portion of the spring member, formed in the cylinder, and opened to the vane side and the hermetically sealed container side, the plug positioned in the hermetically sealed container side of the spring member, and inserted into the housing portion to fit into a gap, and the O ring attached around the plug to seal a part between the plug and the housing portion. Thus, it is possible to prevent inconvenience of performance deterioration caused by a reduction made in sealing by cylinder deformation, which occurs in the case of pressing in, and fixing the plug in the housing portion.

Even if the plug is inserted to fit into the gap, since the space between the cylinder and the hermetically sealed container is set smaller than the distance from the 0 ring to the end of the plug on the hermetically sealed container side, at a point of time when the plug is moved in a direction of being extruded from the housing portion, and abutted on the hermetically sealed container to be prevented from being moved, the O ring is still positioned in the housing portion for sealing. Thus, no problems occur in a plug function.

Especially, the invention is remarkably advantageous in a rotary compressor of a multistage compression type having an inside of a hermetically sealed container set to intermediate pressure in that compressor performance is maintained and a spring member is prevented from being pulled out when $CO_2$ gas is used as a refrigerant, intermediate pressure is set in the hermetically sealed container, and pressure in a second rotary compression element becomes extremely high.

A rotary compressor of the present invention comprises an electric element, a rotary compression element driven by the electric element, both components being provided in a hermetically sealed container, a cylinder constituting the rotary compression element, a roller engaged with an eccentric portion formed in a rotary shaft of the electric element, and eccentrically rotated in the cylinder, a support member adapted to seal an opening surface of the cylinder, and provided with a bearing of the rotary shaft, a vane abutted on the roller to divide an inside of the cylinder into a low pressure chamber side and a high pressure chamber side, a spring member for always pressing the vane to the roller side, a housing portion of the spring member, formed in the cylinder, and opened to the vane side and the hermetically sealed container side, and a plug positioned in the hermetically sealed container side of the spring member, and pressed into and fixed in the housing portion. In this case, the support member of a part corresponding to the plug includes a roll off concaved in a direction away from the cylinder.

A rotary compressor of the present invention comprises an electric element, first and second rotary compression elements driven by the electric element, these components being provided in a hermetically sealed container, gas compressed by the first compression element being discharged into the hermetically sealed container, and the discharged gas of intermediate pressure being further compressed by the second rotary compression element, a cylinder constituting the second rotary compression element, a roller engaged with an eccentric portion formed in a rotary shaft of the electric element, and eccentrically rotated in the cylinder, a vane abutted on the roller to divide an inside of the cylinder into a low pressure chamber side and a high pressure chamber side, a support member adapted to seal an opening surface of the cylinder, and provided with a bearing of the rotary shaft, a spring member for always pressing the vane to the roller side, a housing portion of the spring member, formed in the cylinder, and opened to the vane side and the hermetically sealed container side, and a plug positioned in the hermetically sealed container side of the spring member, and pressed into and fixed in the housing portion. In this case, the support member of a part corresponding to the plug includes a roll off concaved in a direction away from the cylinder.

According to the present invention, the rotary compressor comprises the electric element, the rotary compression element driven by the electric element, both components being provided in a hermetically sealed container, the cylinder constituting the rotary compression element, the roller engaged with the eccentric portion formed in the rotary shaft of the electric element, and eccentrically rotated in the cylinder, the support member adapted to seal the opening surface of the cylinder, and provided with the bearing of the rotary shaft, the vane abutted on the roller to divide the inside of the cylinder into the low pressure chamber side and the high pressure chamber side, the spring member for always pressing the vane to the roller side, the housing portion of the spring member, formed in the cylinder, and opened to the vane side and the hermetically sealed container side, and the plug positioned in the hermetically sealed container side of the spring member, and pressed into and fixed in the housing portion. The support member of a part corresponding to the plug includes the roll off concaved in a direction away from the cylinder. Thus, even if the pressing of the plug into the housing portion deforms the cylinder to swell to the support member side, the deformation of the cylinder is absorbed by the roll off, making it possible to prevent inconvenience of a gap formed between the cylinder and the support member. Therefore, it is possible to prevent inconvenience of performance deterioration caused by a reduction made in sealing by the cylinder deformation.

Especially, the invention is remarkably advantageous in a rotary compressor of a multistage compression type having an inside of a hermetically sealed container set to intermediate pressure in that compressor performance is maintained and a spring member is prevented from being pulled out when $CO_2$ gas is used as a refrigerant, intermediate pressure is set in the hermetically sealed container, and pressure in a second rotary compression element becomes extremely high.

An object of the present invention is to smoothly and surely supply oil into a cylinder of a second rotary compression element of a second stage in a rotary compressor of an internal intermediate pressure multistage compression type.

That is, a rotary compressor comprises an electric element, first and second rotary compression elements driven by the electric element, these components being provided in a hermetically sealed container, gas compressed by the first rotary compression element being discharged into the hermetically sealed container, and the discharged gas of intermediate pressure being further compressed by the second rotary compression element, cylinders constituting the respective rotary compression elements, an intermediate diaphragm provided between the cylinders to partition each rotary compression element, a support member adapted to seal an opening surface of each cylinder, and provided with a bearing of a rotary shaft, and an oil hole formed in the rotary shaft. In this case, the intermediate diaphragm includes an oil supply path for communicating the oil hole with a suction side of the second rotary compression element.

According to the present invention, the rotary compressor comprises the electric element, the first and second rotary compression elements driven by the electric element, these components being provided in a hermetically sealed container, gas compressed by the first rotary compression element being discharged into the hermetically sealed container, and the discharged gas of intermediate pressure being further compressed by the second rotary compression element, the cylinders constituting the respective rotary compression elements, the intermediate diaphragm provided between the cylinders to partition each rotary compression element, the support member adapted to seal the opening surface of each cylinder, and provided with the bearing of the rotary shaft, and the oil hole formed in the rotary shaft. The intermediate diaphragm includes the oil supply path for communicating the oil hole with the suction side of the second rotary compression element. Thus, even in a state where pressure in the cylinder of the second rotary compression element is higher than intermediate pressure in the hermetically sealed container, by using a suction pressure loss in a suction process in the second rotary compression element, oil can be surely supplied from the oil supply path formed in the intermediate diaphragm into the cylinder.

Therefore, it is possible to secure performance and enhance reliability by assuring lubrication of the second rotary compression element.

In addition, according to the rotary compressor of the invention, the oil supply path is constructed by boring a through-hole in the intermediate diaphragm to communicate an outer peripheral surface with an inner peripheral surface of the rotary shaft side, and a communication hole for sealing an opening of the through-hole on the outer peripheral side, and communicating the through-hole with the suction side is bored on the cylinder for constituting the second rotary compression element.

According to the invention, in addition to the foregoing, the oil supply is constructed by boring the through-hole in the intermediate diaphragm to communicate the outer peripheral surface with the inner peripheral surface of the rotary shaft side, and the communication hole for sealing the opening of the through-hole on the outer peripheral surface side, and communicating the through-hole with the suction side is bored in the cylinder for constituting the second rotary compression element. Thus, it is possible to facilitate processing of the intermediate diaphragm to construct the oil supply path, and reduce production costs.

An object of the present invention is to carry out sure cover sealing for sealing a discharge muffler chamber of a second rotary compression element by simple constitution in a rotary compressor of an internal intermediate pressure multistage type.

That is, a rotary compressor of the present invention comprises an electric element, first and second rotary compression elements driven by the electric element, these components being provided in a hermetically sealed container, $CO_2$ refrigerant gas compressed by the first rotary compression element being discharged into the hermetically sealed container, and the discharged refrigerant gas of intermediate pressure being further compressed by the second rotary compression element, a cylinder constituting the second rotary compression element, a support member adapted to seal an opening surface of the cylinder, and provided with a bearing of a rotary shaft erected on a center part, a discharge muffler chamber formed in the support member outside the bearing, and communicated with an inside of the cylinder, a cover having a peripheral part fixed to the support member by a bolt to seal an opening of the discharge muffler chamber, a gasket held between the cover and the support member, and an O ring provided between an inner peripheral end surface of the cover and an outer peripheral surface of the bearing.

According to the present invention, the rotary compressor comprises the electric element, the first and second rotary compression elements driven by the electric element, these components being provided in the hermetically sealed container, $CO_2$ refrigerant gas compressed by the first rotary compression element being discharged into the hermetically sealed container, and the discharged refrigerant gas of intermediate pressure being further compressed by the second rotary compression element, the cylinder constituting the second rotary compression element, the support member adapted to seal the opening surface of the cylinder, and provided with the bearing of the rotary shaft erected on the center part, the discharge muffler chamber formed in the support member outside the bearing, and communicated with the inside of the cylinder, the cover having the peripheral part fixed to the support member by the bolt to seal the opening of the discharge muffler chamber, the gasket held between the cover and the support member, and the O ring provided between the inner peripheral end surface of the cover and the outer peripheral surface of the bearing. Thus, it is possible to prevent gas leakage between the cover and the support member by carrying out sufficient sealing with the inner peripheral end surface of the cover without forming any sealing surfaces on a base of the bearing.

Therefore, since a capacity of the discharge muffler chamber is increased, and the conventional necessity of fixing the cover to the bearing by the C ring is eliminated, it is possible to greatly reduce total processing and component costs.

An object of the present invention is to set a thickness dimension of a cover for sealing a discharge muffler chamber of a second rotary compression element to an optimal value in a rotary compressor of an internal intermediate pressure multistage compression type.

That is, a rotary compressor of the present invention comprises an electric element, first and second rotary compression elements driven by the electric element, these components being provided in a hermetically sealed container, $CO_2$ refrigerant gas compressed by the first rotary compression element being discharged into the hermetically sealed container, and the discharged refrigerant gas of intermediate pressure being further compressed by the second rotary compression element, a cylinder constituting the second rotary compression element, a support member adapted to seal an opening surface of the cylinder on the electric element side, and provided with a bearing of a rotary shaft erected on a center part, a discharge muffler chamber formed in the support member outside the bearing, and communicated with an inside of the cylinder, and a cover attached to the support member to seal an opening of the discharge muffler chamber. In this case, a thickness dimension of the cover is set to ≧2 mm to ≦10 mm.

In the rotary compressor of the invention, a thickness of the cover is set to 6 mm.

According to the present invention, the rotary compressor comprises the electric element, the first and second rotary compression elements driven by the electric element, these components being provided in the hermetically sealed container, $CO_2$ refrigerant gas compressed by the first rotary compression element being discharged into the hermetically sealed container, and the discharged refrigerant gas of intermediate pressure being further compressed by the second rotary compression element, the cylinder constituting the second rotary compression element, the support member adapted to seal the opening surface of the cylinder on the electric element side, and provided with the bearing of the rotary shaft erected on the center part, the discharge muffler chamber formed in the support member outside the bearing, and communicated with the inside of the cylinder, and the cover attached to the support member to seal the opening of the discharge muffler chamber. The thickness dimension of the cover is set to ≧2 mm to ≦10 mm, and the thickness of the cover is set to 6 mm. Thus, it is possible to miniaturize the compressor by securing an insulation distance from the electric element while securing strength of the cover itself, and preventing gas leakage caused by deformation.

In the rotary compressor of the invention, in each of the foregoing inventions, the cover has a peripheral part fixed to the support member by a bolt, a gasket is held between the cover and the support member, and an O ring is provided between an inner peripheral end surface of the cover and an outer surface of the bearing.

According to the invention, in addition to the foregoing, the cover has the peripheral part fixed to the support member by the bolt, the gasket is held between the cover and the support member, and the O ring is provided between the inner peripheral end surface of the cover and the outer surface of the bearing. Thus, it is possible to prevent gas leakage between the cover and the support member by carrying out sufficient sealing with the inner peripheral end surface of the cover without forming any sealing surfaces on the base of the bearing.

Therefore, since a capacity of the discharge muffler chamber is increased, and the conventional necessity of fixing the cover to the bearing by the C ring is eliminated, it is possible to greatly reduce total processing and component costs.

An object of the present invention is to effectively prevent gas leakage from a cylinder in a rotary compressor using $CO_2$ as a refrigerant.

That is, a rotary compressor of the present invention comprises an electric element, first and second rotary compression elements driven by the electric element, these components being provided in a hermetically sealed container, $CO_2$ refrigerant gas compressed by the first rotary compression element being discharged into the hermetically sealed container, and the discharged refrigerant gas of intermediate pressure being further compressed by the second rotary compression element, a cylinder constituting each rotary compression element, a support member adapted to seal an opening surface of each cylinder, and provided with a bearing of a rotary shaft erected on a center, a discharge muffler chamber formed in the support member outside the bearing, and communicated with an inside of the cylinder, a cover attached to the support member to seal an opening of the discharge muffler chamber. In this case, each cylinder, each support member and each cover are fastened by a plurality of main bolts, and each cylinder and each support member are fastened by auxiliary bolts located outside the main bolts.

According to the present invention, the rotary compressor comprises the electric element, the first and second rotary compression elements driven by the electric element, these components being provided in the hermetically sealed container, $CO_2$ refrigerant gas compressed by the first rotary compression element being discharged into the hermetically sealed container, and the discharged refrigerant gas of intermediate pressure being further compressed by the second rotary compression element, the cylinder constituting each rotary compression element, the support member adapted to seal the opening surface of each cylinder, and provided with the bearing of the rotary shaft erected on the center, the discharge muffler chamber formed in the support member outside the bearing, and communicated with the inside of the cylinder, the cover attached to the support member to seal the opening of the discharge muffler chamber. Each cylinder, each support member and each cover are fastened by the plurality of main bolts, and each cylinder and each support member are fastened by the auxiliary bolts located outside the main bolts. Thus, it is possible to improve sealing by preventing gas leakage between the cylinder of the second rotary compression element of high pressure, and the support member.

The rotary compressor of the invention further comprises a roller engaged with an eccentric portion formed in the rotary shaft of the electric element, and eccentrically rotated in the cylinder constituting the second rotary compression element, a vane abutted on the roller to divide an inside of the cylinder into a low pressure chamber side and a high pressure chamber side, and a guide groove formed in the cylinder to house the vane. The auxiliary bolts are positioned near the guide groove.

According to the invention, the rotary compressor further comprises the roller engaged with the eccentric portion formed in the rotary shaft of the electric element, and eccentrically rotated in the cylinder constituting the second rotary compression element, the vane abutted on the roller to divide the inside of the cylinder into the low pressure chamber side and the high pressure chamber side, and the guide groove formed in the cylinder to house the vane. The auxiliary bolts are positioned near the guide groove. Thus, it is also possible to effectively prevent gas leakage of back pressure applied to the vane by the auxiliary bolts.

An object of the present invention is to provide a rotary compressor capable of improving workability while increasing strength of a rotary shaft.

That is, a rotary compressor comprises an electric element, first and second rotary compression elements driven by the electric element, these components being provided in a hermetically sealed container, and gas compressed by the first rotary compression element being compressed by the second rotary compression element, first and second cylinders constituting the first and second rotary compression elements, and first and second rollers engaged with eccentric portions formed in a rotary shaft of the electric element to have a phase difference of 180°, and eccentrically rotated in the respective cylinders. In this case, a section of a connecting portion for connecting both eccentric portions with each other is formed in a shape having a thickness larger in a direction orthogonal to an eccentric direction than that in the eccentric direction of each of the eccentric portions, a side face of the connecting portion in the eccentric direction side of the first eccentric portion is formed in a circular-arc shape of the same center as that of the second eccentric portion, and a side face in the eccentric direction of the second eccentric portion is formed in a circular-arc shape of the same center as that of the first eccentric portion.

According to the present invention, the rotary compressor comprises the electric element, the rotary compression element driven by the electric element, these components being provided in the hermetically sealed container, and gas compressed by the first rotary compression element being compressed by the second rotary compression element, the first and second cylinders constituting the first and second rotary compression elements, and the first and second rollers engaged with the eccentric portions formed in the rotary shaft of the electric element to have a phase difference of 180°, and eccentrically rotated in the respective cylinders. The section of the connecting portion for connecting both eccentric portions with each other is formed in the shape having the thickness larger in the direction orthogonal to the eccentric direction than that in the eccentric direction of each of the eccentric portions. Thus, it is possible to increase rigidity strength of the rotary shaft, and effectively prevent its elastic deformation.

Especially, the side face of the connecting portion in the eccentric direction side of the first eccentric portion is formed in a circular-arc shape of the same center as that of the second eccentric portion, and the side face in the eccentric direction of the second eccentric portion is formed in a circular-arc shape of the same center as that of the first eccentric portion. Accordingly, it is possible to reduce the number of times of changing chucking positions during cutting of the rotary shafts having eccentric portions and connecting portions. Therefore, it is possible to reduce the number of processing steps, and costs by improved productivity.

An object of the present invention is to provide a hermetically sealed compressor capable of facilitating airtightness testing even when $CO_2$ is used as a refrigerant and pressure in a hermetically sealed container becomes high.

That is, a hermetically sealed compressor comprises an electric element, a compression element driven by the electric element, both components being provided in a hermetically sealed container, a $CO_2$ refrigerant sucked from a refrigerant introduction tube being compressed by the compression element, discharged into the hermetically sealed container, and then discharged outside from a refrigerant discharge tube, a sleeve provided in the hermetically sealed container, to which the refrigerant introduction tube and the refrigerant discharge tube are connected, and a flange formed around an outer surface of the sleeve to engage a coupler for pipe connection.

According to the present invention, the hermetically sealed compressor comprises the electric element, the compression element driven by the electric element, both components being provided in the hermetically sealed container, a $CO_2$ refrigerant sucked from the refrigerant introduction tube being compressed by the compression element, discharged into the hermetically sealed container, and then discharged outside from the refrigerant discharge tube, the sleeve provided in the hermetically sealed container, to which the refrigerant introduction tube and the refrigerant discharge tube are connected, and the flange formed around an outer surface of the sleeve to engage the coupler for pipe connection. Thus, by using the flange, it is possible to easily engaged and connect the coupler provided for piping from a compressed air generator to the sleeve of the hermetically sealed container.

Therefore, it is possible to finish airtightness testing in a manufacturing process of the hermetically sealed compressor having high internal pressure.

A hermetically sealed compressor of the present invention comprises an electric element, a compression element driven by the electric element, both components being provided in a hermetically sealed container, a $CO_2$ refrigerant sucked from a refrigerant introduction tube being compressed by the compression element, discharged into the hermetically sealed container, and then discharged outside from a refrigerant discharge tube, a sleeve provided in the hermetically sealed container, to which the refrigerant introduction tube and the refrigerant discharge tube are connected, and a screw groove formed for pipe connection around an outer surface of the sleeve.

According to the present invention, the hermetically sealed compressor comprises the electric element, the compression element driven by the electric element, both components being provided in the hermetically sealed container, a $CO_2$ refrigerant sucked from the refrigerant introduction tube being compressed by the compression element, discharged into the hermetically sealed container, and then discharged outside from the refrigerant discharge tube, the sleeve provided in the hermetically sealed container, to which the refrigerant introduction tube and the refrigerant discharge tube are connected, and the screw groove formed for pipe connection around the outer surface of the sleeve. Thus, by using this screw groove, a pipe from a compressed air generator can be easily connected to the sleeve of the hermetically sealed container.

Therefore, it is possible to finish airtightness testing in a manufacturing process of the hermetically sealed container having high internal pressure within a short time.

A hermetically sealed compressor of the present invention comprises an electric element, a compression element driven by the electric element, both components being provided in a hermetically sealed container, a $CO_2$ refrigerant sucked from a refrigerant introduction tube being compressed by the compression element, discharged into the hermetically sealed container, and then discharged outside from a refrigerant discharge tube, a plurality of sleeves provided in the hermetically sealed container, to which the refrigerant introduction tube and the refrigerant discharge tube are connected, a flange formed around an outer surface of one of adjacent sleeves to engage a coupler for pipe connection, and a screw groove formed for pipe connection around an outer surface of the other sleeve.

According to the present invention, the hermetically sealed compressor comprises the electric element, the compression element driven by the electric element, both components being provided in the hermetically sealed container, a $CO_2$ refrigerant sucked from the refrigerant introduction tube being compressed by the compression element, discharged into the hermetically sealed container, and then discharged outside from the refrigerant discharge tube, the plurality of sleeves provided in the hermetically sealed container, to which the refrigerant introduction tube and the refrigerant discharge tube are connected, the flange formed around the outer surface of one of adjacent sleeves to engage the coupler for pipe connection, and the screw groove formed for pipe connection around the outer surface of the other sleeve. Thus, by using the flange, the coupler provided in the pipe from the compressed air generator can be easily engaged and connected to one of the sleeves of the hermetically sealed container. By using the screw groove, the pipe from the compressed air generator can be easily connected to the other sleeve of the hermetically sealed container. Therefore, it is possible to finish airtightness testing in a manufacturing process of the hermetically sealed compressor of high internal pressure within a short time.

Especially, since the flange is formed in one of the adjacent sleeves, and the screw groove is formed in the other sleeve, no couplers having relatively large dimensions are connected adjacently to each other and, even in the case of a narrow space between the sleeves, it is possible to connect a plurality of pipes from the compressed air generator by using the narrow space.

An object of the present invention is to provide a compressor capable of easily dealing with a capacity change of an accumulator.

That is, a compressor comprises an electric element, a compression element driven by the electric element, both components being provided in a container, a container side bracket provided in a side face of the container, an accumulator, and an accumulator side bracket, to which the accumulator is attached. In this case, by fixing the accumulator side bracket to the container side bracket, the accumulator is attached to the container through both brackets.

According to the compressor of the invention, the accumulator side bracket is attached to a center or a position of a center of gravity of the accumulator, or in the vicinity thereof.

According to the present invention, the compressor comprises the electric element, the compression element driven by the electric element, both components being provided in the container, the container side bracket provided in the side face of the container, the accumulator, and the accumulator side bracket, to which the accumulator is attached. By fixing the accumulator side bracket to the container side bracket, the accumulator is attached to the container through both brackets. Thus, when a capacity of the accumulator is changed, interference with the pipe can be prevented only by changing the accumulator side bracket without changing the hermetically sealed container side bracket. Therefore, it is possible to prevent an effect to a compressor manufacturing device.

In addition, even when the capacitor of the accumulator is changed, only by changing the accumulator side bracket, the accumulator side bracket is attached to its center or a position of a center of gravity, or in the vicinity thereof, and the accumulator can be held on the center or the position of a center of gravity of the accumulator, or in the vicinity thereof. Thus, it is also possible to prevent an increase of noise by vibration.

An object of the present invention is to provide a compressor capable of increasing space efficiency without any mutual interferences between first and second refrigerant introduction tubes.

That is, a compressor of the present invention comprises an electric element, first and second compression elements driven by the electric element, these components being provided in a hermetically sealed container, a refrigerant introduction tube for introducing a refrigerant to the first compression element, a refrigerant tube for introducing refrigerant gas compressed by the first compression element to the second compression element, and a refrigerant tube for discharging high pressure gas compressed by the second compression element. In this case, the refrigerant tubes of the first and second compression elements are connected to the hermetically sealed container in adjacent positions, and laid around in opposing directions from the hermetically sealed container.

According to the compressor of the invention, the refrigerant tube of the first compression element is connected to the hermetically sealed container in a position below the refrigerant tube of the second compression element, an accumulator is arranged above a connecting position of each refrigerant tube to the hermetically sealed container, and the accumulator is connected to the refrigerant tube for introducing the refrigerant to the first compression element.

According to the present invention, the compressor comprises the electric element, first and second compression elements driven by the electric element, these components being provided in the hermetically sealed container, the refrigerant introduction tube for introducing a refrigerant to the first compression element, the refrigerant tube for introducing refrigerant gas compressed by the first compression element to the second compression element, and the refrigerant tube for discharging high pressure gas compressed by the second compression element. The refrigerant tubes of the first and second compression elements are connected to the hermetically sealed container in the adjacent positions, and laid around in opposing directions from the hermetically sealed container. Thus, it is possible to lay around the refrigerant tubes in limited spaces without any mutual interferences.

The refrigerant tube of the first compression element is connected to the hermetically sealed container in the position below the refrigerant tube of the second compression element, the accumulator is arranged above the connecting position of each refrigerant tube to the hermetically sealed container, and the accumulator is connected to the refrigerant tube for introducing the refrigerant to the first compression element. Especially in this case, the position of the accumulator is lowered to a lowest limit to approach the refrigerant tube of the second compression element while mutual interferences between the two refrigerant tubes are prevented. Thus, it is possible to greatly increase space efficiency.

A compressor of the present invention comprises an electric element, and first and second compression elements driven by the electric element, these components being provided in a hermetically sealed container, a first refrigerant introduction tube for sucking refrigerant gas, the refrigerant gas being compressed by the first compression element, and discharged into the hermetically sealed container, and a second refrigerant introduction tube located outside the hermetically sealed container for sucking the discharged refrigerant gas of intermediate pressure, the refrigerant gas being compressed by the second compression element. In this case, the first and second refrigerant introduction tubes are connected to the hermetically sealed container in adjacent positions, and laid around in opposing directions from the hermetically sealed container.

According to the compressor of the invention, the first refrigerant tube is connected to the hermetically sealed container in a position below the second refrigerant tube, an accumulator is arranged above a connecting position of each refrigerant introduction tube to the hermetically sealed container, and the accumulator is connected to the first refrigerant introduction.

According to the present invention, the compressor comprises the electric element, the first and second compression elements driven by the electric element, these components being provided in the hermetically sealed container, the first refrigerant introduction tube for sucking refrigerant gas, the refrigerant gas being compressed by the first compression element, and discharged into the hermetically sealed container, and the second refrigerant introduction tube located outside the hermetically sealed container for sucking the discharged refrigerant gas of intermediate pressure, the refrigerant gas being compressed by the second compression element. The first and second refrigerant introduction tubes are connected to the hermetically sealed container in adjacent positions, and laid around in opposing directions from the hermetically sealed container. Thus, it is possible to lay around the refrigerant introduction tubes in limited spaces without any mutual interferences.

In the compressor of the invention, the first refrigerant tube is connected to the hermetically sealed container in a position below the second refrigerant tube, the accumulator is arranged above a connecting position of each refrigerant introduction tube to the hermetically sealed container, and the accumulator is connected to the first refrigerant introduction. Especially in this case, a position of the accumulator can be lowered to a lowest limit to approach the second refrigerant introduction tube while mutual interferences between the two refrigerant introduction tubes are prevented. Thus, it is possible to greatly increase space efficiency.

An object of the present invention is to provide a hermetically sealed compressor capable of preventing inconvenience caused by end cap deformation.

That is, a hermetically sealed compressor of the present invention comprises an electric element, a compression element driven by the electric element, both components being provided in a hermetically sealed container, a refrigerant being compressed by the compression element, and discharged into the hermetically sealed container, a terminal attached to an end cap of the hermetically sealed container, and a step having a predetermined curvature formed by seat pushing in the end cap around the terminal.

According to the present invention, the hermetically sealed compressor comprises the electric element, the compression element driven by the electric element, both components being provided in a hermetically sealed container, a refrigerant being compressed by the compression element, and discharged into the hermetically sealed container, the terminal attached to the end cap of the hermetically sealed container, and the step having a predetermined curvature formed by seat pushing in the end cap around the terminal. Thus, rigidity of the end cap in the vicinity of the terminal is increased. Especially, in a situation where pressure in the hermetically sealed container becomes high as in the case of compressing $CO_2$ gas as a refrigerant, a deformation amount of the end cap by inner pressure of the hermetically sealed container is reduced, thereby improving pressure resistance.

According to the hermetically sealed compressor of the invention, the end cap is formed in a rough bowl shape, the step has a shape axially symmetrical around a center axis of the end cap, and the terminal is attached to a center of the end cap.

According to the present invention, in addition to the foregoing, the end cap is formed in a rough bowl shape, the step has a shape axially symmetrical around the center axis of the end cap, and the terminal is attached to the center of the end cap. Thus, deformation of the end cap in the terminal welded part by the inner pressure of the hermetically sealed container is made uniform, making it possible to prevent cracks or peeling-off of the welded part following nonuniform deformation. Therefore, it is possible to further increase pressure resistance.

An object of the present invention is to provide a hermetically sealed compressor capable of preventing inconvenience generated on a terminal portion for supplying power to an electric element.

That is, a hermetically sealed compressor comprises an electric element, a compression element driven by the electric element, both components being provided in a hermetically sealed container, a $CO_2$ refrigerant being compressed by the compression element, and discharged into the hermetically sealed container, and a terminal attached to the hermetically sealed container. In this case, the terminal includes a circular glass portion, which an electric terminal penetrates to be attached, and a flange-shaped metal attaching portion formed around the glass portion, and welded to an attaching hole peripheral edge part of the hermetically sealed container, and a thickness dimension of the attaching portion is set in a range of 2.4±0.5 mm.

A hermetically sealed compressor of the present invention comprises an electric element, and first and second rotary compression elements driven by the electric element, these components being provided in a hermetically sealed container, $CO_2$ refrigerant gas compressed by the first rotary compression element being discharged into the hermetically sealed container, and the discharged refrigerant gas of intermediate pressure being further compressed by the second rotary compression element, and a terminal connected to the hermetically sealed container. In this case, the terminal includes a circular glass portion, which an electric terminal penetrates to be attached, and a flange-shaped metal attaching portion formed around the glass portion, and welded to an attaching hole peripheral edge part of the hermetically sealed container, and a thickness dimension of the attaching portion is set in a range of 2.4±0.5 mm.

According to the present invention, the hermetically sealed compressor comprises the terminal attached to the hermetically sealed container. The terminal includes the circular glass portion, which the electric terminal penetrates to be attached, and the flange-shaped metal attaching portion formed around the glass portion, and welded to the attaching hole peripheral edge part of the hermetically sealed container, and the thickness dimension of the attaching portion is set in the range of 2.4±0.5 mm. Thus, in the hermetically sealed compressor using the $CO_2$ refrigerant having high pressure in the hermetically sealed container, it is possible to suppress an increase in the amount of heat necessary for welding while securing sufficient pressure resistance performance of the terminal.

Therefore, it is possible to prevent gas leakage or terminal destruction caused by cracks in the attaching portion of the terminal or damage in the glass portion.

An object of the present invention is to provide a rotary compressor capable of limiting a cost increase caused by a carbon bush provided between a bearing and a rotary shaft to a minimum.

That is, a rotary compressor of the present invention comprises an electric element, a rotary compression element driven by the electric element, both components being provided in a hermetically sealed container, a single or a plurality of cylinders constituting the rotary compression element, a first support member adapted to seal an opening surface of the cylinder on the electric element side, and provided with a bearing of a rotary shaft of the electric element, a second support member adapted to seal an opening surface of the cylinder on the electric element side, and provided with a bearing of the rotary shaft, and a carbon bush provided between one of the bearings of the first and second support members and the rotary shaft.

According to the rotary compressor of the invention, the bush is provided in the bearing of the first support member.

A rotary compressor of the present invention comprises an electric element, and first and second rotary compression elements driven by the electric element, both components being provided in a hermetically sealed container, gas compressed by the first rotary compression element being discharged into the hermetically sealed container, and the discharged gas of intermediate pressure being further compressed by the second rotary compression element, first and second cylinders respectively constituting the first and second rotary compression elements, a first support member adapted to seal an opening surface of the first cylinder, and provided with a bearing of a rotary shaft of the electric element, a second support member adapted to seal an opening surface of the second cylinder, and provided with a bearing of the rotary shaft, and a carbon bush provided between one of the bearings of the first and second support members and the rotary shaft.

According to the rotary compressor of the invention, the bush is provided in the bearing of the second support member.

According to the rotary compressor of any one of the foregoing inventions, the rotary compression element compresses $CO_2$ gas as a refrigerant.

According to the present invention, the rotary compressor comprises the electric element, the rotary compression element driven by the electric element, both components being provided in the hermetically sealed container, the single or the plurality of cylinders constituting the rotary compression element, the first support member adapted to seal the opening surface of the cylinder on the electric element side, and provided with the bearing of the rotary shaft of the electric element, the second support member adapted to seal the opening surface of the cylinder on the electric element side, and provided with the bearing of the rotary shaft, and the carbon bush provided between one of the bearings of the first and second support members and the rotary shaft. Thus, compared with a case of providing bushes in the bearings of both support members, it is possible to reduce component costs.

Especially, by providing a bush in the bearing of the first support member, but none in the bearing of the second support member, in which an area of contact with the rotary shaft on the cylinder electric element side, it is possible to reduce costs by maintaining sliding performance in the bearing of the first support member, in which a pressure receiving area is small, and a load applied per unit area becomes large, and removing the bush in the bearing of the second support member, in which a pressure receiving area is small, and a load applied per unit area becomes relatively small, while maintaining durability performance.

According to the present invention, the rotary compressor comprises the electric element, the first and second rotary compression elements driven by the electric element, both components being provided in the hermetically sealed container, gas compressed by the first rotary compression element being discharged into the hermetically sealed container, and the discharged gas of intermediate pressure being further compressed by the second rotary compression element, the first and second cylinders respectively constituting the first and second rotary compression elements, the first support member adapted to seal the opening surface of the first cylinder, and provided with the bearing of the rotary shaft of the electric element, the second support member adapted to seal the opening surface of the second cylinder, and provided with the bearing of the rotary shaft, and the carbon bush provided between one of the bearings of the first and second support members and the rotary shaft. Thus, compared with a case of proving bushes in the bearings of both support members, it is possible to reduce component costs.

Especially, by providing a bush in the bearing of the second support member, but none in the bearing of the first support member for sealing the opening surface of the first cylinder set equal to/lower than pressure in the hermetically sealed container, it is possible to reduce costs by sealing the opening surface of the second cylinder having pressure higher than that in the hermetically sealed container, maintaining sliding performance in the bearing of the second support member, in which oil supplying by a pressure difference becomes difficult, and removing the bush in the bearing of the first support member having no oil supply problems by the pressure difference, while maintaining durability performance.

Further, when $CO_2$ gas is used as a refrigerant, and pressure in the hermetically sealed container becomes extremely high, the invention is remarkably advantageous for maintaining durability performance of the compressor.

An object of the present invention is to provide a hermetically sealed compressor capable of easily maintaining perpendicularity of a sleeve welded to a hermetically sealed container.

That is, a hermetically sealed compressor comprises an electric element, a compression element driven by the electric element, both components being provided in a hermetically sealed container, a refrigerant sucked from a refrigerant introduction tube being compressed by the compression element, and discharged from a refrigerant discharge tube, and a sleeve attached corresponding to a hole formed on a bent surface of the hermetically sealed container, to which the refrigerant introduction and discharge tubes are connected. In this case, a flat surface is formed on an outer surface of the hermetically sealed container around the hole, the sleeve includes a insertion portion inserted into the hole, and an abutting portion positioned around the insertion portion and abutted on the flat surface of the hermetically sealed container, and the abutting portion of the sleeve and the flat surface of the hermetically sealed container are secured to each other by projection welding.

According to the present invention, the hermetically sealed compressor comprises the electric element, the compression element driven by the electric element, both components being provided in the hermetically sealed container, a refrigerant sucked from the refrigerant introduction tube being compressed by the compression element, and discharged from the refrigerant discharge tube, and the sleeve attached corresponding to the hole formed on the bent surface of the hermetically sealed container, to which the refrigerant introduction and discharge tubes are connected. The flat surface is formed on the outer surface of the hermetically sealed container around the hole, the sleeve includes the insertion portion inserted into the hole, and the abutting portion positioned around the insertion portion and abutted on the flat surface of the hermetically sealed container, and the abutting portion of the sleeve and the flat surface of the hermetically sealed container are secured to each other by projection welding. Thus, the abutment between the flat surface of the hermetically sealed container and the abutting portion of the sleeve enables perpendicularity of the sleeve to be secured with respect to the inner diameter of the hermetically sealed container. Therefore, it is possible to improve productivity and accuracy by securing the sleeve perpendicularity without using any fixtures.

According to the hermetically sealed compressor of the invention, the flat surface is concaved around the hole.

According to the present invention, in addition to the foregoing, the flat surface is concaved around the hole. Thus, it is possible to maintain the sleeve perpendicularity more accurately by the outer surface of the sleeve buried in the concave portion of the hermetically sealed container, and the concave portion.

Objects of the present invention are to provide a rotary compressor capable of reducing passage resistance of sucked gas, and facilitating processing of a suction port and a discharge port in a cylinder, and its manufacturing method.

That is, a rotary compressor of the present invention comprises an electric element, a rotary compression element driven by the electric element, both components being provided in a hermetically sealed container, a cylinder constituting the rotary compression element, a roller engaged with an eccentric portion formed in a rotary shaft of the electric element, and eccentrically rotated in the cylinder, a support member adapted to seal an opening surface of the cylinder, and provided with a bearing of the rotary shaft, a suction passage formed in the support member, and a suction port formed in the cylinder in an inclined manner to communicate the suction passage with an inside of the cylinder corresponding to the suction passage of the support member. In this case, an edge part of the suction port on the suction port side is formed in a semicircular arc shape.

According to the present invention, the rotary compressor comprises the electric element, the rotary compression element driven by the electric element, both components being provided in the hermetically sealed container, the cylinder constituting the rotary compression element, the roller engaged with an eccentric portion formed in a rotary shaft of the electric element, and eccentrically rotated in the cylinder, the support member adapted to seal the opening surface of the cylinder, and provided with the bearing of the rotary shaft, the suction passage formed in the support member, and the suction port formed in the cylinder in an inclined manner to communicate the suction passage with the inside of the cylinder corresponding to the suction passage of the support member. The edge part of the suction port on the suction port side is formed in the semicircular arc shape. Thus, it is possible to achieve efficient running by reducing passage resistance in the communicating portion between the suction port and the suction passage, and air flow disturbance.

The present invention provides a method for manufacturing a rotary compressor, the rotary compressor including an electric element, a rotary compression element driven by the electric element, both components being provided in a hermetically sealed container, a cylinder constituting the rotary compression element, a roller engaged with an eccentric portion formed in a rotary shaft of the electric element, and eccentrically rotated in the cylinder, a support member adapted to seal an opening surface of the cylinder, and provided with a bearing of the rotary shaft, a suction passage formed in the support member, and a suction port formed in the cylinder in an inclined manner to communicate the suction passage with an inside of the cylinder corresponding to the suction passage of the support member, the method comprising the step of: processing the suction port by placing an end mill having a flat tip perpendicularly to the cylinder, and moving the end mill in a direction of being inclined to the cylinder while the perpendicular state is maintained.

According to the present invention, since the suction port can be formed in the cylinder while the end mill of the flat tip is inclined in the state of being perpendicular to the cylinder, the suction port can be formed in the same process of drilling of other screw holes or lightening holes, reducing production costs by a reduction in the number of steps. Moreover, since the edge part of the suction port on the suction passage side is also formed in a semicircular arc shape by the end mill of the flat tip, passage resistance in the communicating portion between the suction port and the suction passage can be reduced as in the foregoing case, making it possible to achieve efficient running by reducing air flow disturbance.

The present invention provides a method for manufacturing a rotary compressor, the rotary compressor including an electric element, a rotary compression element driven by the electric element, both components being provided in a hermetically sealed container, a cylinder constituting the rotary compression element, a roller engaged with an eccentric portion formed in a rotary shaft of the electric element, and eccentrically rotated in the cylinder, a support member adapted to seal an opening surface of the cylinder, and provided with a bearing of the rotary shaft, a discharge passage formed in the support member, and a discharge port formed in the cylinder in an inclined manner to communicate the discharge passage with an inside of the cylinder corresponding to the discharge passage of the support member, the method comprising the step of: processing the discharge port by placing a part of an end mill having a chevron tip shape perpendicularly to the cylinder.

According to the present invention, since the inclined suction port can be formed in the cylinder by placing a part of the end mill having the chevron tip shape perpendicularly to the cylinder, the discharge port can be formed in the same process as drilling of other screw holes or lightening holes. Thus, it is possible to reduce production costs by reducing the number of steps.

An object of the present invention is to prevent pressure reversal between discharge and suction in a second compression element generated during defrosting of an evaporator in a refrigeration circuit using a two-stage compression compressor of an internal intermediate pressure type.

That is, the present invention provides a defroster of a refrigerant circuit, the refrigerant circuit including a compressor provided with an electric element, and first and second compression elements driven by the electric elements, these components being provided in a hermetically sealed container, refrigerant gas compressed by the first compression element being discharged into the hermetically sealed container, and the discharged refrigerant gas of intermediate pressure being compressed by the second compression element, a gas cooler, into which a refrigerant discharged from the second compression element of the compressor flows, a pressure reducing device connected to an outlet side of the gas cooler, and an evaporator connected to an outlet side of the pressure reducing device, a refrigerant discharged from the evaporator being compressed by the first compression element, the defroster comprising a defroster circuit for supplying a refrigerant discharged from the first compression element to the evaporator without reducing pressure, and a flow path controller for controlling refrigerant distribution of the defroster circuit.

According to the defroster of the refrigerant circuit of the invention, each of the compression elements compresses $CO_2$ gas as a refrigerant.

According to the defroster of the refrigerant circuit of the invention, hot water is generated by heat radiation from the gas cooler.

According to the present invention, the defroster of the refrigerant circuit is provided, the refrigerant circuit including the compressor provided with the electric element, the first and second compression elements driven by the electric elements, these components being provided in the hermetically sealed container, refrigerant gas compressed by the first compression element being discharged into the hermetically sealed container, and the discharged refrigerant gas of intermediate pressure being compressed by the second compression element, the gas cooler, into which a refrigerant discharged from the second compression element of the compressor flows, the pressure reducing device connected to the outlet side of the gas cooler, and the evaporator connected to the outlet side of the pressure reducing device, a refrigerant discharged from the evaporator being compressed by the first compression element, the defroster comprising the defroster circuit for supplying a refrigerant discharged from the first compression element to the evaporator without reducing pressure, and the flow path controller for controlling refrigerant distribution of the defroster circuit. Thus, to carry out defrosting of the evaporator, the refrigerant discharged from the first compression element is caused to flow to the defroster circuit by the flow path controller, and can be supplied to the evaporator to heat the same without reducing pressure.

Therefore, it is possible to prevent inconvenience of pressure reversal between the discharge and the suction in the second compression element, which occurs when only a high pressure refrigerant discharged from the second compression element is supplied to the evaporator without any pressure reductions to carry out defrosting.

Especially, the invention is remarkably advantageous in the refrigerant circuit using $CO_2$ gas as a refrigerant. In the case of one generating hot water from the gas cooler, heat of the hot water can be carried to the evaporator by the refrigerant, enabling the defrosting of the evaporator to be carried out more quickly.

An object of the present invention is to smoothly and surely supply oil into a cylinder of a second compression element set to high pressure in a rotary compressor of an internal intermediate pressure multistage compression type.

That is, a rotary compressor of the present invention comprises an electric element, first and second rotary compression elements driven by the electric element, these components being provided in a hermetically sealed container, gas compressed by the first rotary compression element being discharged into the hermetically sealed container, and the discharged gas of intermediate pressure being further compressed by the second rotary compression element, first and second cylinders respectively constituting the first and second rotary compression elements, an intermediate diaphragm provided between the cylinders to partition each rotary compression element, a support member adapted to seal an opening surface of each cylinder, and provided with a bearing of a rotary shaft, and an oil hole formed in the rotary shaft. In this case, the intermediate diaphragm includes an oil supply groove for communicating the oil hole with a low pressure chamber in the second cylinder on a surface on the second cylinder side.

According to the present invention, the rotary compressor comprises the electric element, the first and second rotary compression elements driven by the electric element, these components being provided in the hermetically sealed container, gas compressed by the first rotary compression element being discharged into the hermetically sealed container, and the discharged gas of intermediate pressure being further compressed by the second rotary compression element, the first and second cylinders respectively constituting the first and second rotary compression elements, the intermediate diaphragm provided between the cylinders to partition each rotary compression element, the support member adapted to seal an opening surface of each cylinder, and provided with a bearing of a rotary shaft, and the oil hole formed in the rotary shaft. The intermediate diaphragm includes the oil supply groove for communicating the oil hole with the low pressure chamber in the second cylinder on the surface on the second cylinder side. Thus, even in a situation where pressure in the cylinder of the second rotary compression element becomes higher than that intermediate pressure in the hermetically sealed container, by using a suction pressure loss in the suction process in the second compression element, it is possible to surely supply oil from the oil supply groove formed in the intermediate diaphragm into the cylinder.

Therefore, it is possible to secure performance and enhance reliability by carrying out sure lubrication of the second rotary compression element. Especially, since the oil supply groove can be formed only by processing a groove on the surface of the second cylinder of the intermediate diaphragm, it is possible to simplify a structure, and suppress an increase in production costs.

DETAILED DESCRIPTION OF THE PREFERRED EMBODIMENTS

Figure 1:
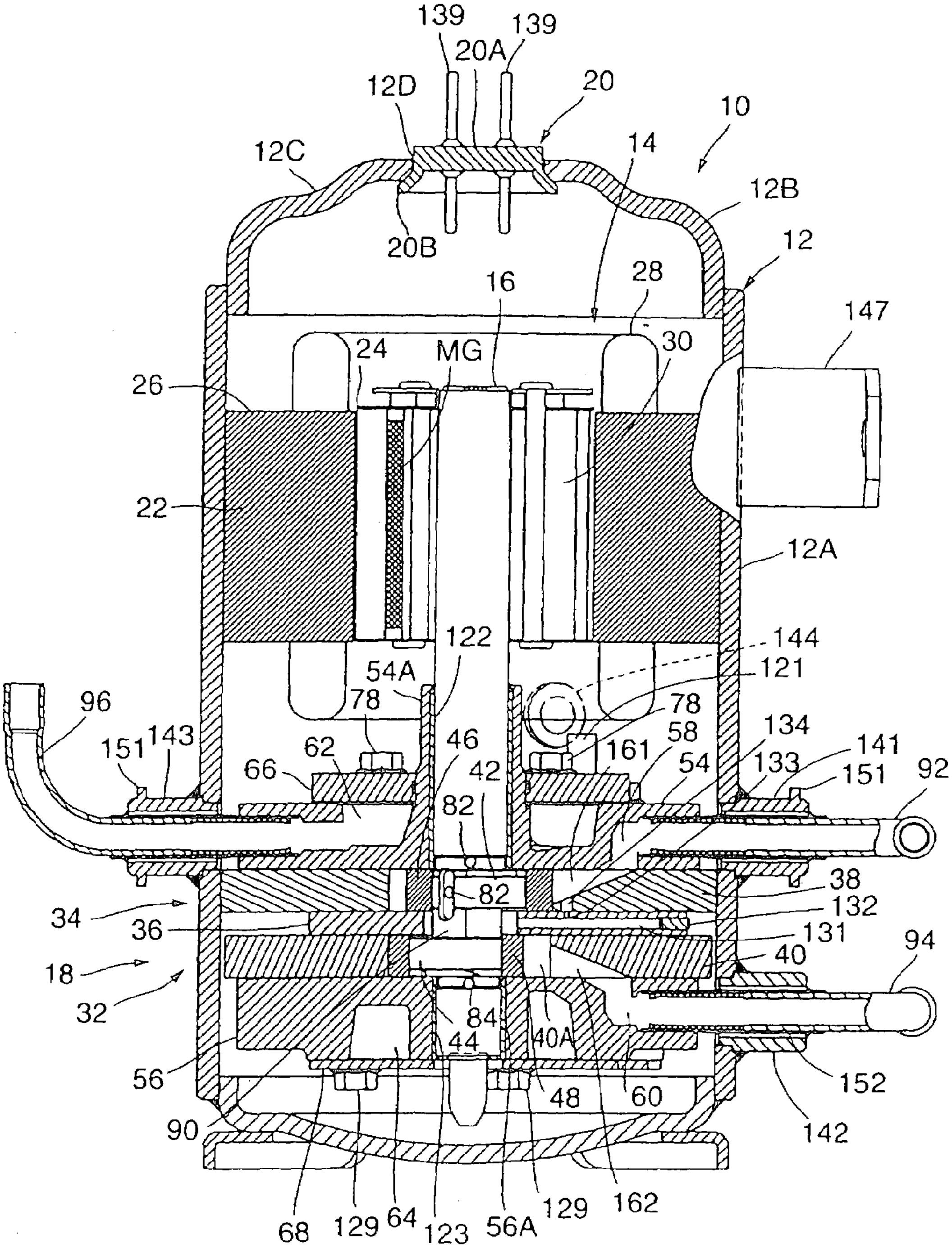
FIG. 1 is a vertical sectional view of a rotary compressor according to an embodiment of the present invention.

Next, the preferred embodiments of the present invention will be described in detail with reference to the accompanying drawings.

In each drawing, a reference numeral 10 denotes a rotary compressor (hermetically sealed electric compressor) of an internal intermediate pressure multistage (two-stage) compression type using carbon dioxide ($CO_2$). This rotary compressor 10 comprises a cylindrical hermetically sealed container 12 made of a steel plate, an electric element 14 arranged and housed in an upper side of an internal space of the hermetically sealed container 12, and a rotary compression mechanism unit 18 including first (1st stage) and second (2nd stage) rotary compression element 32 and 34 arranged below the electric element 14, and driven by a rotary shaft 16 of the electric element 14. A height dimension of the rotary compressor 10 of the embodiment is set to 220 mm (outer diameter 120 mm), a height dimension of the electric element 14 to about 80 mm (outer diameter 110 mm), a height dimension of the rotary compression mechanism unit 18 to about 70 mm (outer diameter 110 mm), and a space between the electric element 14 and the rotary compression mechanism unit 18 to about 5 mm. An exclusion capacity of the second rotary compression element 34 is set smaller than that of the first rotary compression element 32.

In the embodiment, the hermetically sealed container 12 is made of a steep plate having a thickness of 4.5 mm. The container has a bottom portion used as an oil reservoir, and includes a cylindrical container main body 12A for housing the electric element 14 and the rotary compression mechanism unit 18, and a roughly bowl-shaped end cap (cap body) 12B for sealing an upper opening of the container main body 12A. A circular attaching hole 12D is formed on an upper surface center of the end cap 12B, and a terminal (wire is omitted) 20 is attached to the attaching hole 12D to supply power.

Figure 24:
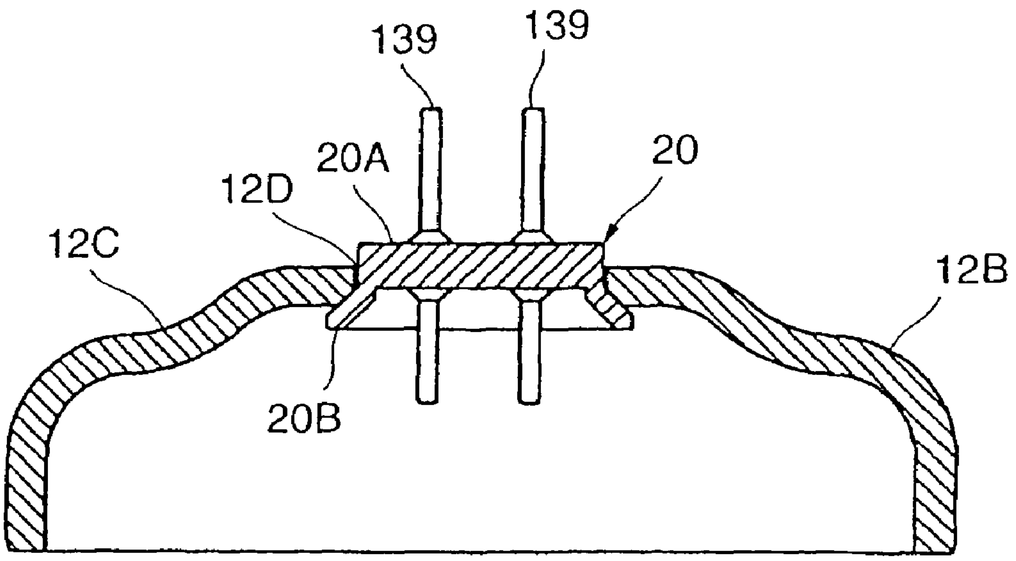
FIG. 24 is an expanded sectional view of the terminal portion of the rotary compressor of FIG. 1.
Figure 25:
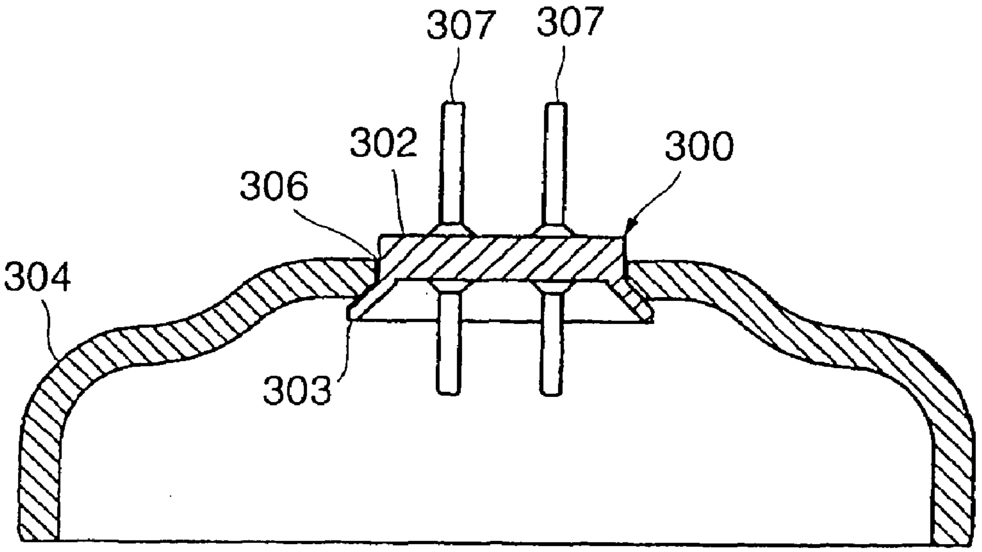
FIG. 25 is an expanded sectional view of the rotary compressor when a thin terminal of an attaching portion is attached.

In this case, the end cap 12B around the terminal 20 is provided with a stepped portion (step) 12C having a predetermined curvature formed by seat pushing molding in an axial symmetrical shape around a center axis of the end cap 12B annularly. As shown in FIG. 24, the terminal 20 includes a circular glass portion 20A, which an electric terminal 139 penetrates to be attached, and an attaching portion 20B made of steels (S25C to S45C), which is formed around the glass portion 20A and swelled obliquely downward outside in a flange shape. This is also axially symmetrical around the center axis of the end cap 12B. A thickness dimension of the attaching portion 20B is set in a range of 2.4±0.5 mm (≧1.9 mm to ≦2.9 mm). In the terminal 20, the glass portion 20A is inserted from a lower side into the attaching hole 12D to face upward, and the attaching portion 20B is welded to the attaching hole 12D peripheral edge of the end cap 12B in a state of being abutted on the peripheral edge of the attaching hole 12D. Accordingly, the terminal 20 is fixed to the end cap 12B.

Here, when pressure in the hermetically sealed container 12 was set as intermediate pressure, and the attaching portion 20B of the terminal 20 was made thin, in a test, a shortage occurred in strength (pressure resistance performance) against high pressure (intermediate pressure) of refrigerant gas in the hermetically sealed container 12, and cracks occurred in the attaching portion 12B itself. On the other hand, when the attaching portion 20B was made thicker than 2.9 mm, a test showed that a large amount of heat was necessary for welding to the hermetically sealed container 304, creating a possibility that the glass portion 20A may be adversely affected.

According to the present invention, by setting the thickness dimension of the attaching portion 20B of the terminal 20 to 2.4±0.5 mm, an increase in the amount of heat necessary for welding was suppressed while sufficient pressure resistance performance of the terminal 20 was secured.

Figure 22:
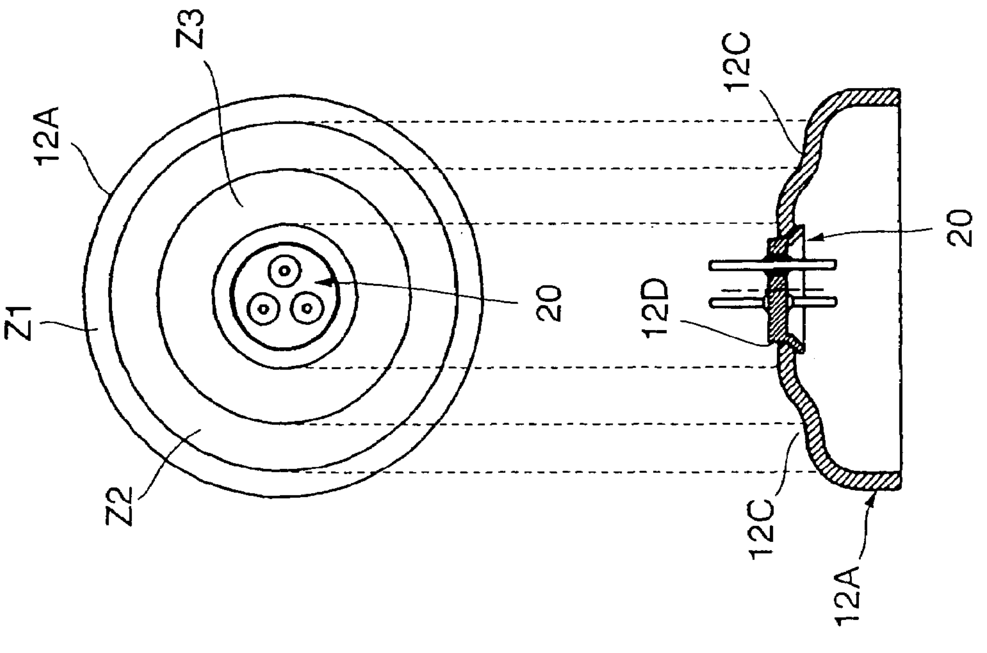
FIG. 22 is a view showing a relation of deformation amounts between a section of a terminal portion and an end cap of the rotary compressor shown in FIG. 1.

The end cap 12A is affected by high pressure (intermediate pressure) in the hermetically sealed container 12 to be deformed in a direction for swelling a welding part with the terminal 20 outside. FIG. 22 shows, region by region, a result of actually measuring the deformation amount of the end cap 12A. In the drawing, the deformation amount of a region indicated by Z1 was 0.05 μm, the deformation amount of a region indicated by Z2 0.2 μm, and the deformation amount of a region indicated by Z3 maximum 0.25 μm. The result was attributed to an increase in rigidity of the end cap 12A in the vicinity of the terminal 20 by the step 12C, and a value exhibited is extremely small compared even with the deformation amount of the foregoing conventional end cap.

Further, since the terminal 20 is fixed around the roughly bowl-shaped end cap 12A, and the step 12C is also formed around it, the deformation amount itself is uniformly distributed concentric circularly around the terminal 20.

Therefore, according to the present invention, in a situation where $CO_2$ gas is compressed as a refrigerant, and pressure in the hermetically sealed container 12 becomes high, it is possible to reduce the amount of deformation of the end cap caused by the inner pressure of the hermetically sealed container 12, and increase pressure resistance. Moreover, deformation of the end cap 12A on the welding part with the terminal 20 caused by the inner pressure of the hermetically sealed container 12 can be made uniform, and cracks or peeling-off on the welding part following nonuniform deformation can be prevented. Therefore, it is possible to further increase pressure resistance.

On the other hand, the electric element 14 includes a stator 22 attached annularly along an inner peripheral surface of the upper space of the hermetically sealed container 12, and a rotor 24 inserted into the stator 22 with a slight space. The rotor 24 is fixed to a rotary shaft 16 vertically extended through a center.

Figure 6:
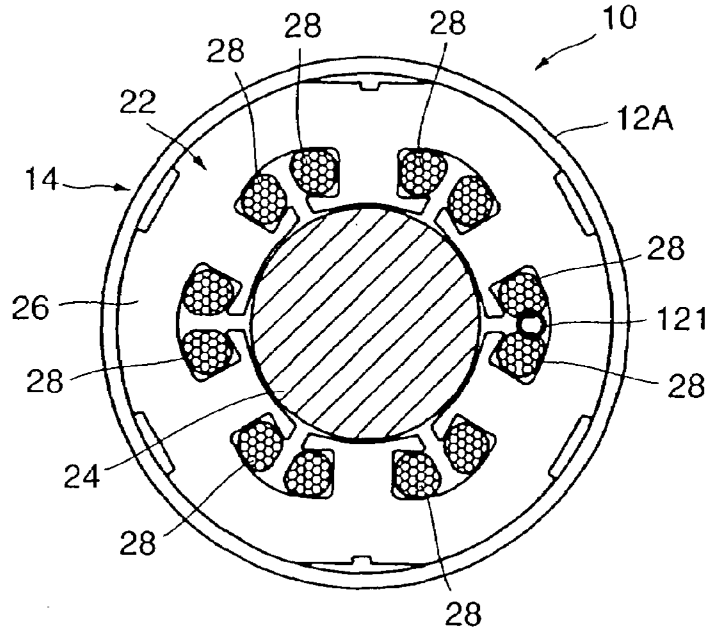
FIG. 6 is a sectional plan view of an electric element portion of the rotary compressor shown in FIG. 1.

The stator 22 includes a laminate body 26 formed by laminating doughnut-shaped electromagnetic steel plates, and a stator coil 28 wound on teeth of the laminate body 26 by series winding (concentrated winding) (FIG. 6). The rotor 24 also includes a laminate body 30 of electromagnetic steel plates as in the case of the stator 22, and a permanent magnet MG is inserted into the laminate body 30.

An intermediate diaphragm 36 is held between the first and second rotary compression elements 32 and 34. That is, the first and second rotary compression elements 32 and 34 include the intermediate diaphragm 36, relatively thin cylinders 38 (second cylinder) and 40 (first cylinder) arranged above and below the intermediate diaphragm 36, upper and lower rollers 46 (second roller) and 48 (first roller) engaged with upper and lower eccentric portions 42 (second eccentric portion) and 44 (first eccentric portion) provided in the rotary shaft 16 to have a phase difference of 180° in compression chambers 38A (FIG. 15) and 40A of the upper and lower cylinders 38 and 40, and eccentrically rotated, upper and lower vanes 50 (lower vane is not shown) abutted on the upper and lower rollers 46 and 48 to respectively divide insides of the upper and lower cylinders 38 and 40 into low and high pressure chamber sides, and upper and lower support members 54 and 56 as support members to seal an upper opening surface of the upper cylinder 38 and a lower opening surface of the lower cylinder 40, and also serve as bearings of the rotary shaft 16.

Figure 15:
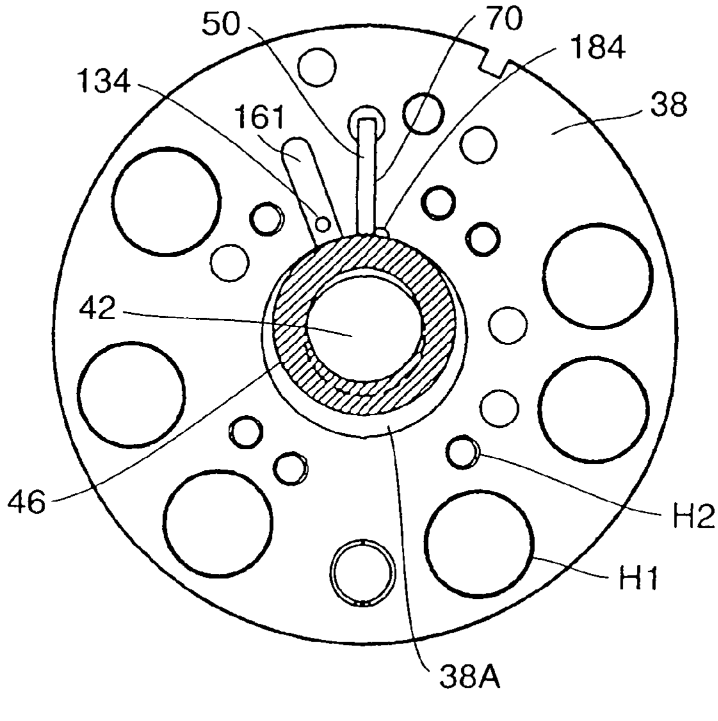
FIG. 15 is an upper view of an upper cylinder of the rotary compressor shown in FIG. 1.

On the upper cylinder 38, a suction port 161 is formed to be obliquely raised from an edge of the compression chamber 38A. On an opposite side sandwiching the vane 50 with the suction port 161 as shown in FIG. 15, a discharge port 184 is formed obliquely from an edge of the compression chamber 38A. In addition, on the lower cylinder 40, a suction port 162 is formed to be obliquely raised from an edge of the compression chamber 40A. On an opposite side sandwiching the vane with the suction port 162, a discharge port (not shown) is formed obliquely from an edge of the compression chamber 40A.

On the other hand, the upper support member 54 includes a suction passage 58 and a discharge passage 39. The lower support member 56 includes a suction passage 60and a discharge passage 41. In this case, the suction ports 161 and 162 correspond to the suction passages 58 and 60 and, through these ports, the passages are respectively communicated with the compression chambers 38A and 40A in the upper and lower cylinders 38 and 40. The discharge ports 184 (not shown for the cylinder 40) correspond to the discharge passages 39 and 41 and, through these ports, the passages are respectively communicated with the compression chambers 38A and 40A in the upper and lower cylinders 38 and 40.

The upper and lower support members 54 and 56 further includes concaved discharge muffler chambers 62 and 64, and openings of the discharge muffler chambers 62 and 64 are sealed with covers. That is, the discharge muffler chamber 62 is sealed with an upper cover 66 as a cover, and the discharge muffler chamber 64 with a lower cover 68 as a cover.

In this case, a bearing 54A is erected on a center of the upper support member 54, and a cylindrical bush 122 is fixed to an inner surface of the bearing 54A. A bearing 56A is formed through on a center of the lower support member 56, a lower surface (surface opposite the lower cylinder 40) is formed flat and, further, a cylindrical carbon bush 123 is fixed to an inner surface of the bearing 56A. These bushes 122 and 123 are made of later-described materials having good sliding and wear resistance characteristics. The rotary shaft 16 is held through the bushes 122 and 123 on the bearings 54A and 56A of the upper and lower support members 54 and 56.

Figure 9:
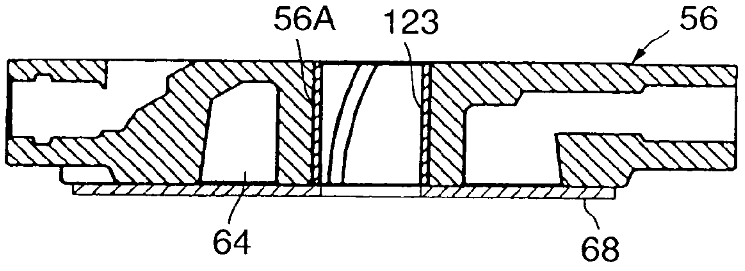
FIG. 9 is a sectional view of a lower support member and a lower cover of the rotary compressor shown in FIG. 1.

In the described case, the lower cover 68 is made of a doughnut-shaped circular steel plate and, by press working or shaving, an attaching surface to the lower support member 56 is processed to have flatness of 0.1 mm or lower. Four places of a peripheral portion of the lower cover 68 are fixed to the lower support member 56 from a lower side by main bolts 129 . . . , arranged concentric circularly around the bearing 54A, and a lower opening portion of the discharge muffler chamber 64 communicated with the compression chamber 40A in the lower cylinder 40 of the first rotary compression element 32 by the discharge passage 41 is sealed. Tips of the main bolts 129 . . . , are engaged with the upper support member 54. An inner peripheral edge of the lower cover 68 is produced inward from an inner surface of the bearing 56A of the lower support member 56. Accordingly, a lower end surface (end opposite the lower cylinder 40) of the bush 123 is held by the lower cover 68, thereby prevented from falling off (FIG. 9).

Figure 10:
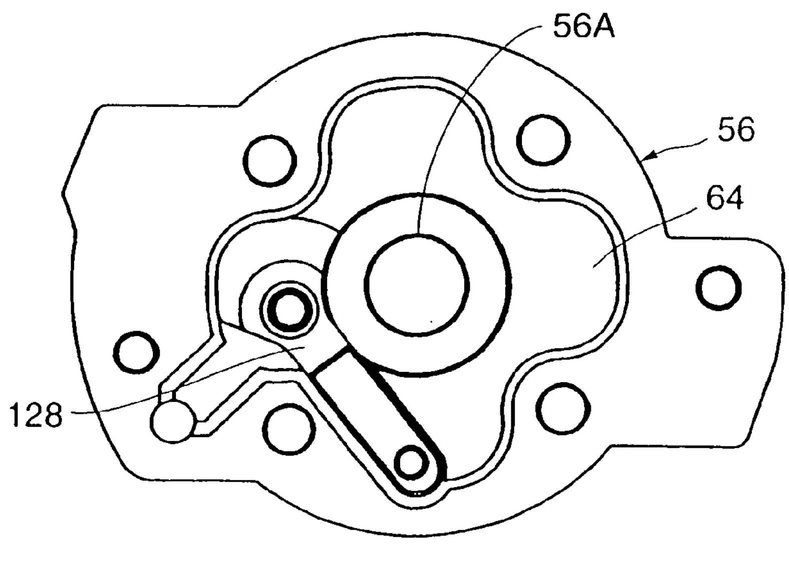
FIG. 10 is a bottom view of the lower support member of the rotary compressor shown in FIG. 1.

Thus, it is not necessary to form a pulling-out preventive shape of the bush 123 in a lower end of the bearing 56A of the lower support member 56, and a shape of the lower support member 56 is simplified, making it possible to reduce production costs. FIG. 10 shows a bottom surface of the lower support member 56. A reference numeral 128 denotes a discharge valve of the first rotary compression element 32 for opening/closing the discharge passage 41 n the discharge muffler chamber 64.

Here, the lower support member 56 is made of an iron-containing sintered material (casting is also possible). A surface (bottom surface) for attaching the lower cover 68 is processed to have flatness of 0.1 mm or lower, and then subjected to steam treatment. The steam treatment changes the surface for attaching the lower cover 68 into iron oxide and, accordingly, a hole in the sintered material is sealed to enhance sealing. Thus, it is not necessary to provide any gaskets between the lower cover 68 and the lower support member 56.

Figure 4:
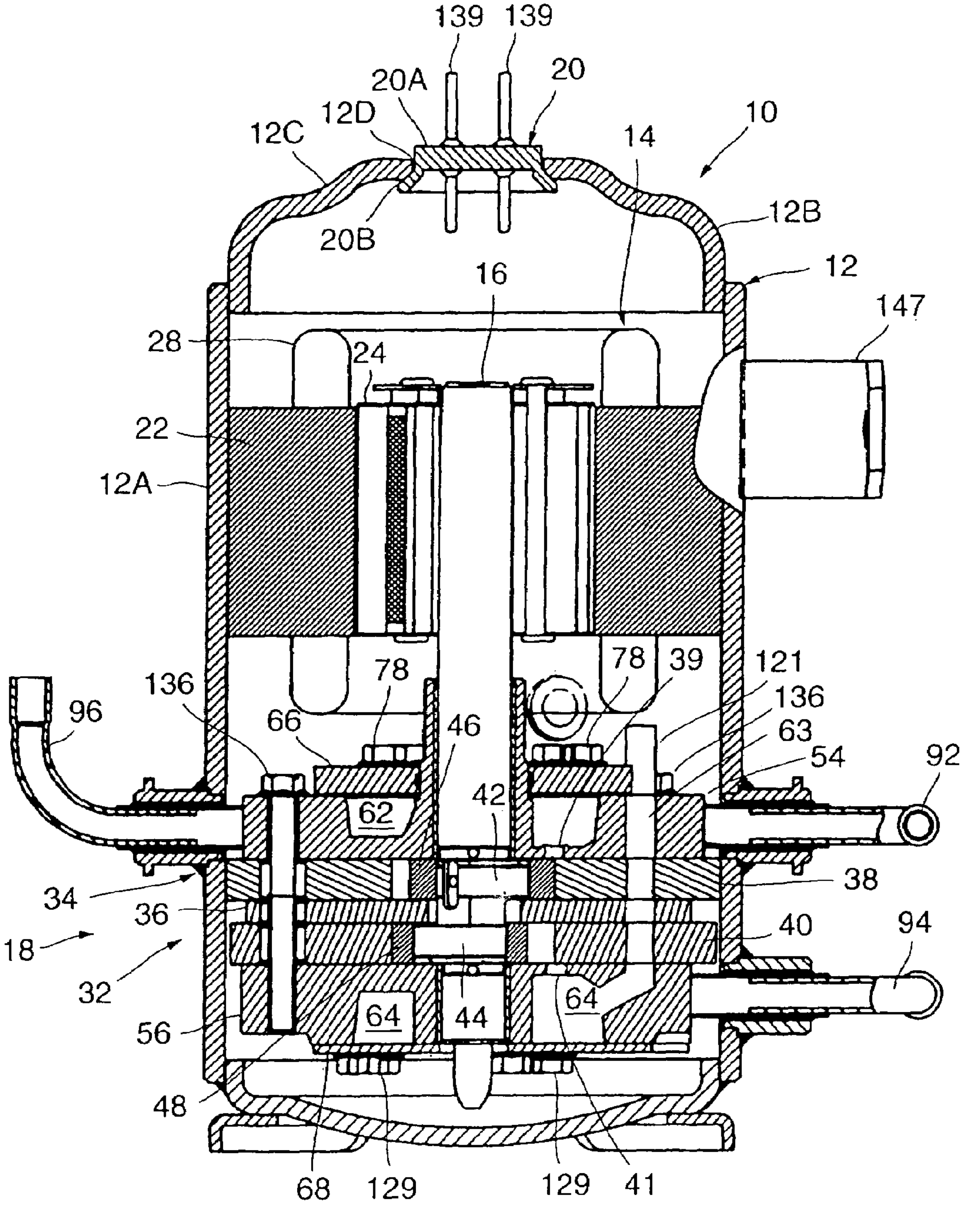
FIG. 4 is another vertical sectional view of the rotary compressor shown in FIG. 1.
Figure 5:
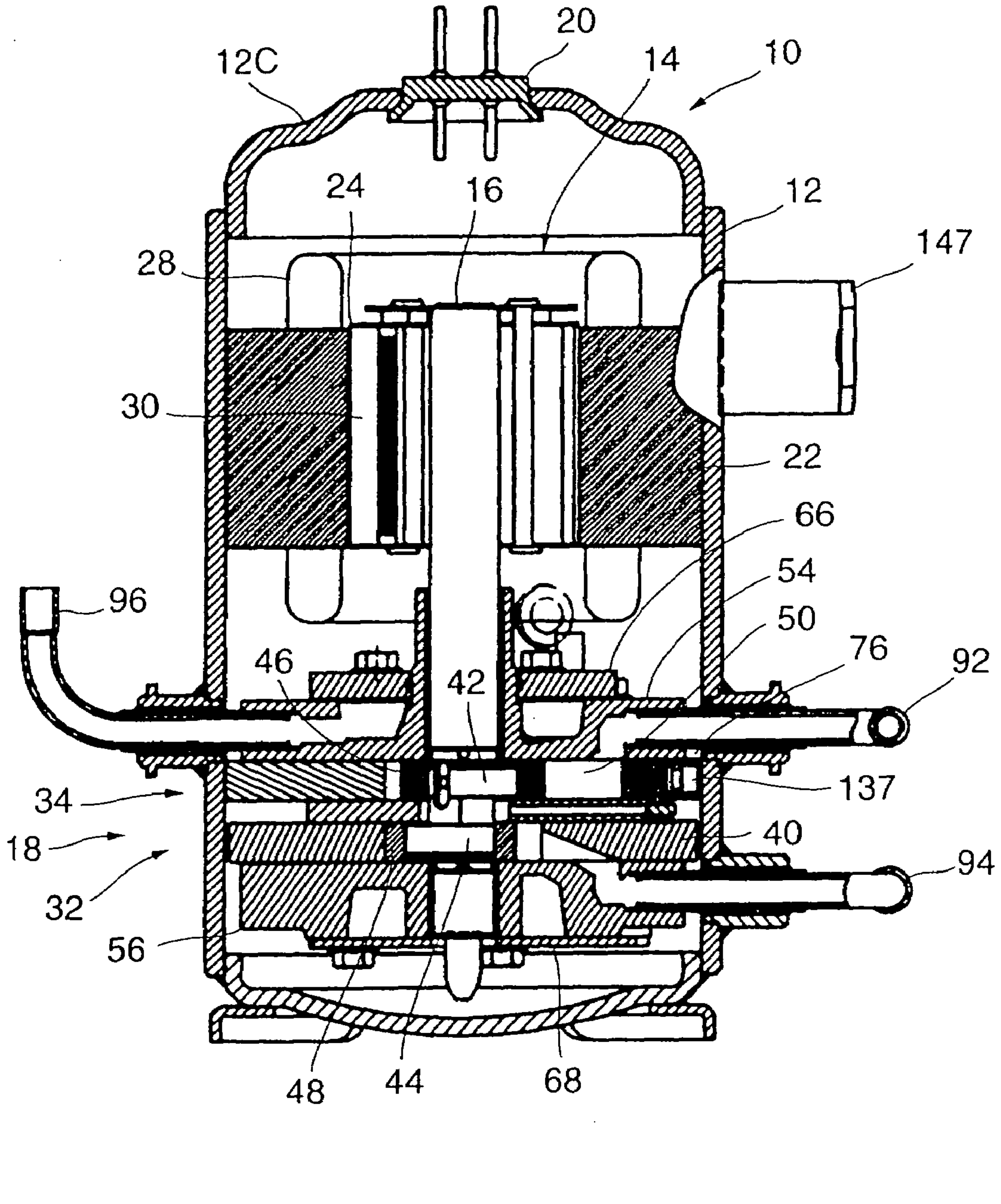
FIG. 5 is yet another vertical sectional view of the rotary compressor shown in FIG. 1.

The discharge muffler chamber 64 is communicated with the electric element 14 side of the upper cover 66 in the hermetically sealed container 12 through a communication path 63 as a hole to penetrate the upper and lower cylinders 38 and 40 and the intermediate diaphragm 36 (FIG. 4). In this case, an intermediate discharge tube 121 is erected on an upper end of the communication path 63. The intermediate discharge tube 121 is directed to a gap between adjacent stator coils 28 and 28 wound on the stator 22 of the upper electric element 14 (FIG. 6).

Figure 11:
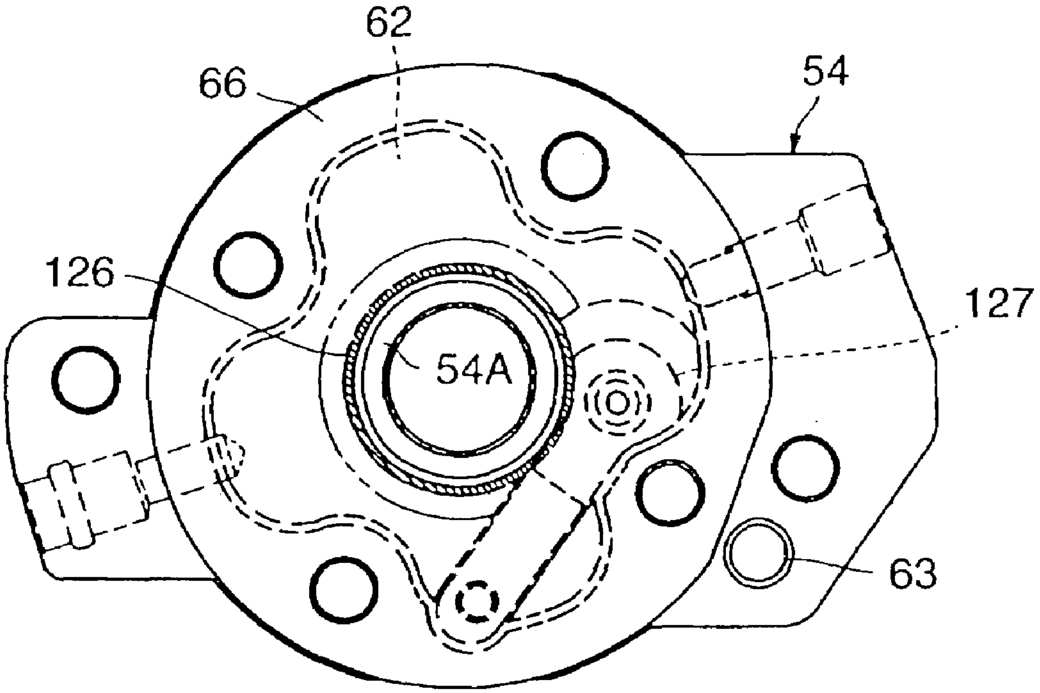
FIG. 11 is an upper view of an upper support member and an upper cover of the rotary compressor shown in FIG. 1.

The upper cover 66 seals an upper opening (opening of the electric element 14 side) of the discharge muffler chamber 62 communicated with the compression chamber 38A in the upper cylinder 38 of the second rotary compression element 34 through the discharge passage 39, and divides the inside of the hermetically sealed container 12 into the discharge muffler chamber 62 and the electric element 14 side. This upper cover 66 has a thickness of ≧2 mm to ≦10 mm (most preferably 6 mm in the embodiment) as shown in FIG. 11. it is made of a roughly doughnut-shaped circular steel plate having a hole, through which the bearing 54A of the upper support member 54 is inserted, and its peripheral portion is fixed to the upper support member 54 from above by four main bolts 78 . . . , through a gasket 124 with a bead while the gasket 124 is held with the upper support member 54. Tips of the main bolts 78 . . . are engaged with the lower support member 56.

Figure 12:
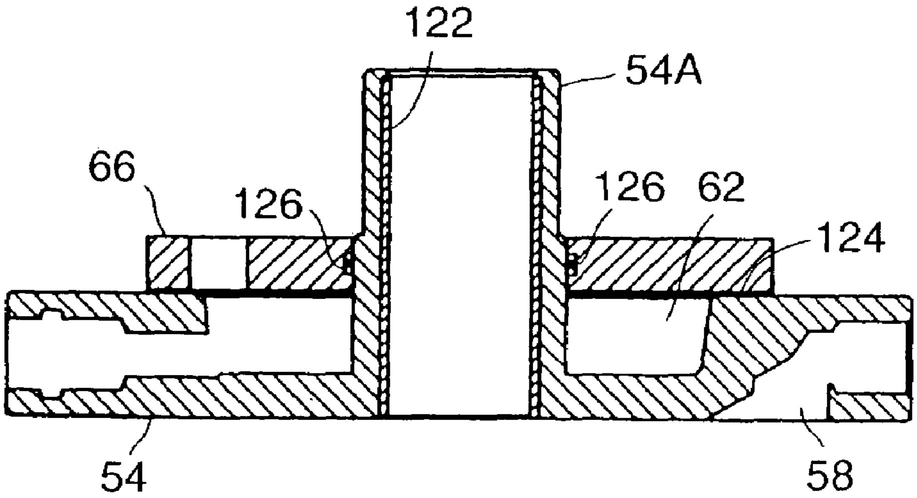
FIG. 12 is a sectional view of the upper support member and the upper cover of the rotary compressor shown in FIG. 1.

Here, in a test carried out by setting the upper cover 66 thinner than 2 mm, a danger of deformation by inner pressure of the discharge muffler chamber 62 arose. On the other hand, when the upper cover 66 was set thicker than 10 mm, the upper surface approached the stator 22 (stator coil 28), resulting in concern about insulation. According to the present invention, by setting the thickness of the upper cover 66 in the foregoing range, the rotary compressor 10 can be miniaturized while sufficiently enduring pressure of the discharge muffler chamber 62 higher than that in the hermetically sealed container 12, and an insulation distance from the electric element 14 can be secured. Further, an O ring 126 is provided between an inner peripheral end surface of the upper cover 66 and an outer surface of the bearing 54A (FIG. 12). By using the O ring 126 to seal the bearing 54A side, sufficient sealing is carried out on the inner peripheral end surface of the upper cover 66 to prevent gas leakage. Accordingly, it is possible to increase a capacity of the discharge muffler chamber 62, and eliminate the conventional necessity of fixing the inner edge of the upper cover 66 to the bearing 54A by the C ring. Here, in FIG. 11, a reference numeral 127 denotes a discharge valve of the second rotary compression element 34 for opening/closing the discharge passage 39 in the discharge muffler chamber 62.

Figure 29:
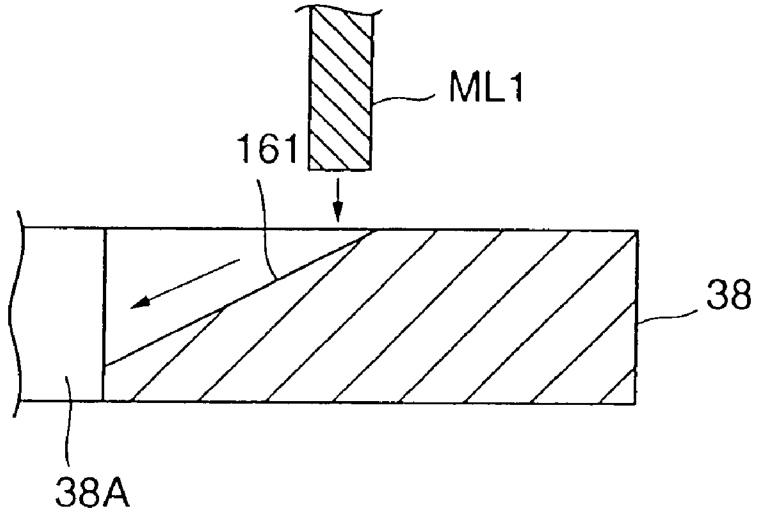
FIG. 29 is a view illustrating a processing method of a suction port of the second rotary compression element of the rotary compressor shown in FIG. 1.
Figure 30:
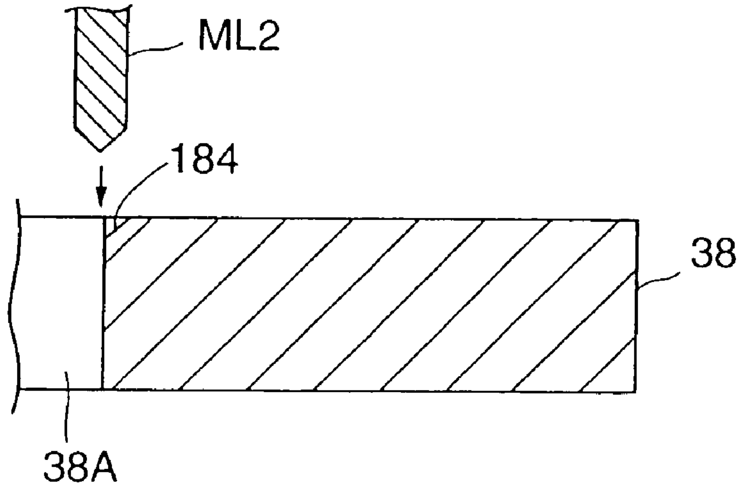
FIG. 30 is a view illustrating a processing method of a discharge port of the second rotary compression element of the rotary compressor shown in FIG. 1.
Figure 31:
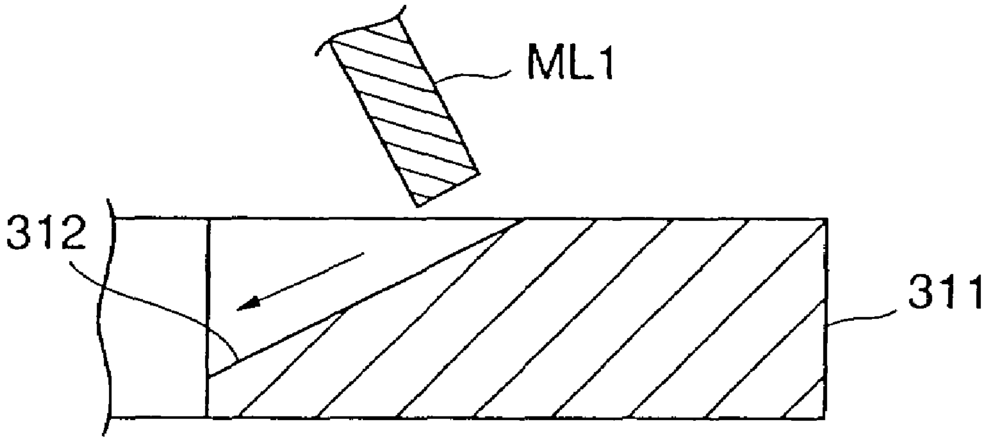
FIG. 31 is a view illustrating a processing method of a suction port of a rotary compression element of the conventional rotary compressor.
Figure 32:
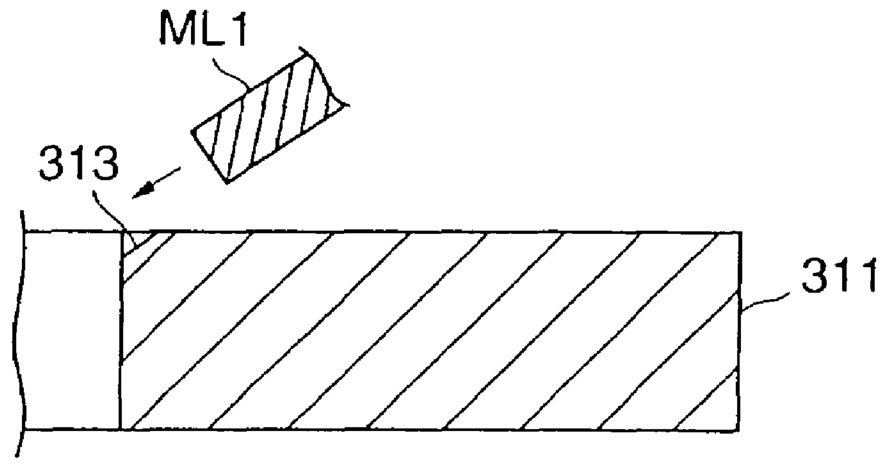
FIG. 32 is a view illustrating a processing method of a discharge port of the rotary compression element of the conventional rotary compressor.

Now, description is made of a method for processing the suction port 161 and the discharge port 184 of the upper cylinder 38 (similar in the lower cylinder 40) by referring to FIGS. 29 and 30. In the case of forming the suction port 161, an end mill ML1 having a flat tip is placed perpendicularly to the cylinder 38 as indicated by an arrow drooped in FIG. 29, and then it is moved to the compression chamber 38A in a direction of being inclined to the cylinder 38 as indicated by an arrow directed obliquely left downward in FIG. 29 while the perpendicular state is maintained, thereby forming a groove inclined to the cylinder 38.

On the other hand, in the case of forming the discharge port 184, a half of an end mill ML2 having a chevron tip is placed perpendicularly to an edge of the compression chamber 38A of the cylinder 38 as shown in FIG. 30, thereby forming a notch inclined to the cylinder 38.

By processing the suction port 161 and the discharge port 184 in the above manner, the inclined suction port 161 and the inclined discharge port 184 can be formed in the cylinder 38 while the perpendicular states of the end mills ML1 and ML2 to the cylinder 38 are maintained. Accordingly, the suction port 161 and the discharge port 184 can be formed in the same process as that for drilling of other screw holes H1 (holes for inserting the main bolts 78 or the like) or lightening holes H2 as shown in FIG. 15. Thus, it is possible to reduce production costs by reducing the number of processing steps.

Especially, in the case of the suction port 161, by the foregoing processing, an edge of the suction port 161 on the suction passage 58 side is formed in a semicircular arc shape as shown in FIG. 15 by the end mill ML1 having the flat tip. Thus, compared with the linear edge of the conventional case, passage resistance on a communicating portion between the suction port 161 and the suction passage 58 can be reduced. Therefore, it is possible to achieve efficient running by reducing air flow disturbance.

Figure 13:
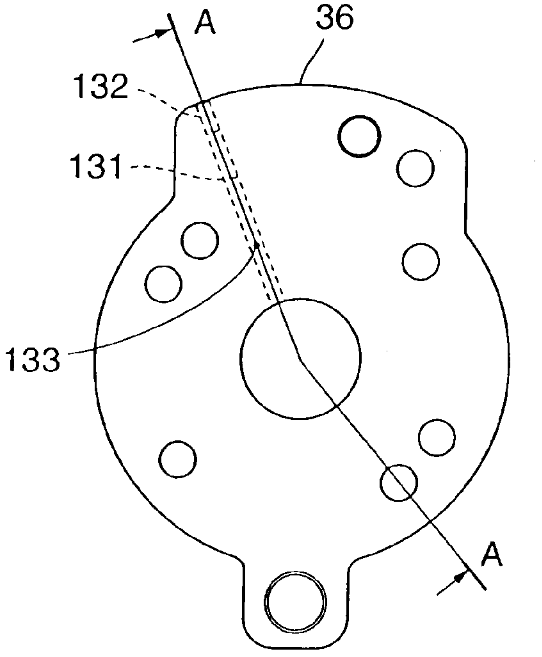
FIG. 13 is an upper view of an intermediate diaphragm of the rotary compressor shown in FIG. 1.
Figure 14:
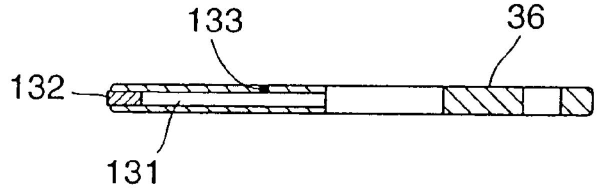
FIG. 14 is a sectional view taken on line A-A of FIG. 13.

Then, in the intermediate diaphragm 36 for sealing the lower opening surface of the upper cylinder 38 and the upper opening surface of the lower cylinder 40, on a position corresponding to the suction side in the upper cylinder, a through-hole 131 is bored by micropore processing, which reaches the inner peripheral surface from the outer peripheral surface, and communicates the outer peripheral surface with the inner peripheral surface to form an oil supply path as shown in FIGS. 13 and 14. A sealing material (blind pin) 132 on the outer peripheral surface side of the through-hole 131 is pressed in to seal an opening of the outer peripheral surface side. On the midway of the through-hole 131, a communication hole (vertical hole) 133 is bored to be extended upward.

Figure 7:
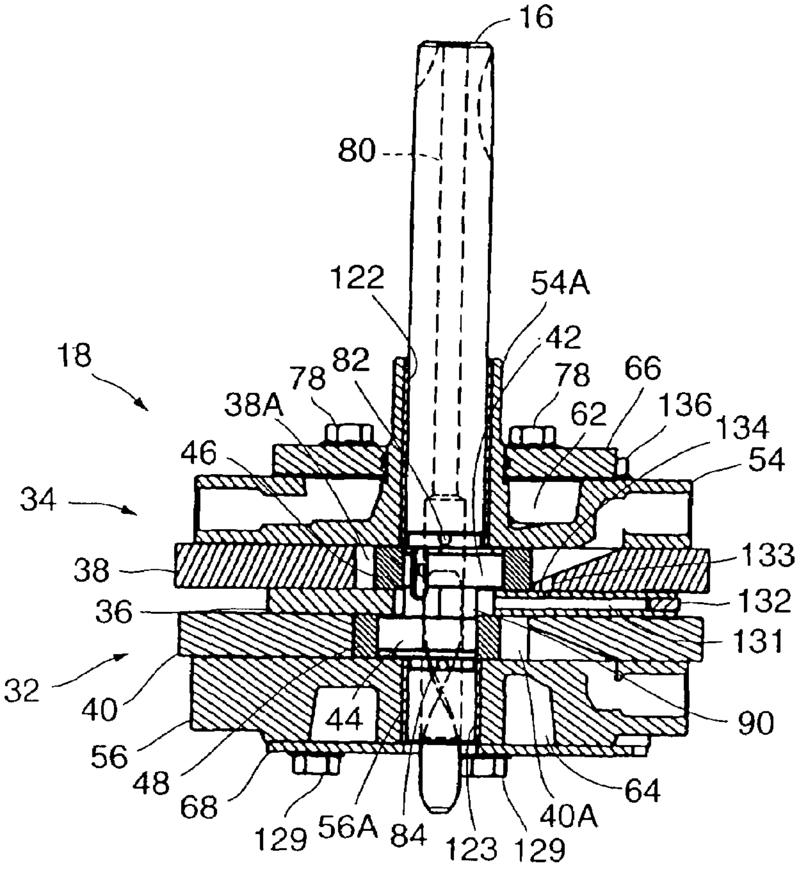
FIG. 7 is an expanded sectional view of a rotary compression mechanism portion of the rotary compressor shown in FIG. 1.

On the other hand, on the suction port 161 (suction side) of the upper cylinder 38, an injection communication hole 134 is bored to be communicated with the communication hole 133 of the intermediate diaphragm 36. In the rotary shaft 16, as shown in FIG. 7, an oil hole 80 of a vertical direction around an axis, and horizontal oil supply holes 82 and 84 (also formed in the upper and lower eccentric portions 42 and 44 of the rotary shaft 16) communicated with the oil hole 80 are formed. An opening of the inner peripheral surface side of the through-hole 131 of the intermediate diaphragm 36 is communicated through the oil supply holes 82 and 84 with the oil hole 80.

Since intermediate pressure is set in the hermetically sealed container 12 as described later, it is difficult to supply oil into the upper cylinder 38 set to high pressure at a 2nd stage. However, because of the foregoing constitution of the intermediate diaphragm 36, oil scooped up from the oil reservoir on the bottom of the hermetically sealed container 12, passed up through the oil hole 80, and discharged from the oil supply holes 82 and 84 enters the through-hole 131 of the intermediate diaphragm 36, and then supplied from the communication holes 133 and 134 to the suction side (suction port 161) of the upper cylinder 38.

Figure 16:
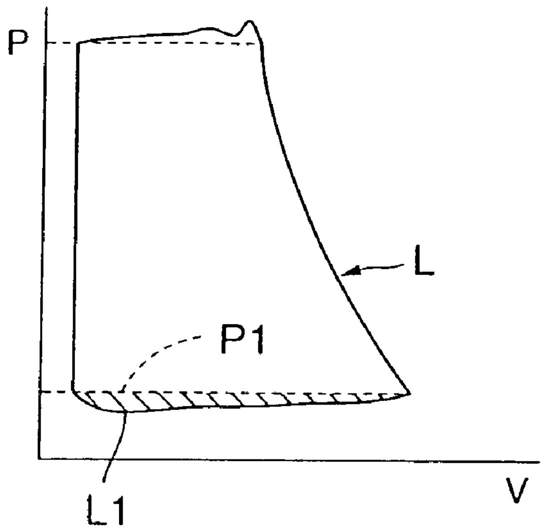
FIG. 16 is a view showing pressure fluctuation on a suction side of the upper cylinder of the rotary compressor shown in FIG. 1.

A code L in FIG. 16 denotes pressure fluctuation on the suction side in the upper cylinder 38, and P1 pressure of the inner peripheral surface of the intermediate diaphragm 36. As indicated by L1 in the drawing, pressure (suction pressure) of the suction side of the upper cylinder 38 is lowered below pressure of the inner peripheral surface side of the intermediate diaphragm 36 because of a suction pressure loss in a suction process. In this period, the oil is injected from the oil hole 80 of the rotary shaft 16 through the through-hole 131 and the communication hole 133 of the intermediate diaphragm 36 into the upper cylinder 380 from the communication hole 134 of the upper cylinder 38, thus supplying oil.

As described above, the upper and lower cylinders 38 and 40, the intermediate diaphragm 36, the upper and lower support members 54 and 56, and the upper and lower covers 66 and 68 are fastened from the upper and lower sides by the four main bolts 78 . . . , and the main bolts 129 . . . . The upper and lower cylinders 38 and 40, the intermediate diaphragm 36, and the upper and lower support members 54 and 56 are further fastened by auxiliary bolts 136 and 136 located outside the main bolts 78 and 129 (FIG. 4). The auxiliary bolts 136 and 136 are inserted from the upper support member 54 side, and tips thereof are engaged with the lower support member 56.

The auxiliary bolt 136 is positioned near a later-described guide groove 70 of the above-described vane 50. By adding the auxiliary bolt 136 and integrating the rotary compression mechanism unit 18, fastening torque is increased, gas leakage between the upper cylinder 38 of the second rotary compression element 34 having discharge pressure reaching 12 MPaG, and the upper support member 54 or the like is prevented, thereby securing sealing against extremely high internal pressure. Moreover, since the vicinity of the guide groove 70 of the vane 50 is fastened by the auxiliary bolt 136, gas leakage (leakage between the upper support member 54 and the upper cylinder 38) of back pressure (high pressure) applied to the vane 50 as described later can also be prevented.

Figure 8:
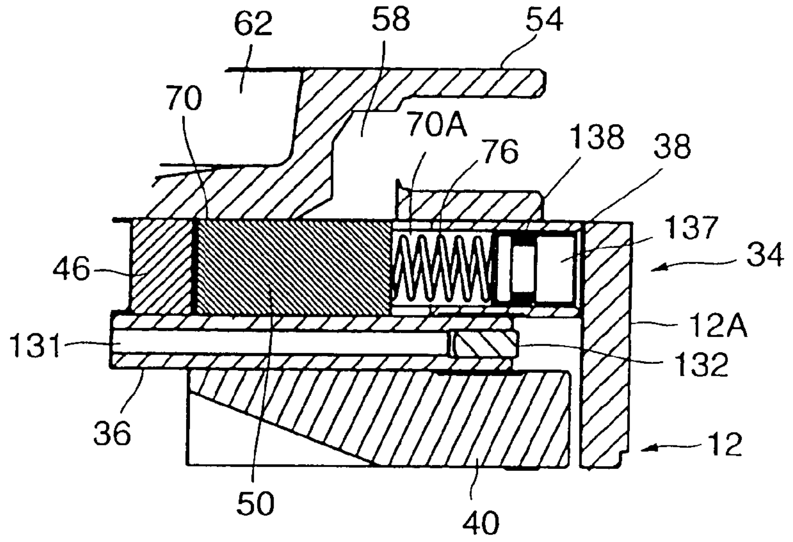
FIG. 8 is an expanded sectional view of a vane portion of a second rotary compression element of the rotary compressor shown in FIG. 1.

On the other hand, in the upper cylinder 38, the guide groove 70 for housing the above-described vane 50, and a housing portion 70A positioned outside the guide groove 70 to house a spring 76 as a spring member are formed. The housing portion 70A is opened to the guide groove 70 side and the hermetically sealed container 12 (container main body 12A) (FIG. 8). They spring 76 is abutted on the outer end of the vane 50 to always press the vane 50 to the roller 46 side. A metal plug 137 is provided in the housing portion 70A of the hermetically sealed container 12 side of the spring 76 to serve as means for preventing pulling-out of the spring 76. A back pressure chamber, not shown, is communicated with the guide groove 70, and discharge pressure (high pressure) of the second rotary compression element 34 is applied to the back pressure chamber in the vane 50. Accordingly, high pressure is set in the spring 76 side of the plug 137, and intermediate pressure in the hermetically sealed container 12 side.

In this case, an outer dimension of the plug 137 is set smaller than an inner dimension of the housing portion 70A, and the plug 137 is inserted into the housing portion 70A to fit in a gap. On a peripheral surface of the plug 137, an O ring 138 is attached to seal a part between the plug 137 and the inner surface of the housing portion 70A. A space between an outer end of the upper cylinder 38, i.e., an outer end of the housing portion 70A, and the container main body 12A of the hermetically sealed container 12 is set smaller than a distance from the O ring 138 to an end of the plug 137 on the hermetically sealed container 12 side. Then, high pressure as discharge pressure of the second rotary compression element 34 is applied as back pressure to the not-shown back pressure chamber communicated with the guide groove 70 of the vane 50. Thus, high pressure is set in the spring 76 side of the plug 137, and intermediate pressure in the hermetically sealed container 12 side.

Because of the foregoing dimensional relation, as in the case of pressing in, and fixing the plug 137 in the housing portion 70A, the upper cylinder 38 is deformed to reduce sealing with the upper support member 54, making it possible to prevent inconvenience of performance deterioration. Even in the case of fitting in the gap, the space between the upper cylinder 38 and the hermetically sealed container 12 is set smaller than the distance from the O ring 138 to the end of the plug 137 on the hermetically sealed container 12 side. Thus, even if the plug 137 is moved in a direction of being extruded from the housing portion 70A by high pressure (back pressure of the vane 50) of the spring 76 side, at a point of time when it is abutted on the hermetically sealed container 12 and prevented from being moved, the O ring 138 is still in the housing portion 70A. Therefore, no functional problems occur in the plug 138.

Figure 17:
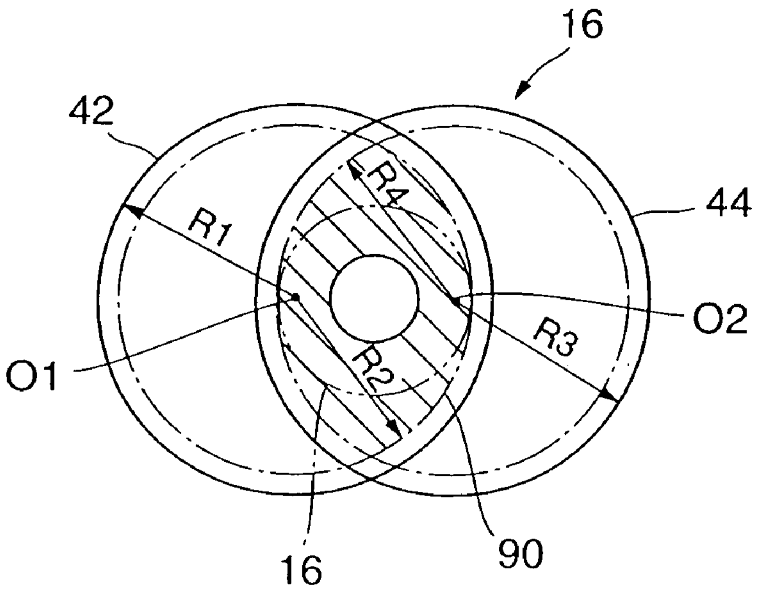
FIG. 17 is a sectional view illustrating a shape of a connecting portion of a rotary shaft of the rotary compressor shown in FIG. 1.

A connecting portion 90 for interconnecting the upper and lower eccentric portions 42 and 44 formed integrally with the rotary shaft 16 to have a phase difference of 180° is formed in a so-called noncircular rugby ball shape as shown in FIG. 17, in order to set a sectional area of a section shape larger than a circular area of the rotary shaft 16 to provide rigidity. A thickness is larger in a direction orthogonal to an eccentric direction of the upper and lower eccentric portions 42 and 44 than that in the eccentric direction of the upper and lower eccentric portions 42 and 44 provided in the rotary shaft 16 (hutched part in the drawing).

Thus, a sectional area of the connecting portion 90 for interconnecting the upper and lower eccentric portions 42 and 44 provided integrally with the rotary shaft 16 is enlarged, sectional secondary moment is increased to enhance strength (rigidity), and durability and reliability of the rotary shaft 16 are enhanced. Especially, if a refrigerant of high use pressure is compressed at two stages as in the case of the embodiment, a load applied to the rotary shaft 16 is large because of a large difference between high pressure and low pressure. However, since the sectional area of the connecting portion 90 is enlarged to increase its strength (rigidity), it is possible to prevent elastic deformation of the rotary shaft 16.

Further, according to the present invention, when a center of the upper eccentric portion 42 is 01, a radius of the eccentric portion is R1, a center of the lower eccentric portion 44 is 02, and a radius of the eccentric portion 44 is R3, a surface (left hatched surface in FIG. 17) of the connecting portion 19 on the eccentric direction side of the upper eccentric portion (first eccentric portion) 42 is formed in a circular arc shape with a center set to 02. A surface (right hatched surface in FIG. 17) of the connecting portion 90 on the eccentric direction side of the eccentric portion 44 is formed in a circular arc shape with a center set to 01.

If a circular arc radius of the surface of the connecting portion 90 on the eccentric direction side of the upper eccentric portion 42 is R4, this radius R4 can be expanded to a radius R3 of the lower eccentric portion 44 at a maximum. If a circular arc radius of the surface of the connecting portion 90 on the eccentric direction side of the lower eccentric portion 44 is R2, this radius R2 can be expanded to a radius R1 of the upper eccentric portion 42 at a maximum.

As described above, the circular arc center of the surface of the connecting portion 90 on the eccentric direction side of the upper eccentric portion 42 is set to 02, and the circular arc center of the surface of the connecting portion 90 on the eccentric direction side of the lower eccentric portion 44 is set to 02. Accordingly, when the rotary shaft 16 is chucked on a cutter to cut the upper and lower eccentric portions 42 and 44 of the rotary shaft 16 and the connecting portion 90, work can be carried out, where after the eccentric portion 42 is processed, the surface (right surface in FIG. 17) of the connecting portion 90 on the eccentric direction side of the eccentric portion 44 is processed by changing only a radius or not changing it, then the surface (left surface in FIG. 17) of the connecting portion 90 on the eccentric direction side of the eccentric portion 42 is processed by changing the chucking position, and the eccentric portion 44 is processed by changing only a radius or not changing it. Thus, the number of times of rechecking the rotary shaft 16 is reduced, and the number of processing steps is reduced, thereby increasing productivity greatly.

In this case, as a refrigerant, the carbon dioxide ($CO_2$) as an example of carbon dioxide gas of a natural refrigerant is used, which is kind to global environment, considering combustibility, toxicity or the like. As lubrication oil, existing oil such as mineral oil, alkyl-benzene oil, ether oil, or ester oil is used.

On the other hand, on a bent side face of the container main body 12A of the hermetically sealed container 12, cylindrical sleeves 141, 142, 143 and 144 are welded to positions corresponding to the suction passages 58 and 60 of the upper and lower support members 54 and 56, and upper sides (positions roughly corresponding to lower ends of the electric element 14) of the discharge muffler chamber 62 and the upper cover 66. The sleeves 141 and 142 are adjacent to each other in a vertical direction, and the sleeve 143 is roughly located on a diagonal line of the sleeve 141. The sleeve 144 is located in a position shifted by about 90° from the sleeve 141.

Figure 28:
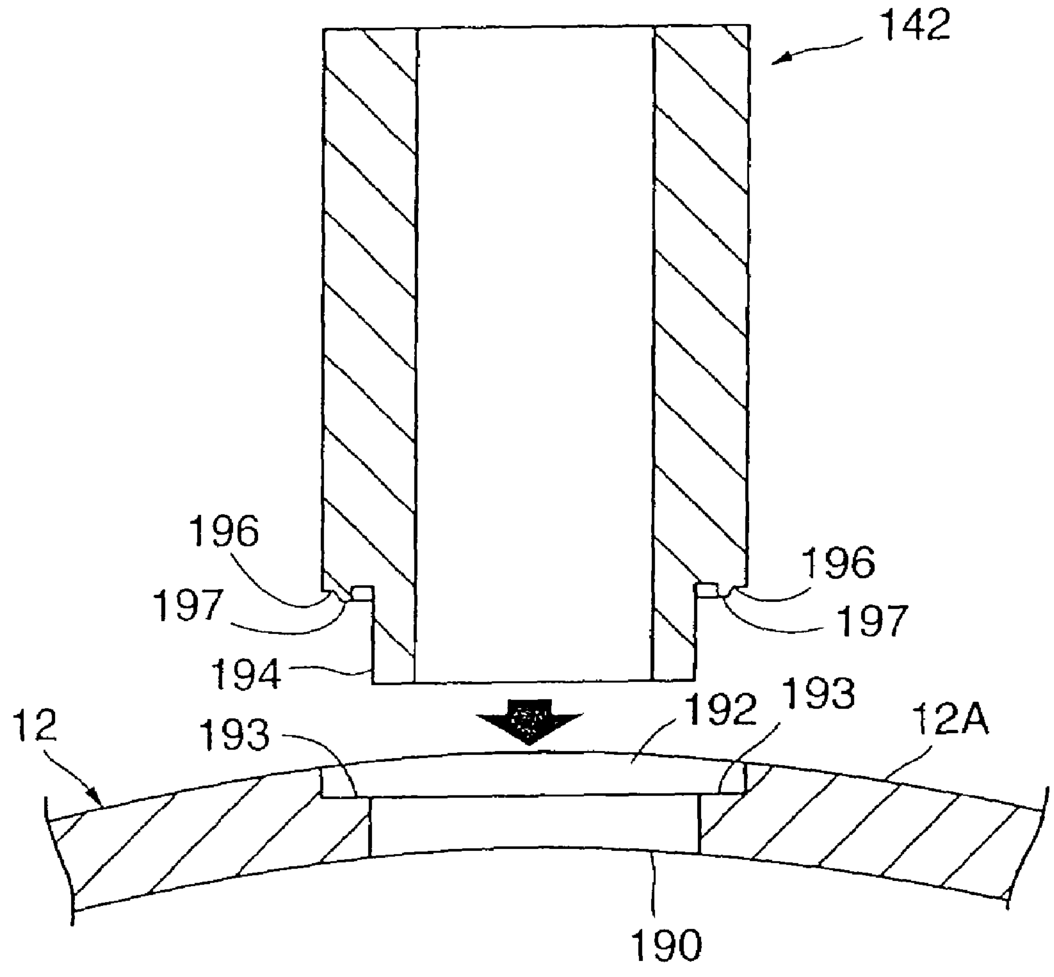
FIG. 28 is a view illustrating a sleeve attaching process of the rotary compressor shown in FIG. 1.

Now, description is made of an attaching structure of the sleeves 141 to 144 (sleeve 142 is shown in the drawing) by referring to FIG. 28. On the bent surface of the container main body 12A of the hermetically sealed container 12, circular holes 190 are respectively formed on positions of attaching the sleeves 141 to 144 (4 places in this case). Further, a circular concave portion 192 is counterbored around each hole 190 on the outer surface side of the container main body 12A. Around the hole 190 on a bottom surface of the concave portion 192, a flat surface 193 is formed in parallel to a tangent line with respect to the inner diameter of the container main body 12A of the hermetically sealed container 12.

On the other hand, an insertion portion 194 having a diameter smaller than an outer diameter is formed on an end of the sleeve 142 (similar in other sleeves) on the hermetically sealed container 12 side. A flat abutting portion 196 is formed around the insertion portion 194 to be orthogonal to an axial direction of the sleeve 142. Further, a projection 197 for projection welding is formed around the abutting portion 196.

In FIG. 28, the projection 197 is shown large for illustration. It is actually a very small projection. An inner diameter of the concave portion 192 is set to a dimension for inserting the sleeve 142 with a minimum gap. An outer diameter of the insertion portion 194 is also set to a dimension to be inserted into the hole 190 with a minimum gap.

When the sleeve 142 is fixed to the container main body 12A, the insertion portion 194 of the sleeve 142 is inserted into the hole 190 of the container main body 12A, and the abutting portion 196 of the sleeve 142 is buried in the concave portion 192. Before long, the abutting portion 196 (actually projection 197) of the sleeve 142 is abutted on the flat surface 193 of the bottom of the concave portion 192. At this time, the flat surface 193 is parallel to the tangent line of the inner diameter of the container main body 12A, and the abutting portion 196 is orthogonal to the axial direction of the sleeve 142. Thus, at a point of time when the abutting portion 196 is abutted on the flat surface 193, the sleeve 142 is set perpendicular to the inner diameter of the container main body 12A (state where it is positioned on a straight line extended in a radial direction from the center of the container main body 12A, and protruded from an outer surface). Especially, since the outer surface of the sleeve 142 around the abutting portion 196 is held on the inner surface of the concave portion 192, it is easier to secure perpendicularity of the sleeve 142.

In this state, the projection 197 is welded by a welding tool, and the sleeve 142 is projection-welded to the container main body 12A. This constitution makes it possible to accurately maintain perpendicularity of the sleeve 142 (similar in 141, 143 and 144) with respect to the inner diameter of the container main body 12A without using any fixtures.

In the sleeve 141 thus attached, one end of a refrigerant introduction tube 92 (refrigerant tube, second refrigerant introduction tube) for introducing refrigerant gas to the upper cylinder 38 is inserted and connected. One end of the refrigerant introduction tube 92 is communicated with the suction passage 58 of the upper cylinder 38. The refrigerant introduction tube 92 is passed through the upper side of the hermetically sealed container 12 (thus, refrigerant introduction tube 92 is positioned outside the hermetically sealed container 12) to reach the sleeve 144, and the other end is inserted and connected to the sleeve 144, and communicated with the inside of the hermetically sealed container 12.

In the sleeve 142, one end of a refrigerant introduction tube 94 (refrigerant tube, first refrigerant introduction tube) for introducing refrigerant gas to the lower cylinder 40 is inserted and connected. One end of the refrigerant introduction tube 94 is communicated with the suction passage 60 of the lower cylinder 40. Then, the other end of the refrigerant introduction tube 94 is connected to a lower end of an accumulator 146. A refrigerant discharge tube 96 is inserted and connected to the sleeve 143, and one end of this refrigerant discharge tube 96 is communicated with the discharge muffler chamber 62.

The accumulator 146 is a tank for separating gas and liquid of a sucked refrigerant, attached through an accumulator side bracket 148 to a bracket 147 of the hermetically sealed container side welded to the upper side face of the container main body 12A of the hermetically sealed container 12, and positioned above the sleeves 141 and 142. Both sides of the lower end of the bracket 148 is fixed to the bracket 147 by a screw 181, extended upward from the bracket 147, and hold a rough center of the accumulator 146 in upper and lower directions by a band 182 attached to both sides of the upper end by a screw 183. In this case, the accumulator 148 may be fixed to the bracket 148 by welding. In this state, the accumulator 146 is arranged along the side of the hermetically sealed container 12.

As described above, the accumulator 146 is attached through the brackets 147 and 148 to the main body 12A of the hermetically sealed container 12. Accordingly, even when a capacity of the accumulator 146 is increased, and upper and lower dimensions are increased, only by increasing (changing) the upper and lower dimensions of the bracket 148, without changing the bracket 147, a lower end position of the accumulator 146 can be lifted while a rough center thereof is maintained. Therefore, interference with the lower refrigerant introduction tube 92 becomes difficult.

The bracket 147 becomes a hook for placing a hanger of a manufacturing device during painting of the hermetically sealed container 12. However, because of the foregoing constitution, changing of this hanger is made unnecessary. Even when a change occurs in the capacity of the accumulator 146, only by changing the bracket 148 as described above, the bracket 148 is attached to its rough center (or rough position of a center of gravity, or in the vicinity thereof). On this position, the accumulator 146 can be held, making it possible to prevent an increase in noise by vibration.

Figure 3:
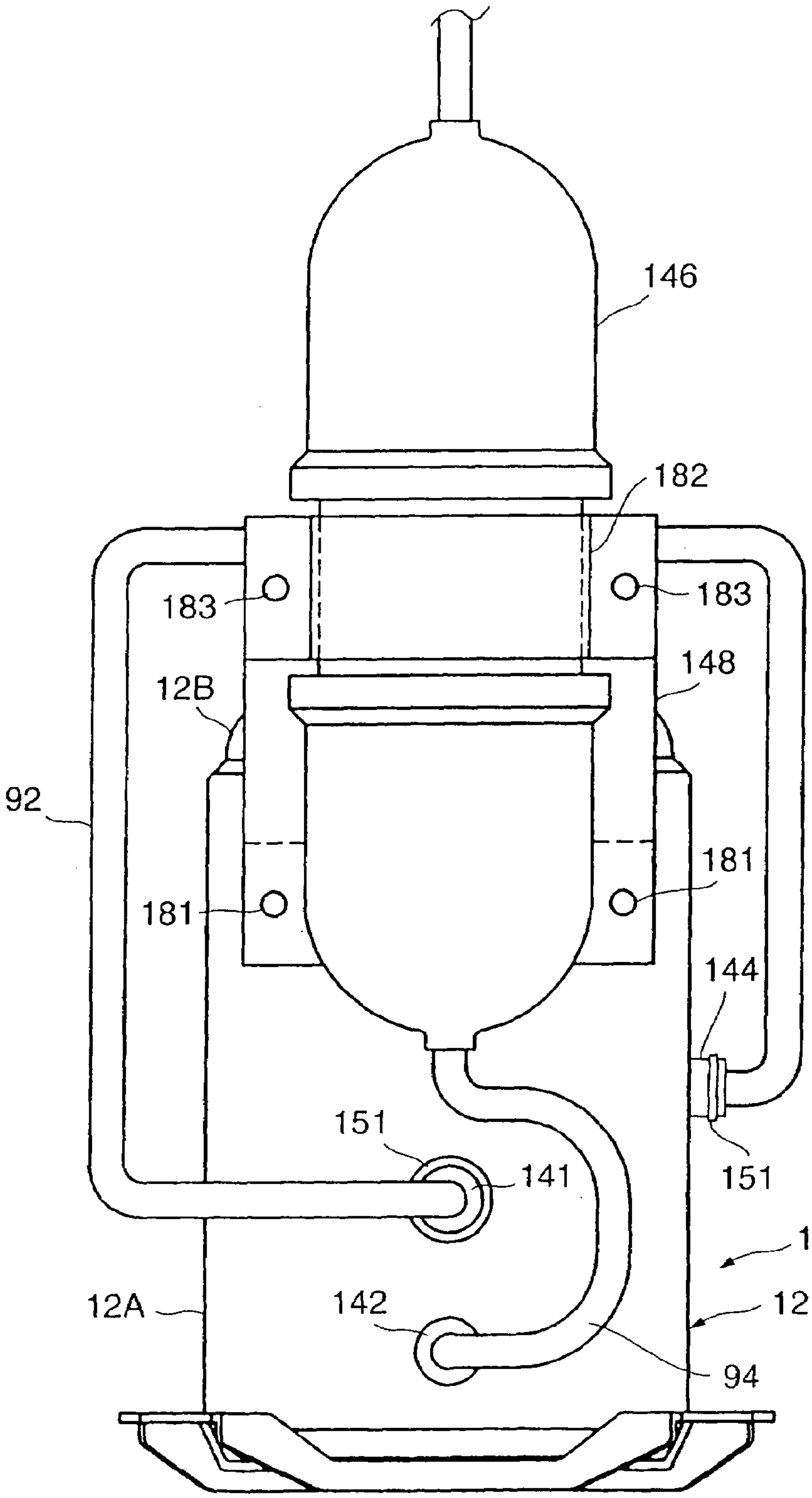
FIG. 3 is a side view of the rotary compressor shown in FIG. 1.

On the other hand, after the refrigerant introduction tube 92 is out of the sleeve 141 as shown in FIG. 3, in the embodiment, it is bent right and raised. The lower end of the accumulator 146 is lowered to a position near the refrigerant introduction tube 92. Accordingly, the refrigerant introduction tube 94 lowered from the lower end of the accumulator 146 is laid out to detour left opposite the bending direction of the refrigerant introduction tube 92 when seen from the sleeve 141 to reach the sleeve 142.

That is, the refrigerant introduction tubes 92 and 94 respectively communicated with the suction passages 58 and 60 of the upper and lower support members 38 and 40 are laid out to be bent in opposing directions (directions different by 180°) on a horizontal plane seen from the hermetically sealed container 12. Thus, even when the upper and lower dimensions of the accumulator 146 are enlarged to increase its capacity, or the attaching position is lowered to bring its lower end close to the refrigerant introduction tube 92, no interferences occur between the refrigerant introduction tubes 92 and 94.

Figure 21:
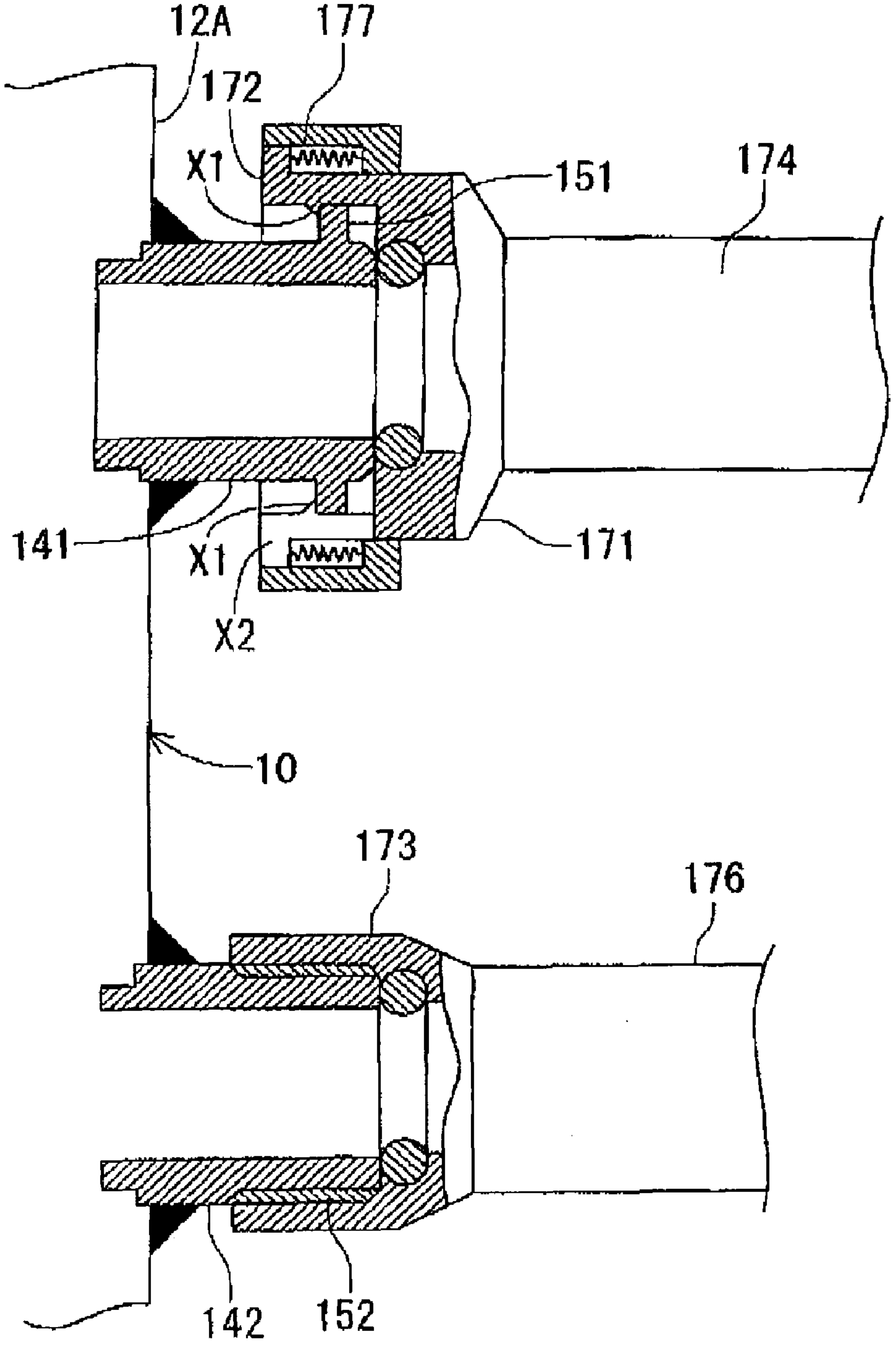
FIG. 21 is a sectional view illustrating a state where a coupler and a connector of a pipe for airtightness testing are connected to a sleeve of the rotary compressor shown in FIG. 1.
Figure 23:
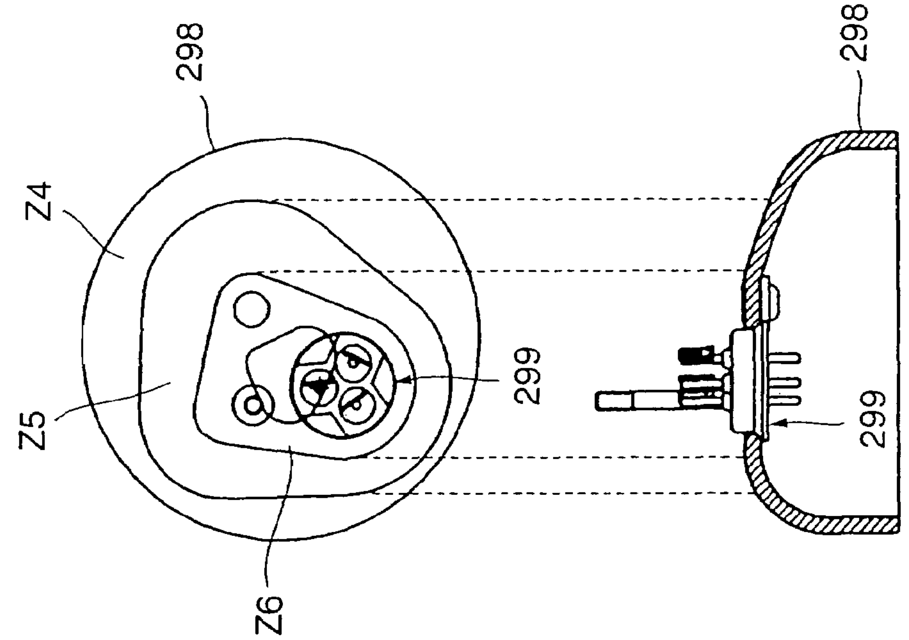
FIG. 23 is a view showing a relation of deformation amounts between a terminal portion and an end cap of the conventional rotary compressor.

A flange 151 is formed around an outer surface of each of the sleeves 141, 143 and 144, and a screw groove 152 is formed around an outer surface of the sleeve 142. An engaging portion 172 of a coupler 171 for pipe connection similar to that shown in FIG. 21 is detachably engaged with the flange 151, and a connector 173 for pipe connection is fixed by a screw to the screw groove 152.

The engaging portion 172 of the coupler 171 is always pressed outside in a running-off direction and an operation portion 177 having flexibility is positioned its outside. The engaging portion 172 pushes away the operation portion 177 to run off outside by pushing in the coupler 171 to cover the sleeve 141, and then engaged with the container main body 12A side of the flange 151. By moving the operation portion 177 in a direction away from the main body 12A, the engaging portion 172 runs off outside to disengage the coupler 171 from the sleeve 141.

The coupler 171 is attached to a tip of a pipe 174 from a not-shown compressed air generator. The connector 173 is similarly attached to a tip of a pipe 176 from the compressed air generator. When completion inspection is carried out in the manufacturing process of the rotary compressor 10, the coupler 171 is engaged and connected to each of the sleeves 141, 143 and 144, and the connector 173 is screwed in, and connected to the sleeve 142. Then, an airtightness test is carried out by applying compressed air of about 10 MPa from the compressed air generator into the hermetically sealed container 12.

Thus, since the pipes 174 and 176 from the compressed air generator can be easily connected by using the coupler 171 and the connector 173, the airtightness test can be finished within a short time. Especially, in the case of the upper and lower sleeves 141 and 142 adjacent to each other, the flange 151 is formed in the sleeve 141, and the screw groove 152 is formed in the sleeve 142, thereby eliminating a state where two couplers 171 larger in dimension compared with the connector 173 are attached adjacently to each other. Thus, even when a space between the sleeves 141 and 142 is narrow, it is possible to connect the pipes 174 and 176 to the sleeves 141 and 142 by using the narrow space.

Figure 2:
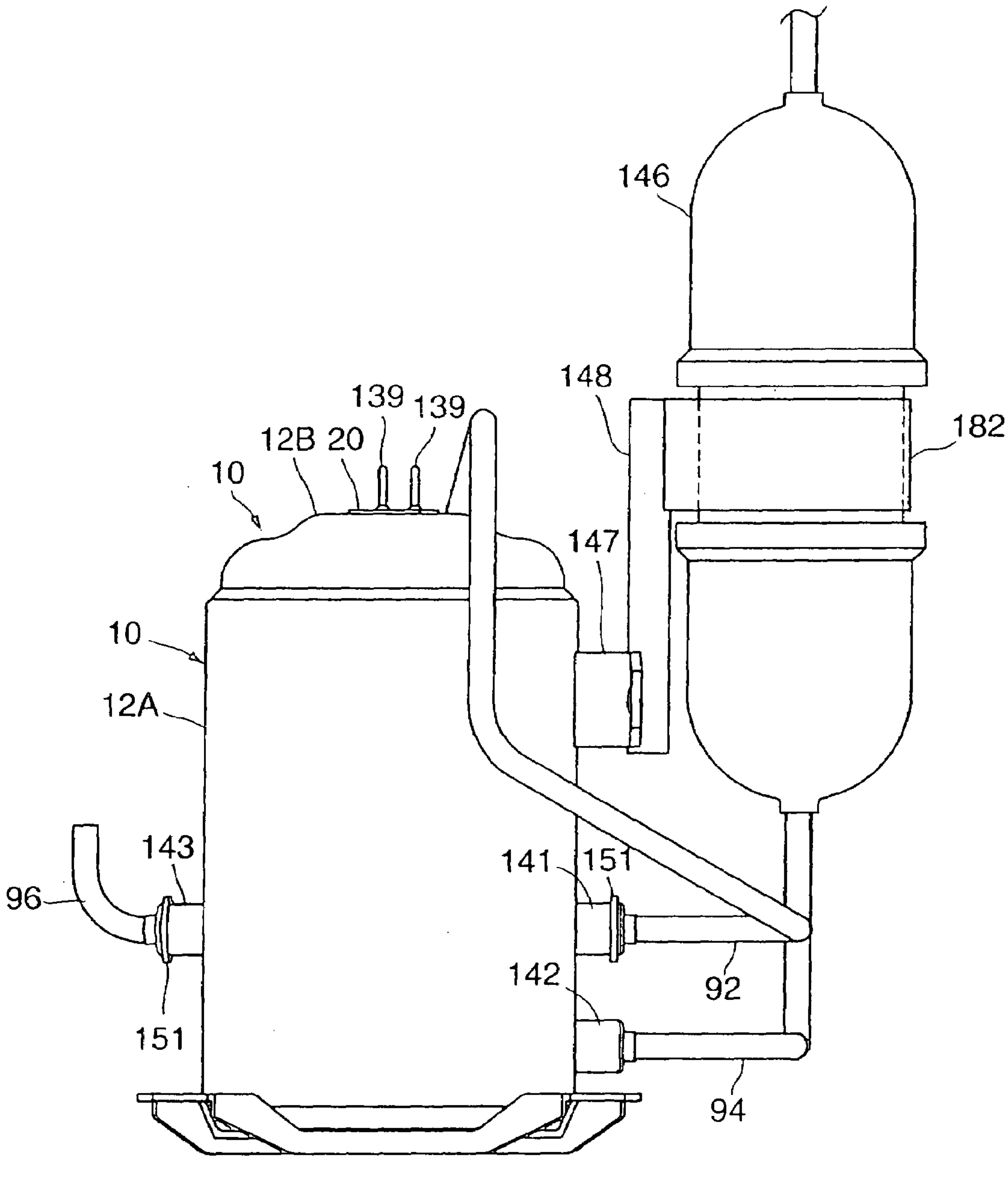
FIG. 2 is a front view of the rotary compressor shown in FIG. 1.
Figure 18:
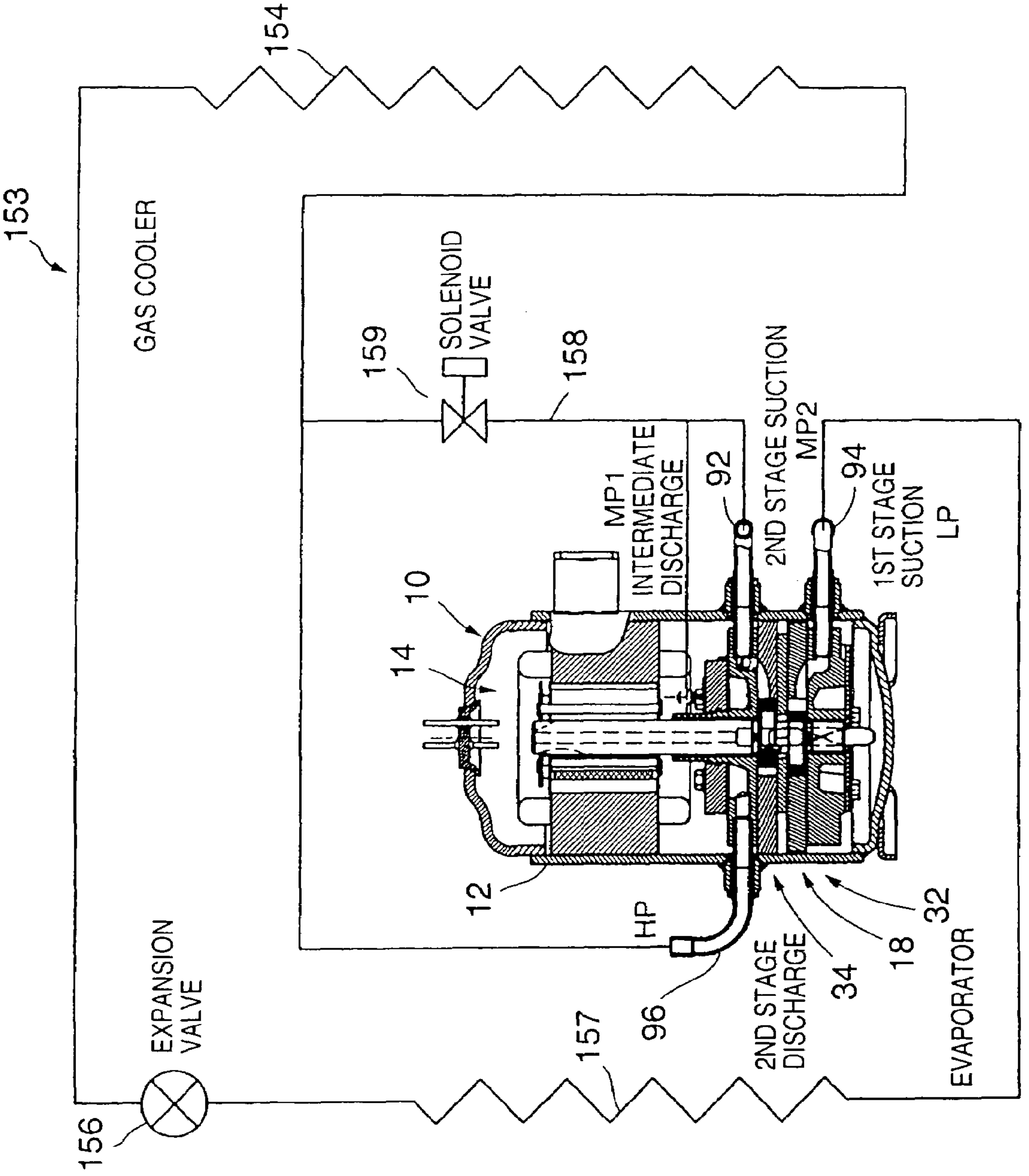
FIG. 18 is a refrigerant circuit diaphragm of a water heater, to which the rotary compressor of FIG. 1 is applied.

FIG. 18 shows a refrigerant circuit of a water heater 153 of the embodiment, to which the present invention is applied. The rotary compressor 10 of the embodiment is used for the refrigerant circuit of the water heater 153 shown in FIG. 18. That is, a refrigerant discharge tube 96 of the rotary compressor 10 is connected to an inlet of a gas cooler 154 for heating water. This gas cooler 154 is provided in a not-shown hot water tank of the water heater 153. A pipe from the gas cooler 154 is passed through an expansion valve 156 as a pressure reducing device to reach an inlet of an evaporator 157, and an outlet of the evaporator 157 is connected to the refrigerant introduction tube 94. From the midway of the refrigerant introduction tube 92, a defrost tube 158 constituting a defroster circuit, not shown in FIGS. 2 and 3, is branched, and connected through a solenoid valve 159 as a flow path controller to the refrigerant discharge tube 96 reaching an inlet of the gas cooler 154. In FIG. 18, the accumulator 146 is omitted.

Now, description is made of an operation in the foregoing constitution. It is assumed that the solenoid valve 159 is closed in running by heating. When power is supplied to the stator coil 28 of the electric element 14 through a terminal 20 and a not-shown wire, the electric element 14 is actuated to rotate the rotor 24. This rotation causes the upper and lower rollers 46 and 48 engaged with the upper and lower eccentric portions 42 and 44 provided integrally with the rotary shaft 16 to be eccentrically rotated in the upper and lower cylinders 38 and 40.

Accordingly, lower pressure (1st stage suction pressure LP: 4 MPaG) refrigerant gas sucked from the suction port 162 through the refrigerant introduction tube 94 and the suction passage 60 formed in the lower support member 56 to the low pressure chamber side of the lower cylinder 40 is compressed to intermediate pressure (MP1: 8 MPaG) by operations of the roller 48 and the vane. Then, it is passed from the high pressure chamber side of the lower cylinder 40 through the discharge port and the discharge passage 41, then passed from the discharge muffler chamber 64 formed in the lower support member 56 through the communication passage 63, and discharged from an intermediate discharge tube 121 into the hermetically sealed container 12.

At this time, the intermediate discharge tube 121 is directed to a gap between the adjacent stator coils 28 and 28 wound on the stator 22 of the upper electric element 14. Accordingly, refrigerant gas still relatively low in temperature can be actively supplied toward the electric element 14, suppressing a temperature increase of the electric element 14. Thus, intermediate pressure (MP1) is set in the hermetically sealed container 12.

The refrigerant gas of intermediate pressure in the hermetically sealed container 12 is passed out from the sleeve 144 (intermediate discharge pressure is MP1) through the refrigerant introduction tube 92 and the suction passage 58 formed in the upper support member 54, and sucked from the suction port 161 to the low pressure chamber side LR of the upper cylinder 38 (2nd stage suction pressure MP2). The sucked refrigerant gas of intermediate pressure is subjected to 2nd stage compression by operations of the roller 46 and the vane 50 to become refrigerant gas of high temperature and high pressure (2nd stage discharge pressure HP: 12 MPaG), passed from the high pressure chamber side through the discharge port 184 and the discharge passage 39, through the discharge muffler chamber 62 framed in the upper support member 54, and the refrigerant discharge tube 96 into the gas cooler 154. At this time, a refrigerant temperature has been increased to about +100° C., heat is radiated from the refrigerant gas of high temperature and high pressure by the gas cooler 154, and water in the hot water tank is heated to generate hot water of about +90° C.

On the other hand, the refrigerant itself is cooled at the gas cooler 154, and discharged from the gas cooler 154. Then, after pressure reduction at the expansion valve 156, the refrigerant flows into the evaporator 157 to evaporate (heat is absorbed from surroundings at this time), passed through the accumulator 146 (not shown in FIG. 18), and sucked from the refrigerant introduction tube 94 into the first rotary compression element 32. This cycle is repeated.

Especially, in an environment of a low outside temperature, frost is grown in the evaporator 157 in running by heating. In such a case, the solenoid valve 159 is opened, the expansion valve 156 is fully opened, and defrosting running of the evaporator 157 is carried out. Thus, a refrigerant of intermediate pressure in the hermetically sealed container 12 (including a small amount of high pressure refrigerant discharged from the second rotary compression element 34) is passed through the defrost tube 158 to reach the gas cooler 154. A temperature of this refrigerant is +50 to +60° C., no heat is radiated from the gas cooler 154 and, conversely, heat is absorbed by the refrigerant initially. Then, the refrigerant from the gas cooler 154 is passed through the expansion valve 156 to reach the evaporator 157. That is, the refrigerant of roughly intermediate pressure and relatively high temperature is supplied without any pressure reductions to the evaporator 157 substantially directly. Accordingly, the evaporator 157 is heated, and defrosted. In this case, from the gas cooler 154, heat of hot water is carried by the refrigerant to the evaporator 157.

Here, if a high pressure refrigerant discharged from the second rotary compression element 34 is supplied to the evaporator 157 without being pressure-reduced, and the evaporator 157 is defrosted, suction pressure of the first rotary compression element 32 is increased because of the fully opened expansion valve 156. Accordingly, discharge pressure (intermediate pressure) of the first rotary compression element 32 becomes high. This refrigerant is discharged through the second rotary compression element 34. However, the fully opened expansion valve 156 causes discharge pressure of the second rotary compression element 34 to be similar to the suction pressure of the first rotary compression element 32, generating a reversal phenomenon in pressure between the discharge (high pressure) and the suction (intermediate pressure) of the second rotary compression element 34. However, since the refrigerant gas of intermediate pressure discharged from the first rotary compression element 32 is taken out from the hermetically sealed container 12 to defrost the evaporator 157 as described above, it is possible to prevent a reversal phenomenon between the high pressure and the intermediate pressure.

Figure 33:
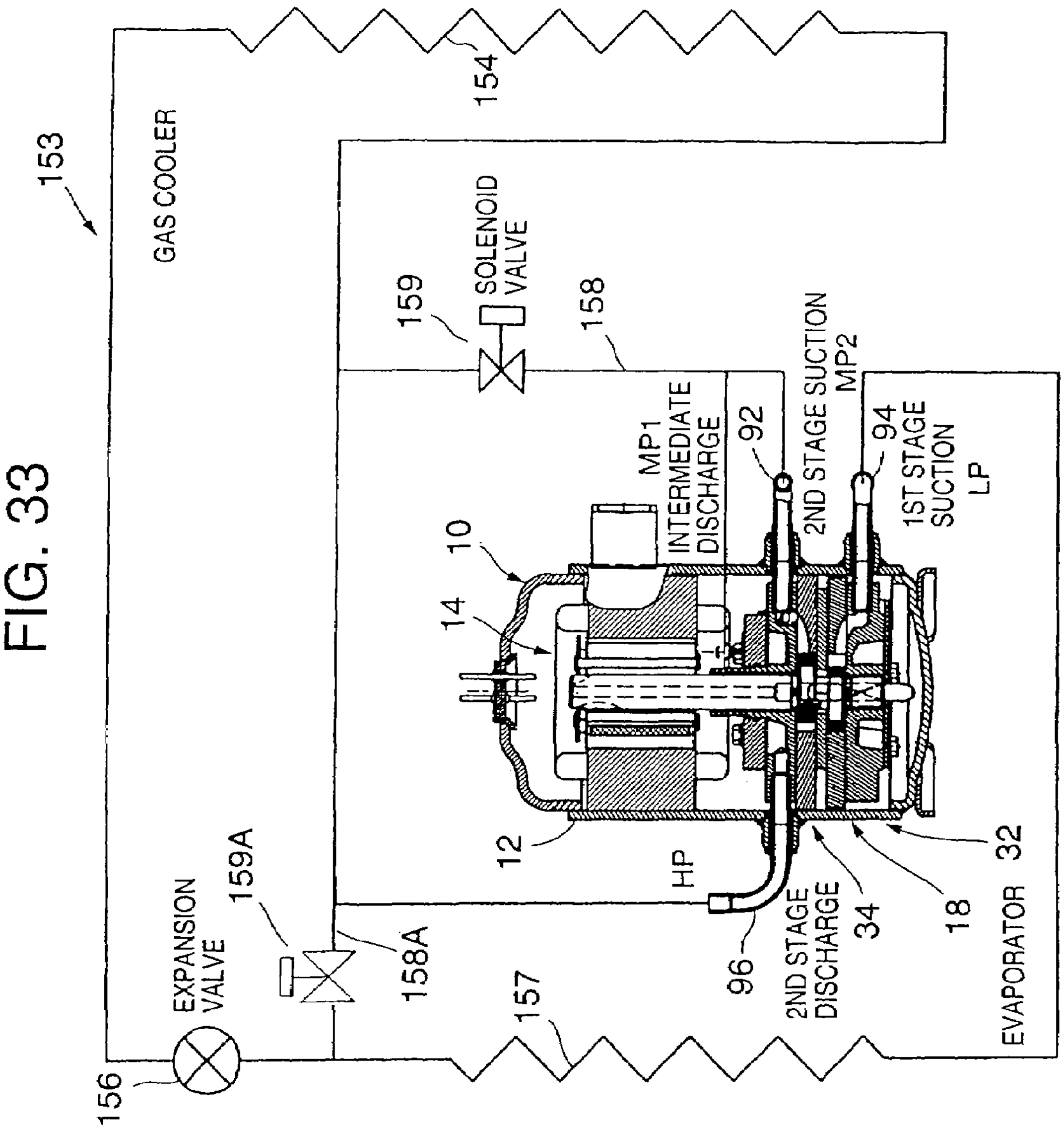
FIG. 33 is a refrigerant circuit diagram of a water heater of another embodiment, to which the present invention is applied.

FIG. 33 shows another refrigerant circuit of the water heater 153, to which the present invention is applied. In the drawings, components denoted by reference numerals similar to those of FIG. 18 operate similarly or identically. In this case, added to the refrigerant circuit of FIG. 18, another defrost tube 158A is provided for communicating the refrigerant discharge tube 96 with the expansion valve 156 and the evaporator 157. Another solenoid valve 159A is provided in this defrost tube 158A.

Thus, in running by heating, an operation is similar to the foregoing because the solenoid valves 159 and 159A are both closed. On the other hand, during defrosting of the evaporator 157, the solenoid valves 159 and 159A are both opened. Then, a refrigerant of intermediate pressure in the hermetically sealed container 12, and a small amount of high pressure refrigerant discharged from the second rotary compression element 34 are passed through the defrost tubes 158 and 158A to flow to a downstream side of the expansion valve 156, and then directly flow into the evaporator 157 without pressure-reduced. This constitution also prevents pressure reversal in the second rotary compression element 34.

Figure 34:
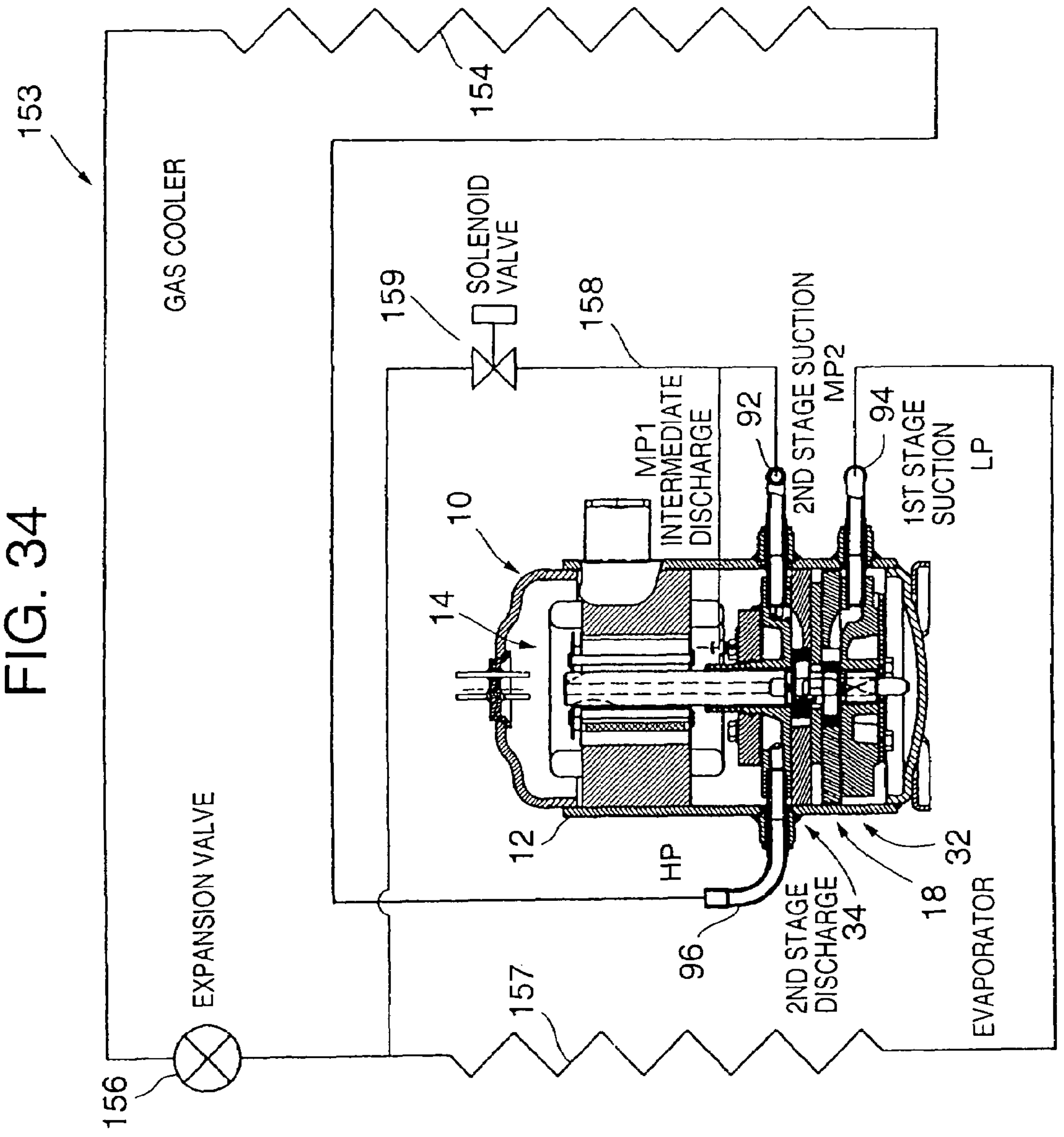
FIG. 34 is a refrigerant circuit diagram of a water heater of yet another embodiment, to which the present invention is applied.

FIG. 34 shows yet another refrigerant circuit of the water heater 153. In this case, components denoted by reference numerals similar to those of FIG. 18 operate similarly or identically. In the described case, the defrost tube 158 of FIG. 18 is not connected to the inlet of the gas cooler 154, but connected to a pipe between the expansion valve 156 and the evaporator 157. According to this constitution, when the solenoid valve 159 is opened, as in the case of FIG. 33, a refrigerant of intermediate pressure in the hermetically sealed container 12 flows to a downstream side of the expansion valve 156, and then directly flows into the evaporator 157 without being pressure-reduced. Thus, no pressure reversal occurs in the second rotary compression element 34, which otherwise occurs during defrosting, and the number of solenoid valves can be advantageously reduced compared with that of FIG. 33.

Figure 19:
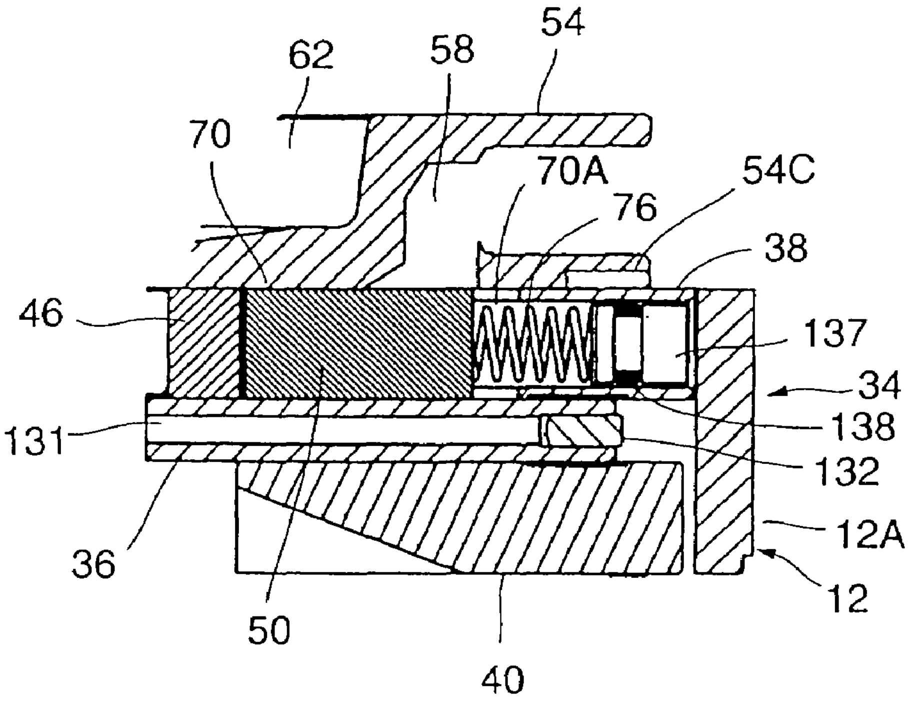
FIG. 19 is a sectional view showing a plug inserted into a housing portion.
Figure 20:
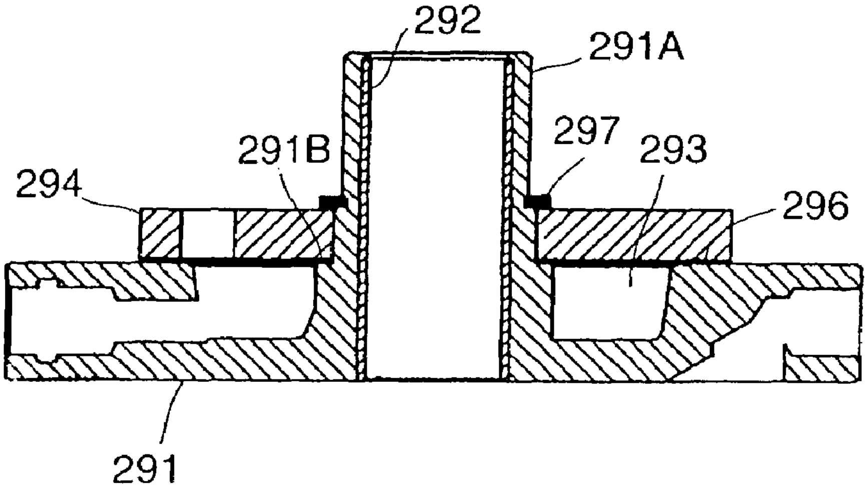
FIG. 20 is a sectional view showing a support member and a cover of a second rotary compression element of a conventional rotary compressor.

In the foregoing embodiment, the plug 137 was inserted into the housing portion 70A to fill in the gap. However, even in the case of pressing the plug 137 into the housing portion 70A, by forming a roll off 54C concaved in a direction away from the upper cylinder 38 on the upper support member 54 of a part corresponding to the plug 137 as shown in FIG. 19, deformation of the upper cylinder 38 following the pressing-in of the plug is absorbed by the roll off 54C, thereby preventing deterioration of sealing.

In the embodiment, the upper and lower sleeves 141 and 142 were adjacently provided for the vertical rotary compressor. However, the arrangement also includes adjacent installation of both sleeves left and right as in the case of a horizontal rotary compressor. In this case, the refrigerant introduction tubes 92 and 94 are laid out in opposing directions, for example in upper and lower sides, or on left and right sides.

In the embodiment, the refrigerant gas of intermediate pressure compressed by the first rotary compression element 32 was discharged into the hermetically sealed container 12. However, the present invention is not limited to this, and the refrigerant gas discharged from the first rotary compression element 32 may be caused to flow directly into the refrigerant introduction tube 92 without being discharged into the hermetically sealed container 12, and be sucked into the second rotary compression element 34.

Further, in the embodiment, the refrigerant introduction tube 92 of the second rotary compression element 34, and the refrigerant introduction tube 94 of the first rotary compression element 32 were provided adjacently to each other in the upper and lower sides. However, the present invention is not limited to this, and the refrigerant discharge tube 96 of the second rotary compression element 34, and the refrigerant introduction tube 94 of the first rotary compression element 32 may be provided adjacently to each other in upper and lower sides. In such a case, the refrigerant discharge tube 96 and the refrigerant introduction tube 94 are laid out in opposing directions from the hermetically sealed container 12.

Figure 26:
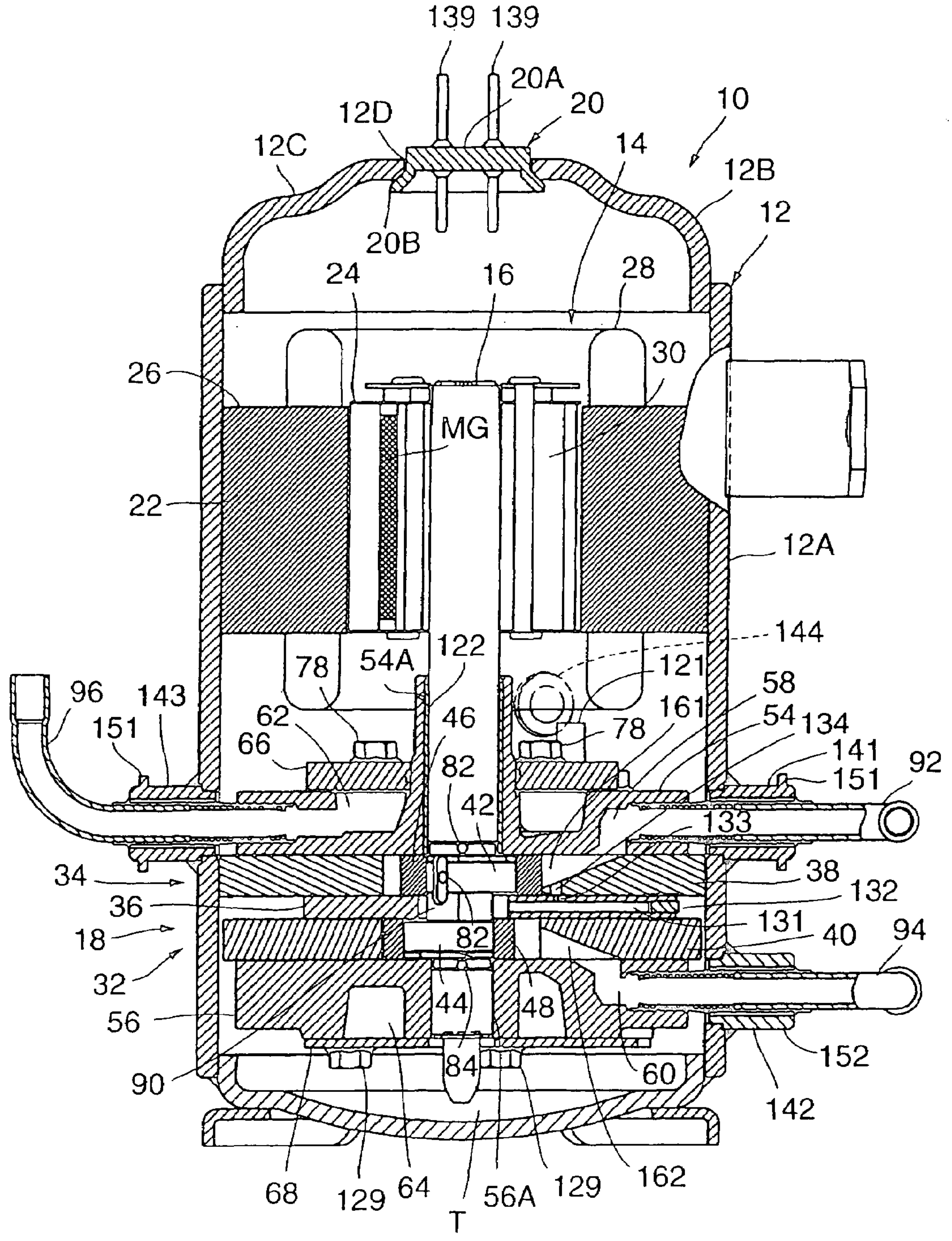
FIG. 26 is a vertical sectional view of a rotary compressor according to another embodiment of the present invention.

FIG. 26 shows in section another rotary compressor 10 of the present invention. Also in this case, a bearing 54A as a long bearing is erected on a center of an upper support member 54 (second support member) so as to be protruded toward an electric element 14. A cylindrical bush 122 is fixed to an inner surface of this bearing 154A. The bush 122 is provided between a rotary shaft 16 and the bearing 54A, and an inner surface of the bush 122 is in contact with the rotary shaft 16 so as to freely slide. The bush 122 is made of a carbon material having high wear resistance, which can maintain a good sliding characteristic even in a situation of insufficient oil supply.

On the other hand, on a center of a lower support member 56, a bearing 56A shorter compared with the bearing 54A is formed through. No bushes are fixed to an inner surface of the bearing 56A, and the inner surface of the bearing 56A is directly abutted on the rotary shaft 16 so as to freely slide. Thus, the rotary shaft 16 is held on the bearing 54A of the upper support member 54 through the bush 122 on the electric element 14 side (upper side) of a rotary compression mechanism unit 18. On the opposite side (lower side) of the electric element 14, it is directly held on the bearing 56A of the lower support member 56. In the drawing, a reference numeral T denotes an oil reservoir.

In running of the rotary compressor 10 thus constructed, the rotary shaft 16 below an eccentric portion 44 is rotated while sliding in the bearing 56A of the lower support member 56. However, since pressure in a cylinder 40 of the first rotary compression element 32 at a 1st stage is equal to/lower than intermediate pressure in the hermetically sealed compressor 12, oil can smoothly enter between the bearing 56A and the rotary shaft 16 from the oil reservoir T, causing no sliding problems.

On the other hand, pressure in a cylinder 38 of the second rotary compression element 34 at a 2nd stage becomes higher than that in the hermetically sealed container 12. Consequently, because of a pressure difference, it is difficult for oil to enter the bearing 54A of the upper support member 54, in which the rotary shaft 16 above an eccentric portion 42 is rotated while sliding. However, in the bearing 54A, since the rotary shaft 16 is rotated while sliding in the carbon bush 122 provided inside, no sliding problems occur.

Therefore, no bush is disposed in the bearing 56A as described above, and hence, the relatively expensive bush can be omitted, which makes it possible to reduce a cost of the parts.

Figure 27:
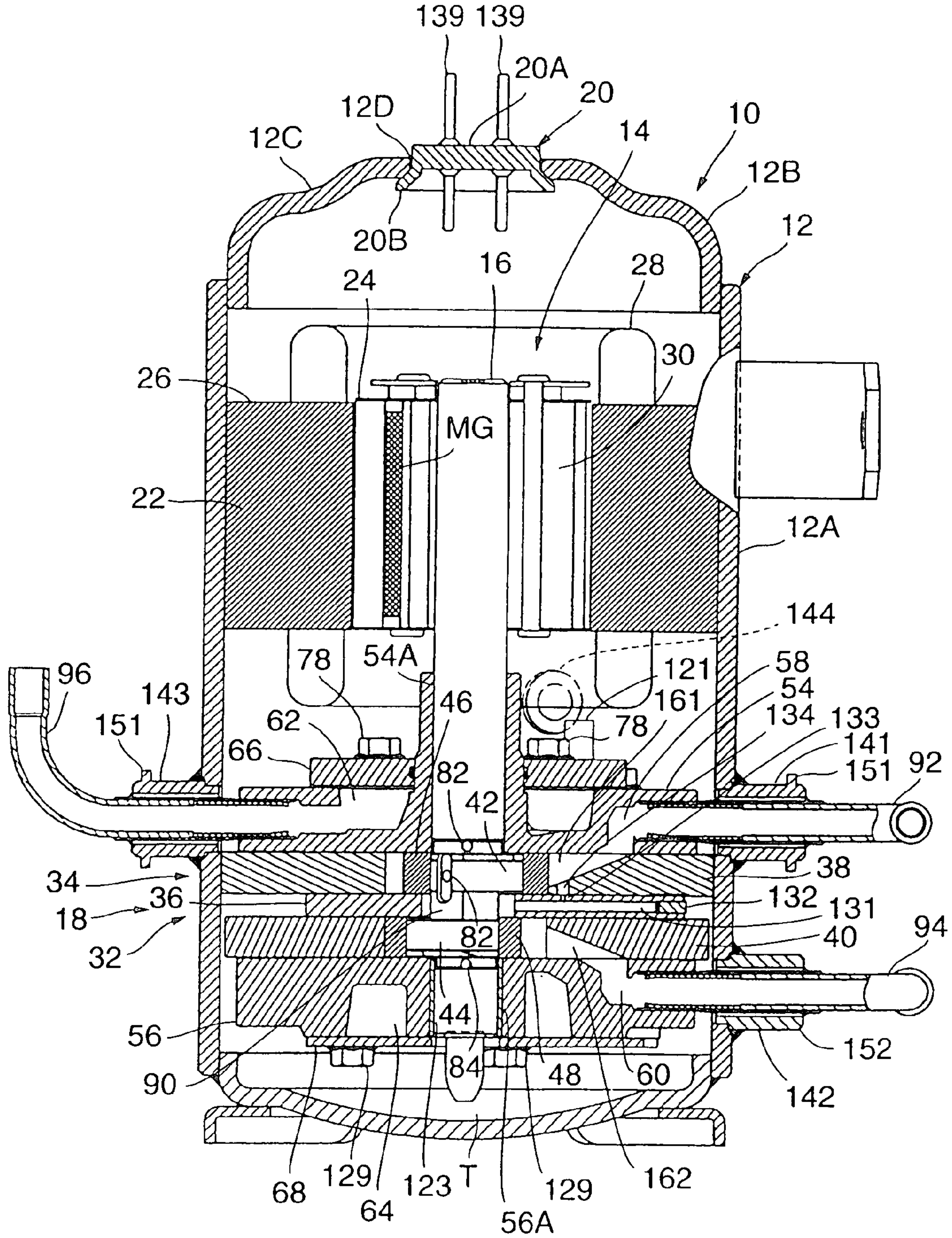
FIG. 27 is a vertical sectional view of a rotary compressor according to yet another embodiment of the present invention.

In the embodiment of FIG. 26, for the purpose of reducing costs, the bush 122 was provided in the bearing 54A, but no bushes were provided in the bearing 56A. However, depending on suction/discharge pressure of each compression element, as shown in FIG. 27, a carbon bush 123 may be conversely provided in the bearing 56A, and placed between the bearing 56A and the rotary shaft 16, but no bushes may be provided in the bearing 54A.

The described constitution enables sliding performance to be maintained in the bearing 56A as a short bearing, in which a pressure receiving area is small, and a load applied per unit area is large, and the bush to be removed from the bearing 54A while maintaining durability performance, in which a pressure receiving area is large, and a load applied per unit area is relatively small. Thus, it is possible to reduce costs.

At this time, it may be advisable to prevent falling-off of the bush 123 by setting an inner diameter of a lower cover 68 smaller than that of the lower support member 56, and holding a lower edge of the bush 123 by the lower cover 68.

Figure 35:
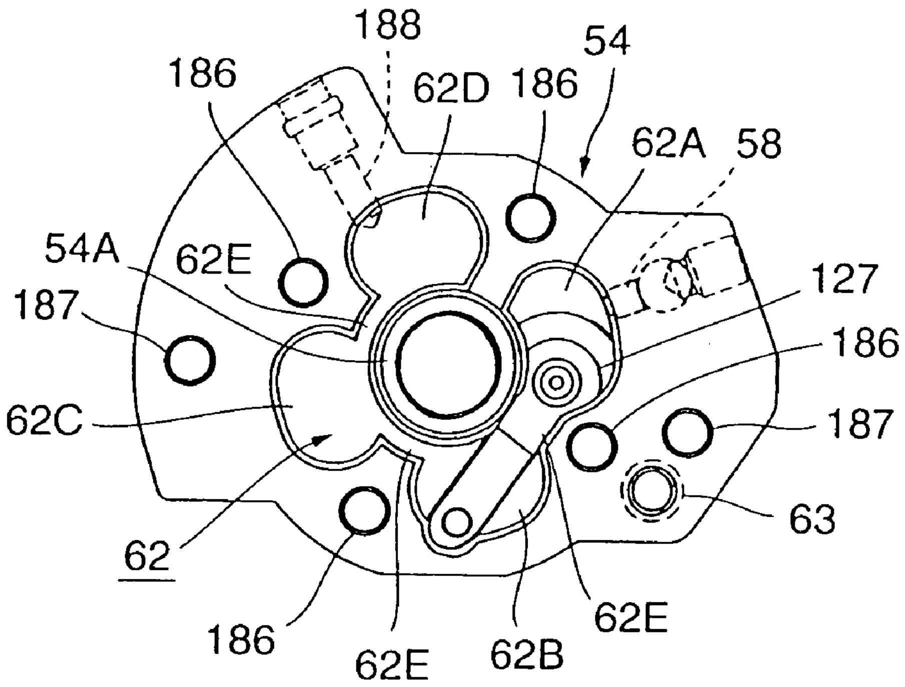
FIG. 35 is an upper view of an upper support member of a rotary compressor according to another embodiment of the present invention.
Figure 36:
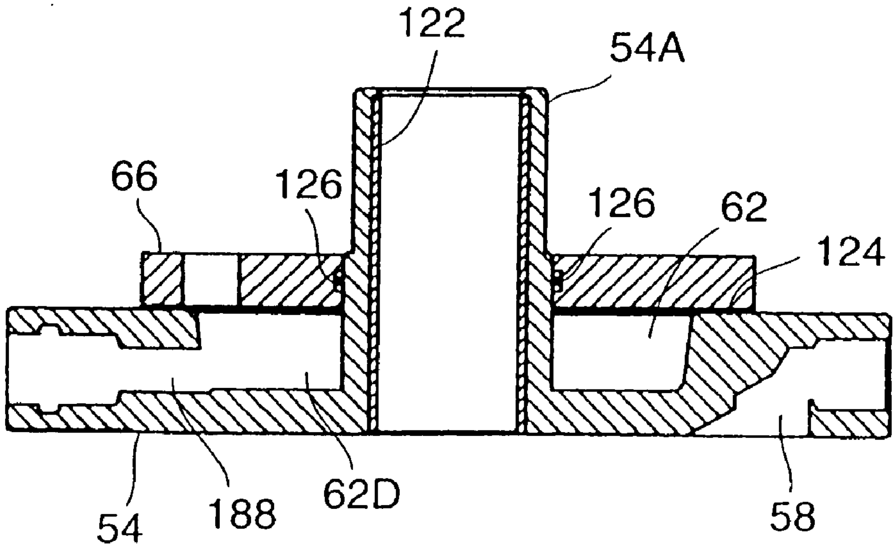
FIG. 36 is a sectional view of the upper support member and an upper cover of FIG. 35.

Each of FIGS. 35 and 36 shows another embodiment of the upper support member 54. FIG. 35 shows an upper surface of the upper support member 54, in which a reference numeral 186 denotes a hole for inserting the main bolt 78. The holes are formed on four places or the like outside the bearing 54A at intervals of 90°. A reference numeral 187 denotes a hole for inserting the auxiliary bolt 136. The holes are formed on two places outside the holes 186 . . . .

In the embodiment, a discharge muffler chamber 62 includes four vided chambers 62A, 62B, 62C and 62D, and narrow passages 62E . . . (3 places) for communicating the divided chambers 62A to 62D with one another. In other words, the divided chambers 62A and 62B, 62B and 62C, and 62C and 62D are respectively communicated through the passages 62E, but no passages are present between the divided chambers 62A and 62D.

The divided chambers 62A to 62D, and the passages 62E . . . arranged outside the bearing.54A to surround the same. The divided chambers 62A to 62S are respectively arranged between the adjacent holes 186 and 186, and the passages 62E . . . are arranged on the bearing 54A side of the holes 186 . . . . Then, the discharge passage 39 is opened in the divided chamber 62A positioned on one end, and a discharge valve 127 is housed in a form of being passed from the divided chamber 62B through the passage 62E to the divided chamber 62A. A refrigerant passage 188 (refrigerant flow-out portion) formed in the upper support member 54 is opened in the divided chamber 62D positioned on the other end. This refrigerant passage 188 is communicated with the refrigerant discharge tube 96.

Because of the above arrangement of the divided chambers 62A to 62D of the discharge muffler chamber 62, and the passages 62E . . . , each of the divided chambers 62A to 62D is positioned between the main bolts 78 and 78, and the passage 62E is positioned on the bearing 54A side of the main bolt 78. Thus, by efficiently using spaces other than the main bolts 78 . . . , it is possible to form the divided chambers 62A to 62D of the discharge muffler chamber 62, and the narrow passages 62E . . . .

Then, from a high pressure chamber side of the upper cylinder, a refrigerant is discharged through the discharge passage 39 into the divided chamber 62A of the discharge muffler chamber 62 formed in the upper support member 54. The high pressure refrigerant gas that has flowed into the divided chamber 62A is passed out from the divided chamber 62A, and enters through the narrow passage 62E to the next divided chamber 62B. Then, it is discharged from the divided chamber 62B, and enter through the passage 62E to the next divided chamber 62C. Further, the refrigerant gas is discharged from the divided chamber 62C, and lastly enter through the passage 62E to the divided chamber 62D. Then, it goes out from the divided chamber 62D to enter the refrigerant passage 188, then passed through the refrigerant tube 96 to enter the gas cooler 154.

As described above, in the structure of the embodiment, the high pressure refrigerant gas compressed in the upper cylinder 38 and supplied through the discharge passage 39 into the discharge muffler chamber 62 is passed through the plurality of divided chambers 62A to 62D and the narrow passages 62E . . . one after another, and goes out from the refrigerant passage 188. Thus, pulsation of the refrigerant gas is effectively absorbed during the passage through the divided chambers 62A to 62D and the narrow passages 62E, making it possible to effectively suppress noise and vibration of the rotary compressor 10.

As discussed above in detail, according to the present invention, the rotary compressor comprises the electric element, the rotary compression element driven by the electric element, both components being provided in the hermetically sealed container, the cylinder constituting the rotary compression element, the roller engaged with the eccentric portion formed in the rotary shaft of the electric element, and eccentrically rotated in the cylinder, the vane abutted on the roller to divide the inside of the cylinder into the low pressure chamber side and the high pressure chamber side, the spring member for always pressing the vane to the roller side, the housing portion of the spring member, formed in the cylinder, and opened to the vane side and the hermetically sealed container side, the plug positioned in the hermetically sealed container side of the spring member, and inserted into the housing portion to fit into a gap, and the O ring attached around the plug to seal a part between the plug and the housing portion. Thus, it is possible to prevent inconvenience of performance deterioration caused by a reduction made in sealing by cylinder deformation, which occurs in the case of pressing in, and fixing the plug in the housing portion.

Even if the plug is inserted to fit into the gap, since the space between the cylinder and the hermetically sealed container is set smaller than the distance from the O ring to the end of the plug on the hermetically sealed container side, at a point of time when the plug is moved in a direction of being extruded from the housing portion, and abutted on the hermetically sealed container to be prevented from being moved, the O ring is still positioned in the housing portion for sealing. Thus, no problems occur in a plug function.

Especially, the invention is remarkably advantageous in a rotary compressor of a multistage compression type having an inside of a hermetically sealed container set to intermediate pressure in that compressor performance is maintained and a spring member is prevented from being pulled out when $CO_2$ gas is used as a refrigerant, intermediate pressure is set in the hermetically sealed container, and pressure in a second rotary compression element becomes extremely high.

According to the present invention, the rotary compressor comprises the electric element, the rotary compression element driven by the electric element, both components being provided in a hermetically sealed container, the cylinder constituting the rotary compression element, the roller engaged with the eccentric portion formed in the rotary shaft of the electric element, and eccentrically rotated in the cylinder, the support member adapted to seal the opening surface of the cylinder, and provided with the bearing of the rotary shaft, the vane abutted on the roller to divide the inside of the cylinder into the low pressure chamber side and the high pressure chamber side, the spring member for always pressing the vane to the roller side, the housing portion of the spring member, formed in the cylinder, and opened to the vane side and the hermetically sealed container side, and the plug positioned in the hermetically sealed container side of the spring member, and pressed into and fixed in the housing portion. The support member of a part corresponding to the plug includes the roll off concaved in a direction away from the cylinder. Thus, even if the pressing of the plug into the housing portion deforms the cylinder to swell to the support member side, the deformation of the cylinder is absorbed by the roll off, making it possible to prevent inconvenience of a gap formed between the cylinder and the support member. Therefore, it is possible to prevent inconvenience of performance deterioration caused by a reduction made in sealing by the cylinder deformation.

Especially, the invention is remarkably advantageous in a rotary compressor of a multistage compression type having an inside of a hermetically sealed container set to intermediate pressure in that compressor performance is maintained and a spring member is prevented from being pulled out when $CO_2$ gas is used as a refrigerant, intermediate pressure is set in the hermetically sealed container, and pressure in a second rotary compression element becomes extremely high.

According to the present invention, the rotary compressor comprises the electric element, the first and second rotary compression elements driven by the electric element, these components being provided in a hermetically sealed container, gas compressed by the first rotary compression element being discharged into the hermetically sealed container, and the discharged gas of intermediate pressure being further compressed by the second rotary compression element, the cylinders constituting the respective rotary compression elements, the intermediate diaphragm provided between the cylinders to partition each rotary compression element, the support member adapted to seal the opening surface of each cylinder, and provided with the bearing of the rotary shaft, and the oil hole formed in the rotary shaft. The intermediate diaphragm includes the oil supply path for communicating the oil hole with the suction side of the second rotary compression element. Thus, even in a state where pressure in the cylinder of the second rotary compression element is higher than intermediate pressure in the hermetically sealed container, by using a suction pressure loss in a suction process in the second rotary compression element, oil can be surely supplied from the oil supply path formed in the intermediate diaphragm into the cylinder.

Therefore, it is possible to secure performance and enhance reliability by assuring lubrication of the second rotary compression element.

According to the invention, in addition to the foregoing, the oil supply is constructed by boring the through-hole in the intermediate diaphragm to communicate the outer peripheral surface with the inner peripheral surface of the rotary shaft side, and the communication hole for sealing the opening of the through-hole on the outer peripheral surface side, and communicating the through-hole with the suction side is bored in the cylinder for constituting the second rotary compression element. Thus, it is possible to facilitate processing of the intermediate diaphragm to construct the oil supply path, and reduce production costs.

According to the present invention, the rotary compressor comprises the electric element, the first and second rotary compression elements driven by the electric element, these components being provided in the hermetically sealed container, $CO_2$ refrigerant gas compressed by the first rotary compression element being discharged into the hermetically sealed container, and the discharged refrigerant gas of intermediate pressure being further compressed by the second rotary compression element, the cylinder constituting the second rotary compression element, the support member adapted to seal the opening surface of the cylinder, and provided with the bearing of the rotary shaft erected on the center part, the discharge muffler chamber formed in the support member outside the bearing, and communicated with the inside of the cylinder, the cover having the peripheral part fixed to the support member by the bolt to seal the opening of the discharge muffler chamber, the gasket held between the cover and the support member, and the O ring provided between the inner peripheral end surface of the cover and the outer peripheral surface of the bearing. Thus, it is possible to prevent gas leakage between the cover and the support member by carrying out sufficient sealing with the inner peripheral end surface of the cover without forming any sealing surfaces on a base of the bearing.

Therefore, since a capacity of the discharge muffler chamber is increased, and the conventional necessity of fixing the cover to the bearing by the C ring is eliminated, it is possible to greatly reduce total processing and component costs.

According to the present invention, the rotary compressor comprises the electric element, the first and second rotary compression elements driven by the electric element, these components being provided in the hermetically sealed container, $CO_2$ refrigerant gas compressed by the first rotary compression element being discharged into the hermetically sealed container, and the discharged refrigerant gas of intermediate pressure being further compressed by the second rotary compression element, the cylinder constituting the second rotary compression element, the support member adapted to seal the opening surface of the cylinder on the electric element side, and provided with the bearing of the rotary shaft erected on the center part, the discharge muffler chamber formed in the support member outside the bearing, and communicated with the inside of the cylinder, and the cover attached to the support member to seal the opening of the discharge muffler chamber. The thickness dimension of the cover is set to $\geqq 2$ mm to $\leqq 10$ mm, and the thickness of the cover is set to 6 mm. Thus, it is possible to miniaturize the compressor by securing an insulation distance from the electric element while securing strength of the cover itself, and preventing gas leakage caused by deformation.

According to the invention, in addition to the foregoing, the cover has the peripheral part fixed to the support member by the bolt, the gasket is held between the cover and the support member, and the O ring is provided between the inner peripheral end surface of the cover and the outer surface of the bearing. Thus, it is possible to prevent gas leakage between the cover and the support member by carrying out sufficient sealing with the inner peripheral end surface of the cover without forming any sealing surfaces on the base of the bearing.

Therefore, since a capacity of the discharge muffler chamber is increased, and the conventional necessity of fixing the cover to the bearing by the C ring is eliminated, it is possible to greatly reduce total processing and component costs.

According to the present invention, the rotary compressor comprises the electric element, the first and second rotary compression elements driven by the electric element, these components being provided in the hermetically sealed container, $CO_2$ refrigerant gas compressed by the first rotary compression element being discharged into the hermetically sealed container, and the discharged refrigerant gas of intermediate pressure being further compressed by the second rotary compression element, the cylinder constituting each rotary compression element, the support member adapted to seal the opening surface of each cylinder, and provided with the bearing of the rotary shaft erected on the center, the discharge muffler chamber formed in the support member outside the bearing, and communicated with the inside of the cylinder, the cover attached to the support member to seal the opening of the discharge muffler chamber. Each cylinder, each support member and each cover are fastened by the plurality of main bolts, and each cylinder and each support member are fastened by the auxiliary bolts located outside the main bolts. Thus, it is possible to improve sealing by preventing gas leakage between the cylinder of the second rotary compression element of high pressure, and the support member.

According to the invention, the rotary compressor further comprises the roller engaged with the eccentric portion formed in the rotary shaft of the electric element, and eccentrically rotated in the cylinder constituting the second rotary compression element, the vane abutted on the roller to divide the inside of the cylinder into the low pressure chamber side and the high pressure chamber side, and the guide groove formed in the cylinder to house the vane. The auxiliary bolts are positioned near the guide groove. Thus, it is also possible to effectively prevent gas leakage of back pressure applied to the vane by the auxiliary bolts.

According to the present invention, the rotary compressor comprises the electric element, the rotary compression element driven by the electric element, these components being provided in the hermetically sealed container, and gas compressed by the first rotary compression element being compressed by the second rotary compression element, the first and second cylinders constituting the first and second rotary compression elements, and the first and second rollers engaged with the eccentric portions formed in the rotary shaft of the electric element to have a phase difference of 180°, and eccentrically rotated in the respective cylinders. The section of the connecting portion for connecting both eccentric portions with each other is formed in the shape having the thickness larger in the direction orthogonal to the eccentric direction than that in the eccentric direction of each of the eccentric portions. Thus, it is possible to increase rigidity strength of the rotary shaft, and effectively prevent its elastic deformation.

Especially, the side face of the connecting portion in the eccentric direction side of the first eccentric portion is formed in a circular-arc shape of the same center as that of the second eccentric portion, and the side face in the eccentric direction of the second eccentric portion is formed in a circular-arc shape of the same center as that of the first eccentric portion. Accordingly, it is possible to reduce the number of times of changing chucking positions during cutting of the rotary shafts having eccentric portions and connecting portions. Therefore, it is possible to reduce the number of processing steps, and costs by improved productivity.

According to the present invention, the hermetically sealed compressor comprises the electric element, the compression element driven by the electric element, both components being provided in the hermetically sealed container, a $CO_2$ refrigerant sucked from the refrigerant introduction tube being compressed by the compression element, discharged into the hermetically sealed container, and then discharged outside from the refrigerant discharge tube, the sleeve provided in the hermetically sealed container, to which the refrigerant introduction tube and the refrigerant discharge tube are connected, and the flange formed around an outer surface of the sleeve to engage the coupler for pipe connection. Thus, by using the flange, it is possible to easily engaged and connect the coupler provided for piping from a compressed air generator to the sleeve of the hermetically sealed container.

Therefore, it is possible to finish airtightness testing in a manufacturing process of the hermetically sealed compressor having high internal pressure within a short time.

According to the present invention, the hermetically sealed compressor comprises the electric element, the compression element driven by the electric element, both components being provided in the hermetically sealed container, a $CO_2$ refrigerant sucked from the refrigerant introduction tube being compressed by the compression element, discharged into the hermetically sealed container, and then discharged outside from the refrigerant discharge tube, the sleeve provided in the hermetically sealed container, to which the refrigerant introduction tube and the refrigerant discharge tube are connected, and the screw groove formed for pipe connection around the outer surface of the sleeve. Thus, by using this screw groove, a pipe from a compressed air generator can be easily connected to the sleeve of the hermetically sealed container.

Therefore, it is possible to finish airtightness testing in a manufacturing process of the hermetically sealed container having high internal pressure within a short time.

According to the present invention, the hermetically sealed compressor comprises the electric element, the compression element driven by the electric element, both components being provided in the hermetically sealed container, a $CO_2$ refrigerant sucked from the refrigerant introduction tube being compressed by the compression element, discharged into the hermetically sealed container, and then discharged outside from the refrigerant discharge tube, the plurality of sleeves provided in the hermetically sealed container, to which the refrigerant introduction tube and the refrigerant discharge tube are connected, the flange formed around the outer surface of one of adjacent sleeves to engage the coupler for pipe connection, and the screw groove formed for pipe connection around the outer surface of the other sleeve. Thus, by using the flange, the coupler provided in the pipe from the compressed air generator can be easily engaged and connected to one of the sleeves of the hermetically sealed container. By using the screw groove, the pipe from the compressed air generator can be easily connected to the other sleeve of the hermetically sealed container. Therefore, it is possible to finish airtightness testing in a manufacturing process of the hermetically sealed compressor of high internal pressure within a short time.

Especially, since the flange is formed in one of the adjacent sleeves, and the screw groove is formed in the other sleeve, no couplers having relatively large dimensions are connected adjacently to each other and, even in the case of a narrow space between the sleeves, it is possible to connect a plurality of pipes from the compressed air generator by using the narrow space.

According to the present invention, the compressor comprises the electric element, the compression element driven by the electric element, both components being provided in the container, the container side bracket provided in the side face of the container, the accumulator, and the accumulator side bracket, to which the accumulator is attached. By fixing the accumulator side bracket to the container side bracket, the accumulator is attached to the container through both brackets. Thus, when a capacity of the accumulator is changed, interference with the pipe can be prevented only by changing the accumulator side bracket without changing the hermetically sealed container side bracket. Therefore, it is possible to prevent an effect to a compressor manufacturing device.

In addition, even when the capacitor of the accumulator is changed, only by changing the accumulator side bracket, the accumulator side bracket is attached to its center or a position of a center of gravity, or in the vicinity thereof, and the accumulator can be held on the center or the position of a center of gravity of the accumulator, or in the vicinity thereof. Thus, it is also possible to prevent an increase of noise by vibration.

According to the present invention, the compressor comprises the electric element, first and second compression elements driven by the electric element, these components being provided in the hermetically sealed container, the refrigerant introduction tube for introducing a refrigerant to the first compression element, the refrigerant tube for introducing refrigerant gas compressed by the first compression element to the second compression element, and the refrigerant tube for discharging high pressure gas compressed by the second compression element. The refrigerant tubes of the first and second compression elements are connected to the hermetically sealed container in the adjacent positions, and laid around in opposing directions from the hermetically sealed container. Thus, it is possible to lay around the refrigerant tubes in limited spaces without any mutual interferences.

The refrigerant tube of the first compression element is connected to the hermetically sealed container in the position below the refrigerant tube of the second compression element, the accumulator is arranged above the connecting position of each refrigerant tube to the hermetically sealed container, and the accumulator is connected to the refrigerant tube for introducing the refrigerant to the first compression element. Especially in this case, the position of the accumulator is lowered to a lowest limit to approach the refrigerant tube of the second compression element while mutual interferences between the two refrigerant tubes are prevented. Thus, it is possible to greatly increase space efficiency.

According to the present invention, the compressor comprises the electric element, the first and second compression elements driven by the electric element, these components being provided in the hermetically sealed container, the first refrigerant introduction tube for sucking refrigerant gas, the refrigerant gas being compressed by the first compression element, and discharged into the hermetically sealed container, and the second refrigerant introduction tube located outside the hermetically sealed container for sucking the discharged refrigerant gas of intermediate pressure, the refrigerant gas being compressed by the second compression element. The first and second refrigerant introduction tubes are connected to the hermetically sealed container in adjacent positions, and laid around in opposing directions from the hermetically sealed container. Thus, it is possible to lay around the refrigerant introduction tubes in limited spaces without any mutual interferences.

In the compressor of the invention, the first refrigerant tube is connected to the hermetically sealed container in a position below the second refrigerant tube, the accumulator is arranged above a connecting position of each refrigerant introduction tube to the hermetically sealed container, and the accumulator is connected to the first refrigerant introduction. Especially in this case, a position of the accumulator can be lowered to a lowest limit to approach the second refrigerant introduction tube while mutual interferences between the two refrigerant introduction tubes are prevented. Thus, it is possible to greatly increase space efficiency.

According to the present invention, the hermetically sealed compressor comprises the electric element, the compression element driven by the electric element, both components being provided in a hermetically sealed container, a refrigerant being compressed by the compression element, and discharged into the hermetically sealed container, the terminal attached to the end cap of the hermetically sealed container, and the step having a predetermined curvature formed by seat pushing in the end cap around the terminal. Thus, rigidity of the end cap in the vicinity of the terminal is increased. Especially, in a situation where pressure in the hermetically sealed container becomes high as in the case of compressing $CO_2$ gas as a refrigerant, a deformation amount of the end cap by inner pressure of the hermetically sealed container is reduced, thereby improving pressure resistance.

According to the present invention, in addition to the foregoing, the end cap is formed in a rough bowl shape, the step has a shape axially symmetrical around the center axis of the end cap, and the terminal is attached to the center of the end cap. Thus, deformation of the end cap in the terminal welded part by the inner pressure of the hermetically sealed container is made uniform, making it possible to prevent cracks or peeling-off of the welded part following nonuniform deformation. Therefore, it is possible to further increase pressure resistance.

According to the present invention, the hermetically sealed compressor comprises the terminal attached to the hermetically sealed container. The terminal includes the circular glass portion, which the electric terminal penetrates to be attached, and the flange-shaped metal attaching portion formed around the glass portion, and welded to the attaching hole peripheral edge part of the hermetically sealed container, and the thickness dimension of the attaching portion is set in the range of 2.4±0.5 mm. Thus, in the hermetically sealed compressor using the $CO_2$ refrigerant having high pressure in the hermetically sealed container, it is possible to suppress an increase in the amount of heat necessary for welding while securing sufficient pressure resistance performance of the terminal.

Therefore, it is possible to prevent gas leakage or terminal destruction caused by cracks in the attaching portion of the terminal or damage in the glass portion.

According to the present invention, the rotary compressor comprises the electric element, the rotary compression element driven by the electric element, both components being provided in the hermetically sealed container, the single or the plurality of cylinders constituting the rotary compression element, the first support member adapted to seal the opening surface of the cylinder on the electric element side, and provided with the bearing of the rotary shaft of the electric element, the second support member adapted to seal the opening surface of the cylinder on the electric element side, and provided with the bearing of the rotary shaft, and the carbon bush provided between one of the bearings of the first and second support members and the rotary shaft. Thus, compared with a case of providing bushes in the bearings of both support members, it is possible to reduce component costs.

Especially, by providing a bush in the bearing of the first support member, but none in the bearing of the second support member, in which an area of contact with the rotary shaft on the cylinder electric element side, it is possible to reduce costs by maintaining sliding performance in the bearing of the first support member, in which a pressure receiving area is small, and a load applied per unit area becomes large, and removing the bush in the bearing of the second support member, in which a pressure receiving area is small, and a load applied per unit area becomes relatively small, while maintaining durability performance.

According to the present invention, the rotary compressor comprises the electric element, the first and second rotary compression elements driven by the electric element, both components being provided in the hermetically sealed container, gas compressed by the first rotary compression element being discharged into the hermetically sealed container, and the discharged gas of intermediate pressure being further compressed by the second rotary compression element, the first and second cylinders respectively constituting the first and second rotary compression elements, the first support member adapted to seal the opening surface of the first cylinder, and provided with the bearing of the rotary shaft of the electric element, the second support member adapted to seal the opening surface of the second cylinder, and provided with the bearing of the rotary shaft, and the carbon bush provided between one of the bearings of the first and second support members and the rotary shaft. Thus, compared with a case of proving bushes in the bearings of both support members, it is possible to reduce component costs.

Especially, by providing a bush in the bearing of the second support member, but none in the bearing of the first support member for sealing the opening surface of the first cylinder set equal to/lower than pressure in the hermetically sealed container, it is possible to reduce costs by sealing the opening surface of the second cylinder having pressure higher than that in the hermetically sealed container, maintaining sliding performance in the bearing of the second support member, in which oil supplying by a pressure difference becomes difficult, and removing the bush in the bearing of the first support member having no oil supply problems by the pressure difference, while maintaining durability performance.

Further, when $CO_2$ gas is used as a refrigerant, and pressure in the hermetically sealed container becomes extremely high, the invention is remarkably advantageous for maintaining durability performance of the compressor.

According to the present invention, the hermetically sealed compressor comprises the electric element, the compression element driven by the electric element, both components being provided in the hermetically sealed container, a refrigerant sucked from the refrigerant introduction tube being compressed by the compression element, and discharged from the refrigerant discharge tube, and the sleeve attached corresponding to the hole formed on the bent surface of the hermetically sealed container, to which the refrigerant introduction and discharge tubes are connected. The flat surface is formed on the outer surface of the hermetically sealed container around the hole, the sleeve includes the insertion portion inserted into the hole, and the abutting portion positioned around the insertion portion and abutted on the flat surface of the hermetically sealed container, and the abutting portion of the sleeve and the flat surface of the hermetically sealed container are secured to each other by projection welding. Thus, the abutment between the flat surface of the hermetically sealed container and the abutting portion of the sleeve enables perpendicularity of the sleeve to be secured with respect to the inner diameter of the hermetically sealed container. Therefore, it is possible to improve productivity and accuracy by securing the sleeve perpendicularity without using any fixtures.

According to the present invention, in addition to the foregoing, the flat surface is concaved around the hole. Thus, it is possible to maintain the sleeve perpendicularity more accurately by the outer surface of the sleeve buried in the concave portion of the hermetically sealed container, and the concave portion.

According to the present invention, the rotary compressor comprises the electric element, the rotary compression element driven by the electric element, both components being provided in the hermetically sealed container, the cylinder constituting the rotary compression element, the roller engaged with an eccentric portion formed in a rotary shaft of the electric element, and eccentrically rotated in the cylinder, the support member adapted to seal the opening surface of the cylinder, and provided with the bearing of the rotary shaft, the suction passage formed in the support member, and the suction port formed in the cylinder in an inclined manner to communicate the suction passage with the inside of the cylinder corresponding to the suction passage of the support member. The edge part of the suction port on the suction port side is formed in the semicircular arc shape. Thus, it is possible to achieve efficient running by reducing passage resistance in the communicating portion between the suction port and the suction passage, and air flow disturbance.

According to the present invention, since the suction port can be formed in the cylinder while the end mill of the flat tip is inclined in the state of being perpendicular to the cylinder, the suction port can be formed in the same process of drilling of other screw holes or lightening holes, reducing production costs by a reduction in the number of steps. Moreover, since the edge part of the suction port on the suction passage side is also formed in a semicircular arc shape by the end mill of the flat tip, passage resistance in the communicating portion between the suction port and the suction passage can be reduced as in the foregoing case, making it possible to achieve efficient running by reducing air flow disturbance.

According to the present invention, since the inclined suction port can be formed in the cylinder by placing a part of the end mill having the chevron tip shape perpendicularly to the cylinder, the discharge port can be formed in the same process as drilling of other screw holes or lightening holes. Thus, it is possible to reduce production costs by reducing the number of steps.

According to the present invention, the defroster of the refrigerant circuit is provided, the refrigerant circuit including the compressor provided with the electric element, the first and second compression elements driven by the electric elements, these components being provided in the hermetically sealed container, refrigerant gas compressed by the first compression element being discharged into the hermetically sealed container, and the discharged refrigerant gas of intermediate pressure being compressed by the second compression element, the gas cooler, into which a refrigerant discharged from the second compression element of the compressor flows, the pressure reducing device connected to the outlet side of the gas cooler, and the evaporator connected to the outlet side of the pressure reducing device, a refrigerant discharged from the evaporator being compressed by the first compression element, the defroster comprising the defroster circuit for supplying a refrigerant discharged from the first compression element to the evaporator without reducing pressure, and the flow path controller for controlling refrigerant distribution of the defroster circuit. Thus, to carry out defrosting of the evaporator, the refrigerant discharged from the first compression element is caused to flow to the defroster circuit by the flow path controller, and can be supplied to the evaporator to heat the same without reducing pressure.

Therefore, it is possible to prevent inconvenience of pressure reversal between the discharge and the suction in the second compression element, which occurs when only a high pressure refrigerant discharged from the second compression element is supplied to the evaporator without any pressure reductions to carry out defrosting.

Especially, the invention is remarkably advantageous in the refrigerant circuit using $CO_2$ gas as a refrigerant. In the case of one generating hot water from the gas cooler, heat of the hot water can be carried to the evaporator by the refrigerant, enabling the defrosting of the evaporator to be carried out more quickly.

Figure 37:
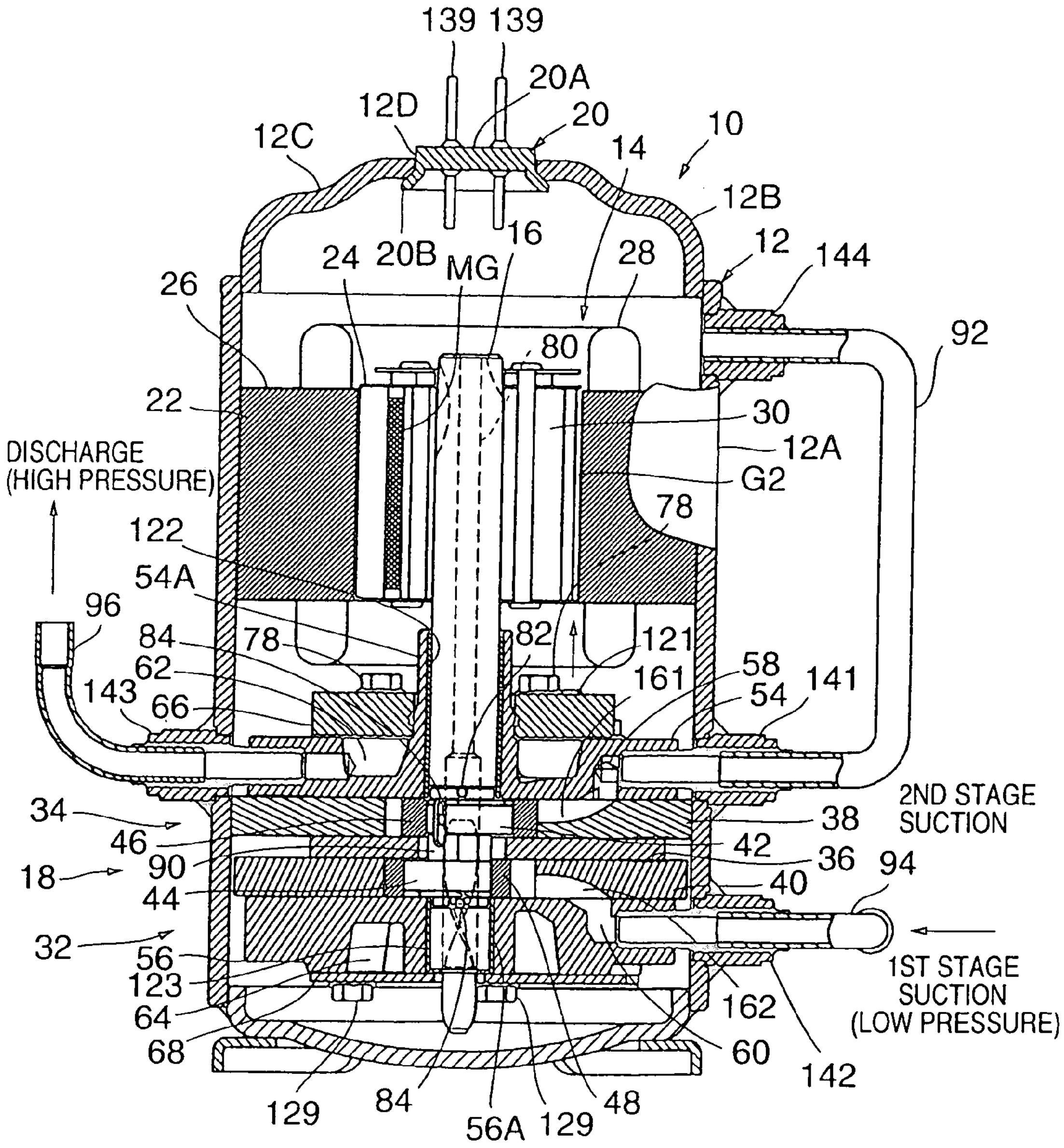
FIG. 37 is a vertical sectional view of a rotary compressor according to another embodiment of the present invention.
Figure 38:
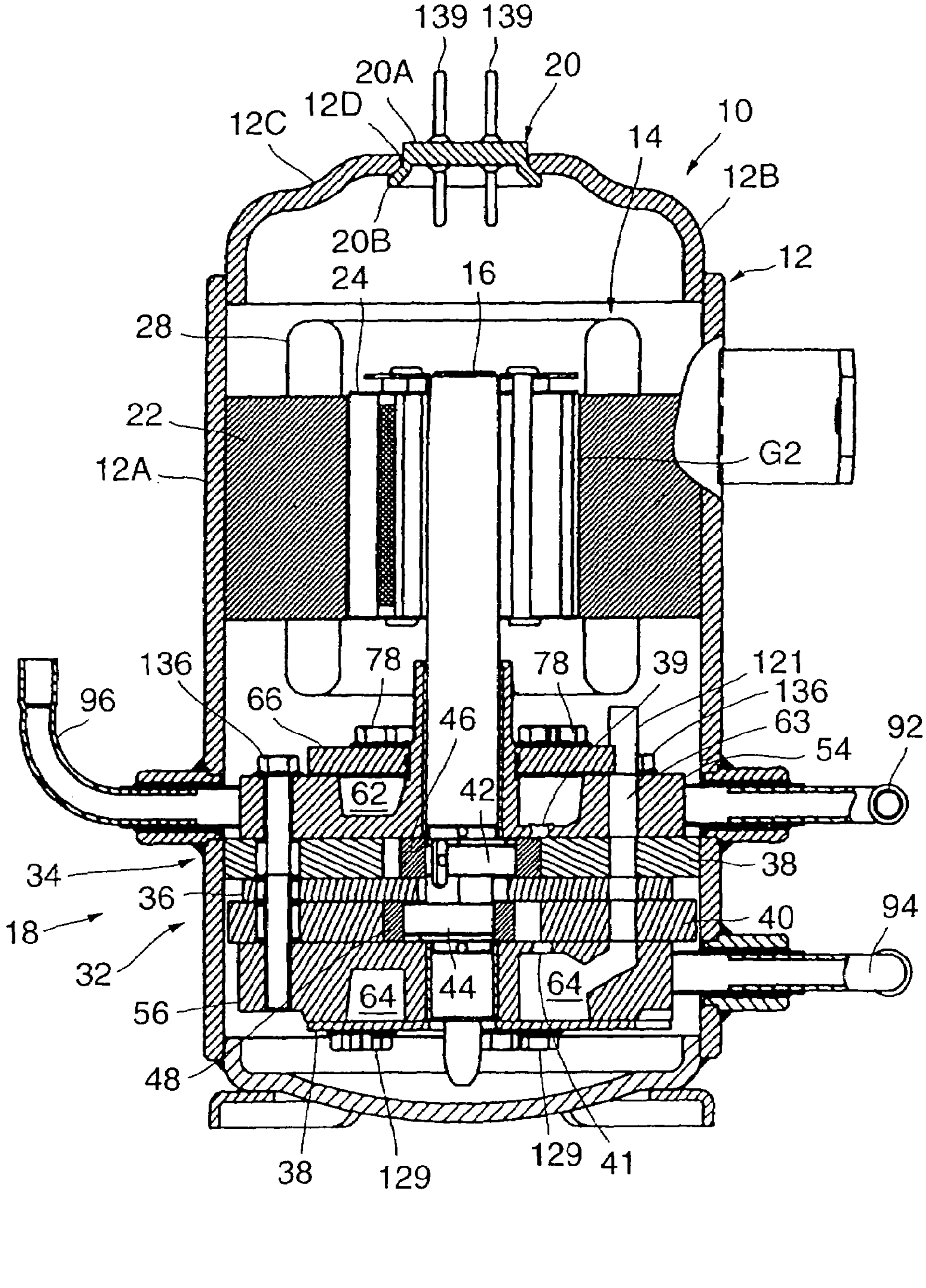
FIG. 38 is another vertical sectional view of the rotary compressor of FIG. 37.
Figure 39:
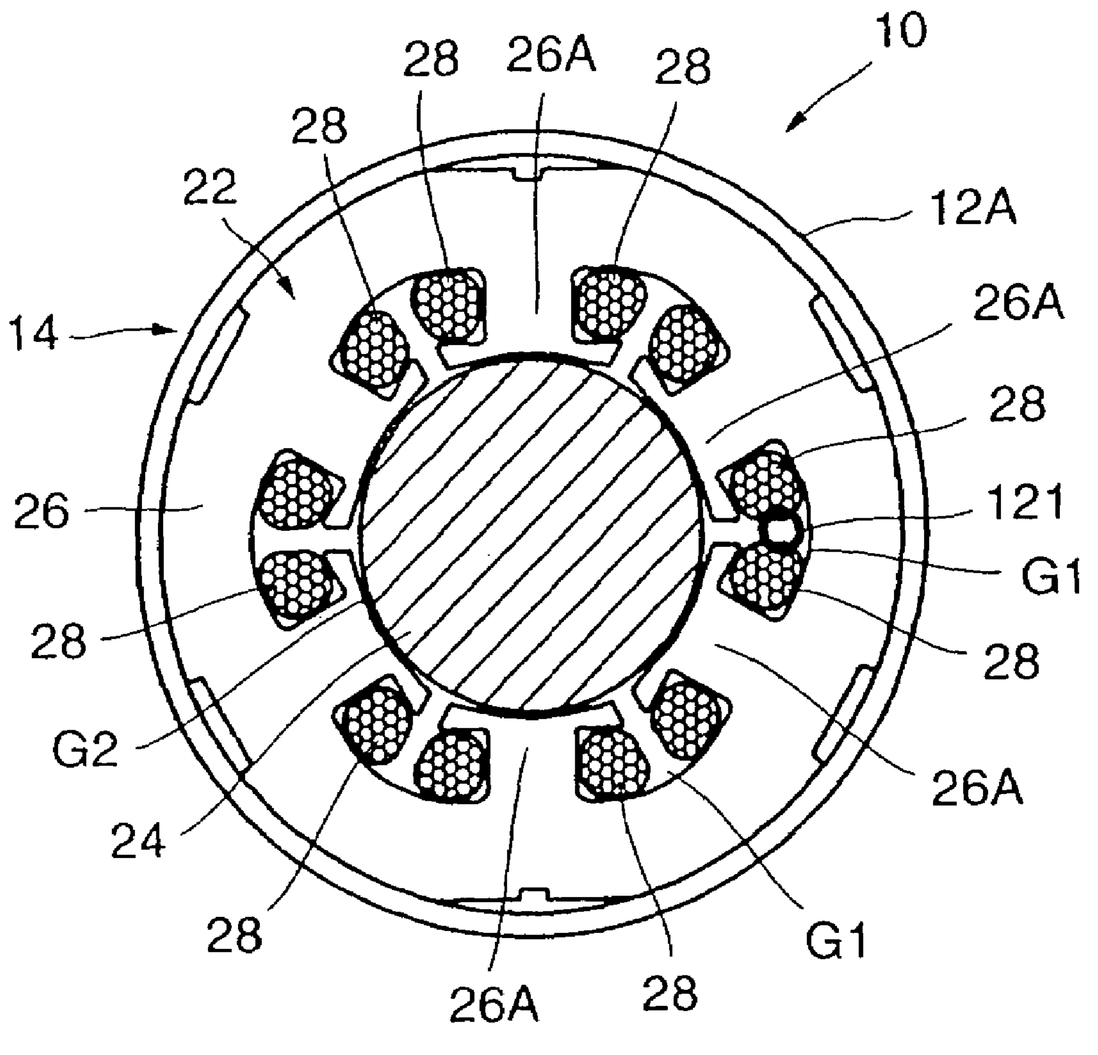
FIG. 39 is a sectional plan view showing an electric element portion of the rotary compressor of FIG. 37.
Figure 40:
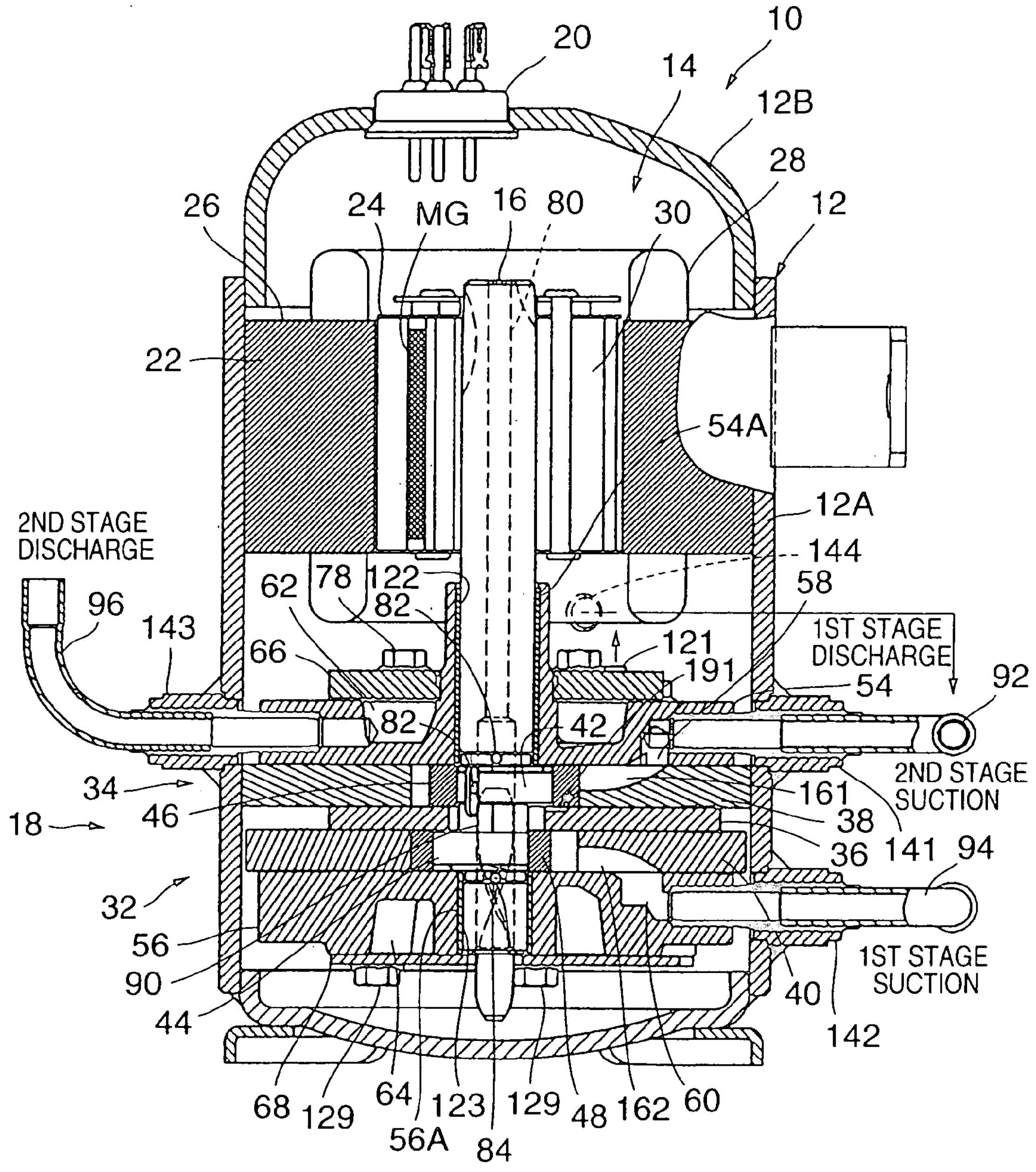
FIG. 40 is a vertical sectional view of a rotary compressor according to yet another embodiment of the present invention.

Next, description is made of a rotary compressor 10 of yet another embodiment by referring to FIGS. 37 to 39. In each drawing, components denoted by reference numerals similar to those of FIGS. 1 to 18 function similarly.

In each drawing, a reference numeral 10 denotes a vertical rotary compressor of an internal intermediate pressure multistage (two-stage) compression type using carbon dioxide ($CO_2$) as a refrigerant. This rotary compressor 10 comprises a cylindrical hermetically sealed container 12 made of a steel plate, an electric element 14 arranged and housed in an upper side of an internal space of the hermetically sealed container 12, and a rotary compression mechanism unit 18 including first (1st stage) and second (2nd stage) rotary compression element 32 and 34 arranged below (one side) the electric element 14, and driven by a rotary shaft 16 of the electric element 14. An exclusion capacity of the second rotary compression element 34 is set smaller than that of the first rotary compression element 32.

The hermetically sealed container 12 has a bottom portion used as an oil reservoir, and includes a cylindrical container main body 12A for housing the electric element 14 and the rotary compression mechanism unit 18, and a roughly bowl-shaped end cap (cap body) 12B for sealing an upper opening of the container main body 12A. A circular attaching hole 12D is formed on an upper surface center of the end cap 12B, and a terminal (wire is omitted) 20 is attached to the attaching hole 12D to supply power to the electric element 14.

In this case., the end cap 12B around the terminal 20 is provided with a stepped portion (step) 12C having a predetermined curvature formed by seat pushing molding annularly. The terminal 20 includes a circular glass portion 20A, which an electric terminal 139 penetrates to be attached, and a metal attaching portion 20B, which is formed around the glass portion 20A and swelled obliquely downward outside in a flange shape. In the terminal 20, the glass portion 20A is inserted from a lower side into the attaching hole 12D to face upward, and the attaching portion 20B is welded to the attaching hole 12D peripheral edge of the end cap 12B in a state of being abutted on the peripheral edge of the attaching hole 12D. Accordingly, the terminal 20 is fixed to the end cap 12B.

The electric element 14 includes a stator 22 attached annularly along an inner peripheral surface of the upper space of the hermetically sealed container 12, and a rotor 24 inserted into the stator 22 with a gap G2 (slight space). The rotor 24 is fixed to a rotary shaft 16 vertically extended through a center.

The stator 22 includes a laminate body 26 formed by laminating doughnut-shaped electromagnetic steel plates, and a stator coil 28 wound on teeth 26A of six places of the laminate body 26 by a series winding (concentrated winding) system (not distribution winding for laying a coil wound in a bundle beforehand, but a system of winding a coil on the teeth 26A) (FIG. 39). The rotor 24 also includes a laminate body 30 of electromagnetic steel plates as in the case of the stator 22, and a permanent magnet MG is inserted into the laminate body 30.

An intermediate diaphragm 36 is held between the first and second rotary compression elements 32 and 34. That is, the first and second rotary compression elements 32 and 34 include the intermediate diaphragm 36, cylinders 38 and 40 arranged above and below the intermediate diaphragm 36, upper and lower rollers 46 and 48 engaged with upper and lower eccentric portions 42 and 44 provided in the rotary shaft 16 to have a phase difference of 180°, and eccentrically rotated in the upper and lower cylinders 38 and 40, upper and lower vanes abutted on the upper and lower rollers 46 and 48 to respectively divide insides of the upper and lower cylinders 38 and 40 into low and high pressure chamber sides, and upper and lower support members 54 and 56 as support members to seal an upper opening surface of the upper cylinder 38 and a lower opening surface of the lower cylinder 40, and also serve as bearings of the rotary shaft 16.

The upper and lower support members 54 and 56 include suction passages 58 and 60 respectively communicated with insides of the upper and lower cylinders 38 and 40 through suction ports 161 and 162, and concaved discharge muffler chambers 62 and 64. Openings of the discharge muffler chambers 62 and 64 are sealed with covers. That is, the discharge muffler chamber 62 is sealed with an upper cover 66 as a cover, and the discharge muffler chamber 64 with a lower cover 68 as a cover.

In this case, a bearing 54A is erected on a center of the upper support member 54, and a cylindrical bush 122 is fixed to an inner surface of the bearing 54A. A bearing 56A is formed through on a center of the lower support member 56, and a cylindrical carbon bush 123 is fixed to an inner surface of the bearing 56A. These bushes 122 and 123 are made of later-described materials having good sliding and wear resistance characteristics. The rotary shaft 16 is held through the bushes 122 and 123 on the bearings 54A and 56A of the upper and lower support members 54 and 56.

In the described case, the lower cover 68 is made of a doughnut-shaped circular steel plate. Four places of a peripheral portion of the lower cover 68 are fixed to the lower support member 56 from a lower side by main bolts 129 . . . , and a lower opening portion of the discharge muffler chamber 64 communicated with the compression chamber 40A in the lower cylinder 40 of the first rotary compression element 32 by the discharge passage 41 is sealed. Tips of the main bolts 129 . . . , are engaged with the upper support member 54. An inner peripheral edge of the lower cover 68 is produced inward from an inner surface of the bearing 56A of the lower support member 56. Accordingly, a lower end surface of the bush 123 is held by the lower cover 68, thereby prevented from falling off.

The discharge muffler chamber 64 is communicated with the electric element 14 side of the upper cover 66 in the hermetically sealed container 12 through a communication path 63 as a hole to penetrate the upper and lower cylinders 38 and 40 and the intermediate diaphragm 36 (FIG. 38). In this case, an intermediate discharge tube 121 (refrigerant discharge place from the first rotary compression element 32) is erected on an upper end of the communication path 63. In the embodiment, the intermediate discharge tube 121 corresponds to a lower side of, and is directed to a gap G1 (place of small passage resistance in the electric element 14) between adjacent stator coils 28 and 28 wound on the stator 22 of the upper electric element 14 (FIG. 39).

In this case, since the stator coil 28 is wound on the teeth 26A of the stator 22by a series winding system, a gap G1 between the stator coils 28 and 28 is relatively large compared with that by the above-described distribution winding system (FIG. 39). As a place of small passage resistance of the electric element 14, to which the intermediate discharge tube 121 corresponds, other than the gap between the coils 28 and 28, a gap G2 between the stator 22 and the rotor 24 may be used.

The upper cover 66 seals an upper opening of the discharge muffler chamber 62 communicated with the inside of the upper cylinder 38 of the second rotary compression element 34, and divides the inside of the hermetically sealed container 12 into the discharge muffler chamber 62 and the electric element 14 side. This upper cover 66 has its peripheral portion fixed to the upper support member 54 from above by four main bolts 78 . . . . Tips of the main bolts 78 . . . are engaged with the lower support member 56.

On the other hand, in the rotary shaft 16, an oil hole 80 of a vertical direction around an axis, and horizontal oil supply holes 82 and 84 (also formed in the upper and lower eccentric portions 42 and 44 of the rotary shaft 16) communicated with the oil hole 80 are formed.

An opening of the inner peripheral surface side of the through-hole 131 of the intermediate diaphragm 36 is communicated through the oil supply holes 82 and 84 with the oil hole 80.

A connecting portion 90 for interconnecting the upper and lower eccentric portions 42 and 44 formed integrally with the rotary shaft 16 to have a phase difference of 180° is formed in a so-called noncircular rugby ball shape in section, in order to set a sectional area of a section shape larger than a circular area of the rotary shaft 16 to provide rigidity. That is, in the sectional shape of the connecting portion 90, a thickness is larger in a direction orthogonal to an eccentric direction of the upper and lower eccentric portions 42 and 44 than that in the eccentric direction of the upper and lower eccentric portions 42 and 44 provided in the rotary shaft 16.

Thus, a sectional area of the connecting portion 90 for interconnecting the upper and lower eccentric portions 42 and 44 provided integrally with the rotary shaft 16 is enlarged, sectional secondary moment is increased to enhance strength (rigidity), and durability and reliability are enhanced. Especially, if a refrigerant of high use pressure is compressed at two stages, a load applied to the rotary shaft 16 is large because of a large difference between high pressure and low pressure. However, since the sectional area of the connecting portion 90 is enlarged to increase its strength (rigidity), it is possible to prevent elastic deformation of the rotary shaft 16.

In this case, as a refrigerant, the carbon dioxide ($CO_2$) as an example of carbon dioxide gas of a natural refrigerant is used, which is kind to global environment, considering combustibility, toxicity or the like. As lubrication oil, existing oil such as mineral oil, alkylbenzene oil, ether oil, or ester oil is used.

On a side face of the container main body 12A of the hermetically sealed container 12, sleeves 141, 142, 143 and 144 are welded to positions roughly corresponding to the suction passages 58 and 60 of the upper and lower support members 54 and 56, and upper sides (other sides) of the discharge muffler chamber 62 and the electric element 14. In the sleeve 141, one end of a refrigerant introduction tube 92 for introducing refrigerant gas to the upper cylinder 38 is inserted and connected. One end of the refrigerant introduction tube 92 is communicated with the suction passage 58 of the upper cylinder 38. The refrigerant introduction tube 92 is passed outside the upper side of the hermetically sealed container 12 to reach the sleeve 144, and the other end is inserted and connected to the sleeve 144, and opened in the hermetically sealed container 12 above the electric element 14.

In the sleeve 142, one end of a refrigerant introduction tube 94 for introducing refrigerant gas to the lower cylinder 40 is inserted and connected. One end of the refrigerant introduction tube 94 is communicated with the suction passage 60 of the lower cylinder 40. A refrigerant discharge tube 96 is inserted and connected to the sleeve 143, and one end of this refrigerant discharge tube 96 is communicated with the discharge muffler chamber 62.

Now, description is made of an operation in the foregoing constitution. It is assumed that the solenoid valve 159 is closed in running by heating. When power is supplied to the stator coil 28 of the electric element 14 through a terminal 20 and a not-shown wire, the electric element 14 is actuated to rotate the rotor 24. This rotation causes the upper and lower rollers 46 and 48 engaged with the upper and lower eccentric portions 42 and 44 provided integrally with the rotary shaft 16 to be eccentrically rotated in the upper and lower cylinders 38 and 40.

Accordingly, lower pressure (1st stage suction pressure LP: 4 MPaG) refrigerant gas sucked from the suction port 162 through the refrigerant introduction tube 94 and the suction passage 60 formed in the lower support member 56 to the low pressure chamber side of the lower cylinder 40 is compressed to intermediate pressure (MP1: 8 MPaG) by operations of the roller 48 and the vane. Then, it is passed from the high pressure chamber side of the lower cylinder 40, then passed from the discharge muffler chamber 64 formed in the lower support member 56 through the communication passage 63, and discharged from an intermediate discharge tube 121 into the hermetically sealed container 12.

At this time, the intermediate discharge tube 121 is directed corresponding to a position below a gap G1 between the adjacent stator coils 28 and 28 wound on the stator 22 of the upper electric element 14. Accordingly, refrigerant gas is smoothly passed through the gap G1 of relatively small passage resistance into the electric element 14 to reach a part above the electric element 14. Thus, the refrigerant gas still relatively low in temperature can be actively supplied toward the electric element 14, suppressing a temperature increase of the electric element 14. Therefore, intermediate pressure (MP1) is set in the hermetically sealed container 12.

The refrigerant gas of intermediate pressure in the hermetically sealed container 12 is passed out from the upper sleeve 144 of the electric element 14 (intermediate discharge pressure is MP1) into the refrigerant introduction tube 92, then through the refrigerant introduction tube 92 outside the hermetically sealed container 12 into the suction passage 58 formed in the upper support member 54. Then, after the suction passage 58, it is sucked from the suction port 161 to the low pressure chamber side of the upper cylinder 38 (2nd stage suction pressure MP2). The sucked refrigerant gas of intermediate pressure is subjected to 2nd stage compression by operations of the roller 46 and the vane 50 to become refrigerant gas of high temperature and high pressure (2nd stage discharge pressure HP: 12 MPaG). Since the refrigerant gas is sucked through the refrigerant introduction tube 92 opened in the hermetically sealed container 12 above the electric element 14 into the upper cylinder 38 of the second rotary compression element 34, oil in the refrigerant gas discharged from the intermediate discharge tube 121 can be well separated in the hermetically sealed container 12. Thus, an amount of oil sucked in the second rotary compression element 34, and discharged outside as described later is reduced, making it possible to prevent inconvenience such as burning of the rotary compressor 10.

On the other hand, the refrigerant gas of intermediate pressure sucked into the low pressure chamber side of the upper cylinder 38 is subjected to compression of a 2nd stage by the operations of the roller 46 and the vane to become refrigerant gas of high temperature and high pressure (2nd stage discharge pressure HP: 12 MPaG), passed from the high pressure chamber side through the discharge muffler chamber 62 formed in the upper support member 54, and the refrigerant discharge tube 96 into the gas cooler 154. At this time, a refrigerant temperature has been increased to about +100° C., heat is radiated from the refrigerant gas of high temperature and high pressure, and water in the hot water tank is heated to generate hot water of about +90° C.

The refrigerant itself is cooled at the gas cooler 154, and discharged from the gas cooler 154. Then, after pressure reduction at the expansion valve 156, the refrigerant flows into the evaporator 157 to evaporate, and sucked from the refrigerant introduction tube 94 into the first rotary compression element 32. This cycle is repeated.

In the embodiment, the refrigerant introduction tube 92 was opened in the hermetically sealed container 12 b the sleeve 144 above the electric element 14. However, the invention is not limited to this, and the refrigerant may be sucked directly into the second rotary compression element 34 in the hermetically sealed container 12, or by the refrigerant introduction tube opened below the electric element 14. A cooling operation of the electric element 14 can also be expected by this constitution.

As describe above, since the refrigerant discharging place from the first rotary compression element corresponds to the place of small passage resistance in the electric element, refrigerant gas of relatively low temperature discharged from the first rotary compression element can be distributed through the place of relatively small passage resistance of the electric element such as a gap between the stator and the rotor or a gap between the stator coils of the electric element to around the electric element.

Therefore, the refrigerant gas actively moves in the hermetically sealed container around the electric element, thereby improving a cooling effect of the electric element by the refrigerant.

Moreover, the refrigerant discharging place from the first rotary compression element is provided in the hermetically sealed container in one side of the electric element, and the refrigerant introduction tube for causing the second rotary compression element to suck the refrigerant gas is communicated with the inside of the hermetically sealed container in the other side of the electric element. Thus, oil contained in the refrigerant gas discharged from the first rotary compression element is well separated in the process of being moved from one side of the electric element to the other side, and sucked through the refrigerant introduction tube into the second rotary compression element.

Therefore, the amount of oil discharged from the second rotary compression element to the outside of the rotary compressor can be reduced. Besides, by correlating the refrigerant discharging place from the first rotary compression element to the place of small passage resistance of the electric element, such as the gap between the stator and the rotor or between the stator coils of the electric element, the refrigerant gas discharged from the first rotary compressor element can be smoothly fed into the refrigerant introduction tube, distributed smoothly around the electric element, and actively moved in the hermetically sealed container around the electric element. As a result, it is possible to improve a cooling effect of the electric element by the refrigerant.

Since the start coil is wound on the stator teeth by the series winding system, a gap between the stator coils becomes relatively large compared with that in the case of the distribution winding, further improving refrigerant gas distribution.

Next, description is made of a rotary compressor 10 of yet another embodiment by referring to FIGS. 40 to 44. In each drawing, components denoted by reference numerals similar to those of FIGS. 1 to 18 function similarly.

In each drawing, a reference numeral 10 denotes a vertical rotary compressor of an internal intermediate pressure multistage (two-stage) compression type using carbon dioxide ($CO_2$) as a refrigerant. This rotary compressor 10 comprises a cylindrical hermetically sealed container 12 made of a steel plate, an electric element 14 arranged and housed in an upper side of an internal space of the hermetically sealed container 12, and a rotary compression mechanism unit 18 including first (1st stage) and second (2nd stage) rotary compression element 32 and 34 arranged below the electric element 14, and driven by a rotary shaft 16 of the electric element 14.

The hermetically sealed container 12 has a bottom portion used as an oil reservoir, and includes a container main body 12A for housing the electric element 14 and the rotary compression mechanism unit 18, and a roughly bowl-shaped end cap (cap body) 12B for sealing an upper opening of the container main body 12A. A terminal (wire is omitted) 20 is attached to an upper surface of the end cap 12B to supply power to the electric element 14.

The electric element 14 includes a stator 22 attached annularly along an inner peripheral surface of the upper space of the hermetically sealed container 12, and a rotor 24 inserted into the stator 22 with a slight space. The rotor 24 is fixed to a rotary shaft 16 vertically extended through a center.

The stator 22 includes a laminate body 26 formed by laminating doughnut-shaped electromagnetic steel plates, and a stator coil 28 wound on teeth of the laminate body 26 by a series winding (concentrated winding) system. The rotor 24 also includes a laminate body 30 of electromagnetic steel plates as in the case of the stator 22, and a permanent magnet MG is inserted into the laminate body 30.

An intermediate diaphragm 36 is held between the first and second rotary compression elements 32 and 34. That is, the first and second rotary compression elements 32 and 34 include the intermediate diaphragm 36, cylinders 38 (second cylinder) and 40 (first cylinder) arranged above and below the intermediate diaphragm 36, upper and lower rollers 46 and 48 engaged with upper and lower eccentric portions 42 and 44 provided in the rotary shaft 16 to have a phase difference of 180°, and eccentrically rotated in the upper and lower cylinders 38 and 40, later-described upper and lower vanes 50 abutted on the upper and lower rollers 46 and 48 to respectively divide insides of the upper and lower cylinders 38 and 40 into low and high pressure chamber sides LR and HR (FIG. 44*f*), and upper and lower support members 54 and 56 as support members to seal an upper opening surface of the upper cylinder 38 and a lower opening surface of the lower cylinder 40, and also serve as bearings of the rotary shaft 16.

The upper and lower support members 54 and 56 include suction passages 58 and 60 respectively communicated with insides of the upper and lower cylinders 38 and 40 through suction ports 161 and 162, and concaved discharge muffler chambers 62 and 64. Openings of the discharge muffler chambers 62 and 64 opposite the cylinders 38 and 40 are sealed with covers. That is, the discharge muffler chamber 62 is sealed with an upper cover 66 as a cover, and the discharge muffler chamber 64 with a lower cover 68 as a cover.

In this case, a bearing 54A is erected on a center of the upper support member 54, and a cylindrical bush 122 is fixed to an inner surface of the bearing 54A. A bearing 56A is formed through on a center of the lower support member 56, a bottom surface of the lower support member 56 (surface opposite the lower cylinder 40) is formed flat, and a cylindrical bush 123 is fixed to an inner surface of the bearing 56A. These bushes 122 and 123 are made of carbon materials having good sliding and wear resistance characteristics. The rotary shaft 16 is held through the bushes 122 and 123 on the bearings 54A and 56A of the upper and lower support members 54 and 56.

In the described case, the lower cover 68 is made of a doughnut-shaped circular steel plate. Four places of a peripheral portion of the lower cover 68 are fixed to the lower support member 56 from a lower side by main bolts 129 . . . , and a lower opening portion of the discharge muffler chamber 64 communicated with the inside of the lower cylinder 40 of the first rotary compression element 32 by a not-shown discharge port is sealed. An inner peripheral edge of the lower cover 68 is produced inward from an inner surface of the bearing 56A of the lower support member 56. Accordingly, a lower end surface (end opposite the lower cylinder 40) of the bush 123 is held by the lower cover 68, thereby prevented from falling off.

The discharge muffler chamber 64 is communicated with the electric element 14 side of the upper cover 66 in the hermetically sealed container 12 through a not shown communication path penetrating the upper and lower cylinders 38 and 40 and the intermediate diaphragm 36. In this case, an intermediate discharge tube 121 is erected on an upper end of the communication path. The intermediate discharge tube 121 is directed to a space between adjacent stator coils 28 and 28 wound on the stator 22 of the upper electric element 14.

The upper cover 66 seals an upper opening of the discharge muffler chamber 62 communicated with the inside of the upper cylinder 38 of the second rotary compression element 34 through a discharge port 184, and divides the inside of the hermetically sealed container 12 into the discharge muffler chamber 62 and the electric element 14 side. This upper cover 66 has its peripheral portion fixed to the upper support member 54 from above by four main bolts 78 . . . . Tips of the main bolts 78 . . . are engaged with the lower support member 56.

Figure 42:
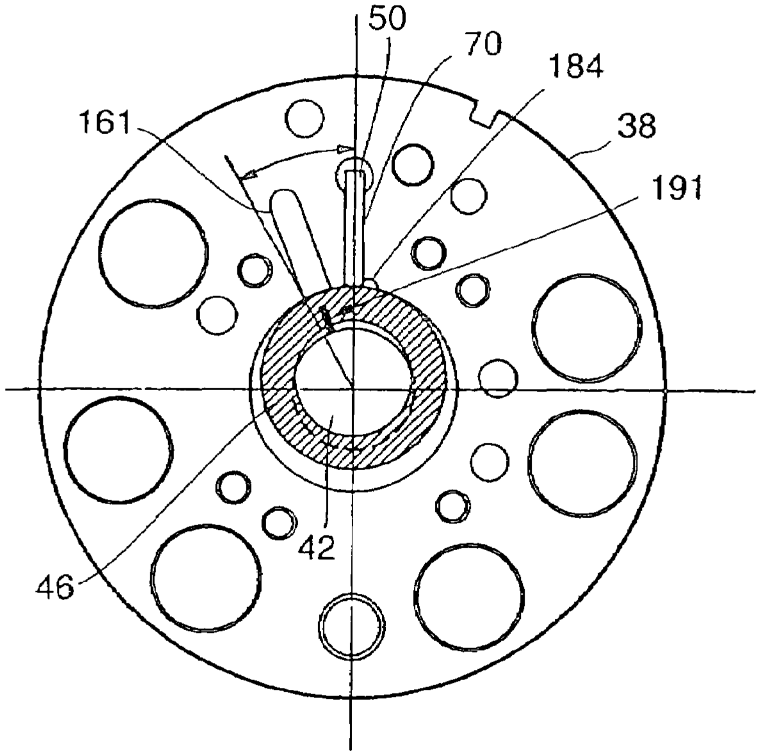
FIG. 42 is a plan view showing an upper cylinder 38 of the rotary compressor of FIG. 40.

FIG. 42 is a plan view showing the upper cylinder 38 of the second rotary compression element 34. A housing chamber 80 is formed in the upper cylinder 38, and the vane 50 is housed in this housing chamber 70, and abutted on the roller 46. The discharge port 184 is formed in one side (right side in FIG. 42) of the vane 50, and the suction port 161 is formed on the other side (left side) as an opposite side sandwiching the vane 50. Then, the vane 50 divides a compression chamber formed between the upper cylinder 38 and the roller 46 into low and high pressure chamber sides LR and HR. The suction port 161 corresponds to the low pressure chamber LR, and the discharge port 184 to the high pressure chamber HR.

Figure 41:
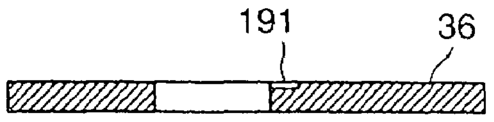
FIG. 41 is a sectional view showing an intermediate diaphragm of the rotary compressor of FIG. 40.

On the other hand, the intermediate diaphragm 36 for sealing the lower opening surface of he upper cylinder 38 and the upper opening surface of the lower cylinder 40 is roughly formed in a doughnut shape. On the upper surface thereof (surface on the upper cylinder 38 side), an oil supply groove 191 is formed in a radial direction in a predetermined range from an inner surface side to the outside as shown in FIG. 41. This oil supply groove 191 is formed so as to correspond to a lower side in a range $\alpha$ from a position of an abutment of the vane 50 of the upper cylinder 38 on the roller 46 to an end of the suction port 161 opposite the vane 50. An outer portion of the oil supply groove 191 is communicated with the low pressure chamber LR side (suction side) in the upper cylinder 38.

On the other hand, in the rotary shaft 16, an oil hole 80 of a vertical direction around an axis, and horizontal oil supply holes 82 and 84 (also formed in the upper and lower eccentric portions 42 and 44) communicated with the oil hole 80 are formed. An opening of the inner peripheral surface side of the oil supply groove 191 of the intermediate diaphragm 36 is communicated through the oil supply holes 82 and 84 with the oil hole 80. Accordingly, the oil supply groove 191 communicates the oil hole 80 with the low pressure chamber LR in the upper cylinder 38.

Since intermediate pressure is set in the hermetically sealed container 12 as described later, supplying of oil into the upper cylinder 38 set to high pressure at a 2nd stage. However, because of the formation of the oil supply groove 191 related to the intermediate diaphragm 36, oil scooped up from the oil reservoir in the bottom of hermetically sealed container 12 to rise through the oil hole 80, and discharged from the oil supply holes 82 and 84 enters the oil supply groove 191 of the intermediate diaphragm 36, and after the groove it is supplied to the low pressure chamber LR side (suction side) of the upper cylinder 38.

Figure 43:
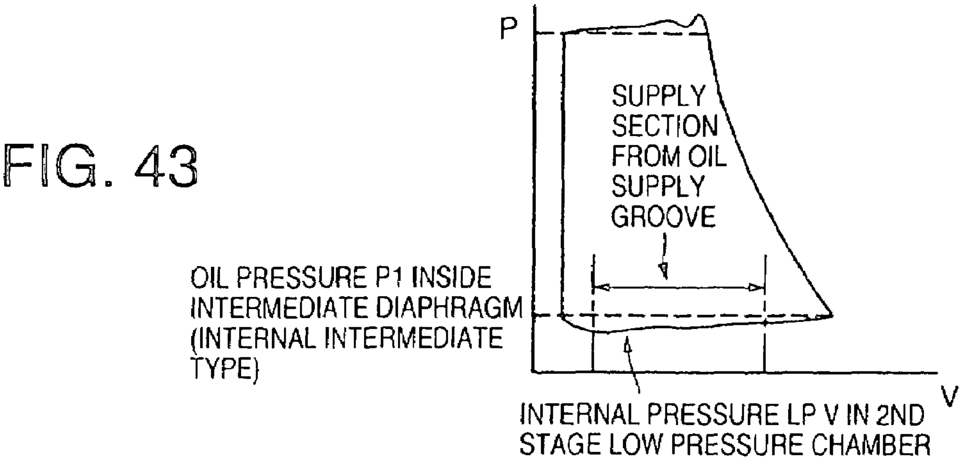
FIG. 43 is a view showing pressure fluctuation in the upper cylinder of the rotary compressor of FIG. 40.
Figures 44A, 44B, 44C, 44D, 44E, 44F, 44G, 44H, 44I, 44J, 44K, 44L:
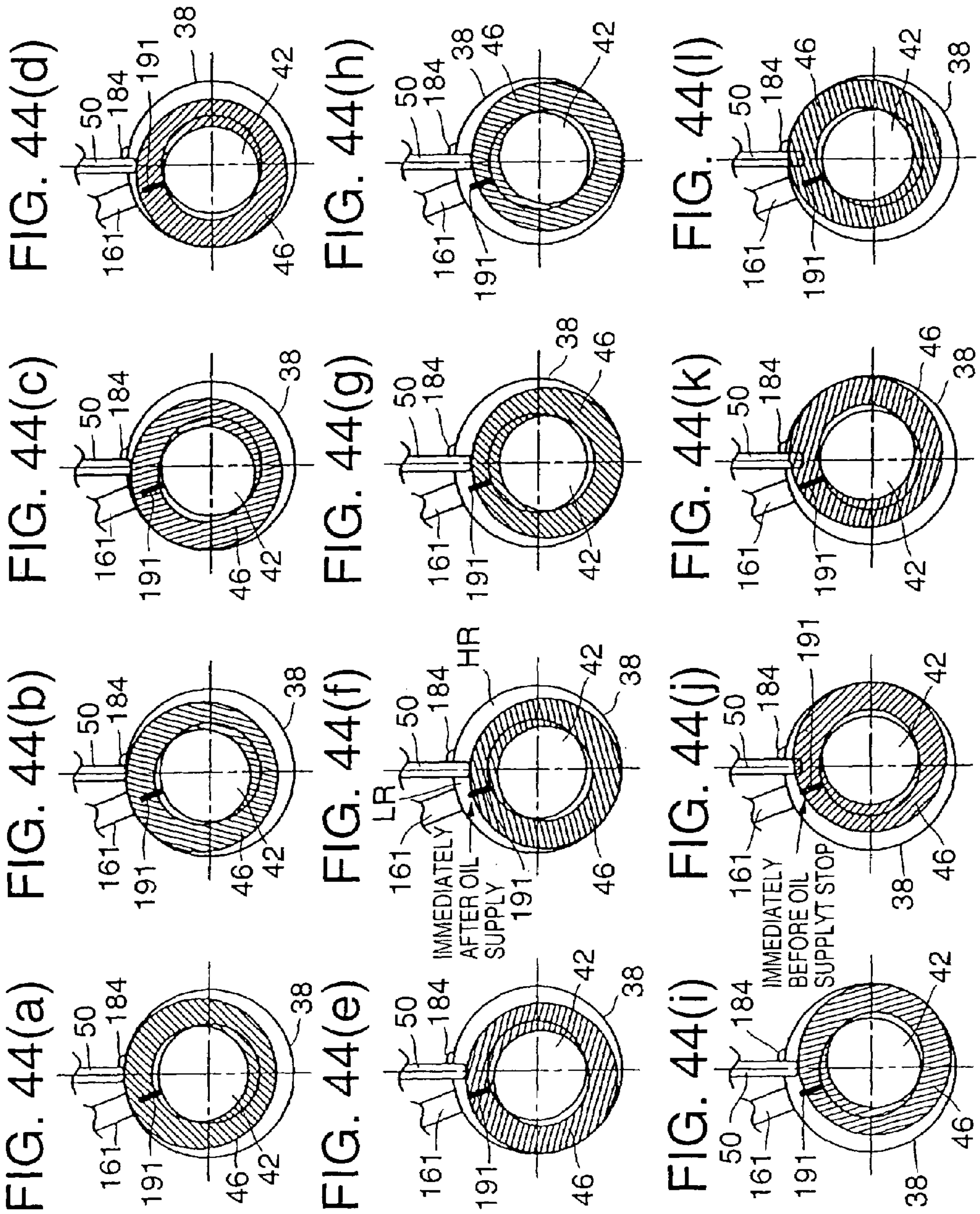
FIGS. 44(*a*) to 44(*l*) are views, each illustrating a suction-compression process of a refrigerant of the upper cylinder of the rotary compressor of FIG. 40.

FIG. 43 shows pressure fluctuation in the upper cylinder 38, in which a reference numeral P1 denotes pressure of an inner peripheral surface side of the intermediate diaphragm 36. As indicated by LP in the drawing, internal pressure (suction pressure) of the low pressure chamber LR of the upper cylinder 38 is lower than pressure P1 of the inner peripheral surface side of the intermediate diaphragm 36 in a suction process because of a suction loss. In this period, oil is injected from the oil hole 80 of the rotary shaft 16 through the oil supply groove 191 of the intermediate diaphragm 36 into the low pressure chamber LR in the upper cylinder 38, thereby supplying oil.

Here, FIGS. 44(*a*) to 44(*l*) are views illustrating a suction-compression process of a refrigerant in the upper cylinder 38 of the second rotary compression element 34. Assuming that the eccentric portion 42 of the rotary shaft 16 is rotated counterclockwise in each drawing, the suction port 161 is closed by the roller 46 in FIGS. 44(*a*) and 44(*b*). In FIG. 44(*c*), the suction port 161 is opened to start suction of a refrigerant (refrigerant is discharged on the opposite side). Then, the refrigerant suction is continued from FIG. 44(*c*) to FIG. 44(*e*). In this process, the oil supply groove 191 is closed by the roller 46.

Then, in FIG. 44(*f*), the oil supply groove 191 emerges below the roller 46 for the first time, and oil is sucked into the low pressure chamber LR surrounded with the vane 50 and the roller 46 in the upper cylinder 38 to start oil supplying (starting of supply process of FIG. 43). Thereafter, oil suction of the sucked refrigerant is carried out from FIG. 44(*g*) to FIG. 44(*i*). Then, in FIG. 44(*j*), oil is supplied until the upper side of the oil supply groove 191 is sealed with the roller 46, and the oil supplying is stopped (end of supply process of FIG. 43). Thereafter, from FIG. 44(*k*) to FIGS. 44(*l*), 44(*a*) and 44(*b*), the refrigerant suction is carried out, then compressed, and discharged from the discharge port 184.

A connecting portion 90 for interconnecting the upper and lower eccentric portions 42 and 44 formed integrally with the rotary shaft 16 to have a phase difference of 180° is formed in a so-called noncircular rugby ball shape in section, in order to set a sectional area of a section shape larger than a circular area of the rotary shaft 16 to provide rigidity. That is, in the sectional shape of the connecting portion 90, a thickness is larger in a direction orthogonal to an eccentric direction of the upper and lower eccentric portions 42 and 44 than that in the eccentric direction of the upper and lower eccentric portions 42 and 44 provided in the rotary shaft 16.

Thus, a sectional area of the connecting portion 90 for interconnecting the upper and lower eccentric portions 42 and 44 provided integrally with the rotary shaft 16 is enlarged, sectional secondary moment is increased to enhance strength (rigidity), and durability and reliability are enhanced. Especially, if a refrigerant of high use pressure is compressed at two stages, a load applied to the rotary shaft 16 is large because of a large difference between high pressure and low pressure. However, since the sectional area of the connecting portion 90 is enlarged to increase its strength (rigidity), it is possible to prevent elastic deformation of the rotary shaft 16.

In this case, as a refrigerant, the carbon dioxide ($CO_2$) as an example of carbon dioxide gas of a natural refrigerant is used, which is kind to global environment, considering combustibility, toxicity or the like. As lubrication oil, existing oil such as mineral oil, alkylbenzene oil, ether oil, or ester oil is used.

On a side face of the container main body 12A of the hermetically sealed container 12, sleeves 141, 142, 143 and 144 are welded to positions corresponding to the suction passages 58 and 60 of the upper and lower support members 54 and 56, and upper sides (positions roughly corresponding to the lower end of the electric element 14) of the discharge muffler chamber 62 and the upper cover 66. The sleeves 141 and 142 are adjacent to each other in upper and lower sides, and the sleeve 143 is roughly on a diagonal line to the sleeve 141. The sleeve 144 is in a position shifted by about 90° from the sleeve 141.

In the sleeve 141, one end of a refrigerant introduction tube 92 for introducing refrigerant gas to the upper cylinder 38 is inserted and connected. One end of the refrigerant introduction tube 92 is communicated with the suction passage 58 of the upper cylinder 38. The refrigerant introduction tube 92 is passed on the upper side of the hermetically sealed container 12 to reach the sleeve 144, and the other end is inserted and connected to the sleeve 144, and communicated with the inside of the hermetically sealed container 12.

In the sleeve 142, one end of a refrigerant introduction tube 94 for introducing refrigerant gas to the lower cylinder 40 is inserted and connected. One end of the refrigerant introduction tube 94 is communicated with the suction passage 60 of the lower cylinder 40. A refrigerant discharge tube 96 is inserted and connected to the sleeve 143, and one end of this refrigerant discharge tube 96 is communicated with the discharge muffler chamber 62.

The rotary compressor 10 of the embodiment is also used for the refrigerant circuit of the water heater 153 shown in FIG. 18, and similarly connected through piping. Now, description is made of an operation in the foregoing constitution. It is assumed that the solenoid valve 159 is closed in running by heating. When power is supplied to the stator coil 28 of the electric element 14 through a terminal 20 and a not-shown wire, the electric element 14 is actuated to rotate the rotor 24. This rotation causes the upper and lower rollers 46 and 48 engaged with the upper and lower eccentric portions 42 and 44 provided integrally with the rotary shaft 16 to be eccentrically rotated in the upper and lower cylinders 38 and 40 as described above.

Accordingly, lower pressure (1st stage suction pressure LP: 4 MPaG) refrigerant gas sucked from the suction port 162 through the refrigerant introduction tube 94 and the suction passage 60 formed in the lower support member 56 to the low pressure chamber side of the lower cylinder 40 is compressed to intermediate pressure (MP1: 8 MPaG) by operations of the roller 48 and the vane. Then, it is passed from the high pressure chamber side of the lower cylinder 40, then passed from the discharge muffler chamber 64 formed in the lower support member 56 through the communication passage 63, and discharged from an intermediate discharge tube 121 into the hermetically sealed container 12.

At this time, the intermediate discharge tube 121 is directed corresponding to a gap between the adjacent stator coils 28 and 28 wound on the stator 22 of the upper electric element 14. Accordingly, refrigerant gas still relatively low in temperature can be actively supplied toward the electric element 14, suppressing a temperature increase of the electric element 14. Therefore, intermediate pressure (MP1) is set in the hermetically sealed container 12.

The refrigerant gas of intermediate pressure in the hermetically sealed container 12 is passed out from the upper sleeve 144 (intermediate discharge pressure is MP1) into the refrigerant introduction tube 92, then through the refrigerant introduction tube 92 outside the hermetically sealed container 12 into the suction passage 58 formed in the upper support member 54. Then, after the suction passage 58, it is sucked from the suction port 161 to the low pressure chamber LR side of the upper cylinder 38 (2nd stage suction pressure MP2). The sucked refrigerant gas of intermediate pressure is subjected to 2nd stage compression by operations of the roller 46 and the vane 50 similar to that described above with reference to FIG. 5 to become refrigerant gas of high temperature and high pressure (2nd stage discharge pressure HP: 12 MPaG), passed from the high pressure chamber HR side through the discharge port 184, the discharge muffler chamber 62 formed in the upper support member 54, and the refrigerant discharge tube 96 into the gas cooler 154. At this time, a refrigerant temperature has been increased to about +100° C., heat is radiated from the refrigerant gas of high temperature and high pressure, and water in the hot water tank is heated to generate hot water of about +90° C.

On the other hand, the refrigerant itself is cooled at the gas cooler 154, and discharged from the gas cooler 154. Then, after pressure reduction at the expansion valve 156, the refrigerant flows into the evaporator 157 to evaporate, and sucked from the refrigerant introduction tube 94 into the first rotary compression element 32. This cycle is repeated.

According to the foregoing constitution, the rotary compressor comprises the electric element, the first and second rotary compression elements driven by the electric element, these components being provided in a hermetically sealed container, gas compressed by the first rotary compression element being discharged into the hermetically sealed container, and the discharged gas of intermediate pressure being further compressed by the second rotary compression element, the first and second cylinders constituting the respective rotary compression elements, the intermediate diaphragm provided between the cylinders to partition each rotary compression element, the support member adapted to seal the opening surface of each cylinder, and provided with the bearing of the rotary shaft, and the oil hole formed in the rotary shaft. The intermediate diaphragm includes the oil supply path formed on the surface of the second cylinder side to communicate the oil hole with the lower pressure chamber in the second cylinder. Thus, even in a state where pressure in the cylinder of the second rotary compression element is higher than intermediate pressure in the hermetically sealed container, by using a suction pressure loss in a suction process in the second rotary compression element, oil can be surely supplied from the oil supply path formed in the intermediate diaphragm into the cylinder.

Therefore, it is possible to secure performance and enhance reliability by assuring lubrication of the second rotary compression element. Especially, since the oil supply groove can be formed only by processing a groove on the surface of the second cylinder of the intermediate diaphragm, it is possible to simplify a structure, and suppress an increase in production costs.

The present invention is not limited to the rotary compressor of the internal intermediate multistage compression type of the embodiment as a rotary compressor. It is useful to a single cylinder rotary compressor. Further, in the embodiment, the rotary compressor 10 was used for the refrigerant circuit of the water heater 153. However, the invention is not limited to this, and it can be used for a room heater.

Other than the rotary compressor, the present invention can be applied to compressors other types (reciprocal, scroll and other types).

Next, description is made of another invention with reference to FIGS. 45 to 48. In this case, the invention is directed to a refrigeration unit using carbon dioxide as a refrigerant.

Figure 48:
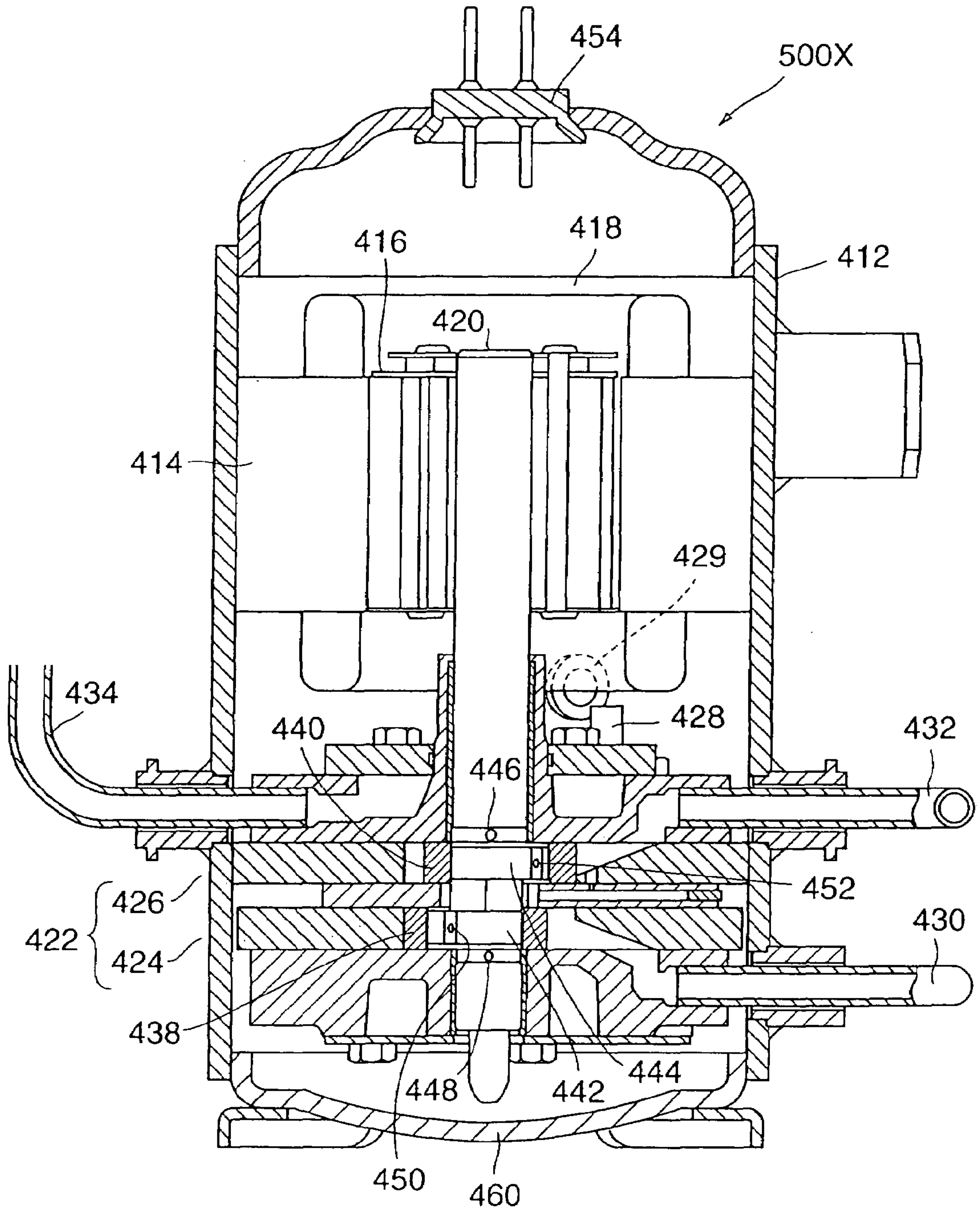
FIG. 48 is an explanatory view showing constitution of a compressor used in a conventional refrigeration unit.

As a refrigerant compressor of the refrigeration unit using the carbon dioxide, for example, a rotary 2-stage compressor (simply compressor, hereinafter) 500X of an internal intermediate pressure type shown in FIG. 48 is well known. This compressor 500X comprises an electric mechanism unit 418 including a stator 14, a rotor 416 and the like in an upper side in a hermetically sealed container 412, and a rotary compression mechanism unit 422 of a two-stage type connected through a rotary shaft 420 of the rotor 416 of the electric mechanism unit 418 in a lower side.

In the 2-stage rotary compression mechanism unit 422 of the compressor 500X, a first compression mechanism unit 424 is arranged in a lower side, and a second compression mechanism unit 426 is arranged in an upper side. Gas introduced from a not-shown accumulator through a refrigerant introduction tube 430 compresses a refrigerant at the first compression mechanism unit 424 of the lower state side. The compressed refrigerant is discharged through an intermediate discharge tube 428 into the hermetically sealed container 412, and introduced through a refrigerant introduction tube 432 extended from a sleeve 429 provided in an intermediate discharge hole bored in a body of the hermetically sealed container 412 into the second compression mechanism unit 426 of the second stage. It is further compressed to high pressure, and the high pressure refrigerant is supplied through the refrigerant discharge tube 434 to a refrigerant circuit of a not-shown air conditioner.

Then, in the compressor 500X, refrigerator oil 460 is reserved on a bottom side in the hermetically sealed container 412. By scooping up the refrigerator oil 460, lubrication and airtightness of a sliding portion of the rotary compression mechanism unit 422 are improved.

For example, refrigerator oil 460 is scooped up by a pump mechanism provided on the lower end of the rotary shaft 420, raised through a hollow portion of the rotary shaft 420, and then discharged from a main body portion of the rotary shaft 420, and oil supply holes 446, 448, 450 and 452 provided on outer peripheral parts of eccentric portions 442 and 444 for fixing the rollers 438 and 440. By this refrigerator oil 460, lubrication or the like of the sliding portion is carried out.

Since the above-described compressor 500X has a structure where the refrigerator oil 460 is reserved in the hermetically sealed container 412, it is difficult to miniaturize the compressor. Thus, in a car air conditioner for compressing a refrigerant by using the compressor 500X having such a structure, a problem has been inherent, i.e., a difficulty of installing the compressor 500A together with an automobile component such as an engine in an automobile hood limited in capacity.

Therefore, it is necessary to provide an air conditioner constructed in such a manner that no refrigerator oil is stored in the compressor, or minimum refrigerator oil is stored, and major part of the refrigerator oil is reserved outside the compressor, which has been a task to be achieved.

Thus, in order to solve the foregoing problem of the conventional art, the present invention provides a refrigeration unit, which comprises a refrigerant closed circuit formed by communicating at least a compressor, a radiator and an evaporator through a refrigerant tube, and filled with carbon dioxide, an oil separator provided in the refrigerant closed circuit, a rotary compressor of a first constitution for connecting an oil storage portion of the oil separator and the compressor to each other through a return oil tube, and a rotary compressor of a second constitution for providing the oil separator in an outlet side refrigerant circuit of a radiator or an outlet side refrigerant circuit of an evaporator.

Hereinafter, detailed description is made of an embodiment of the present invention mainly with reference to FIGS. 45 to 47. For easier understanding, in the drawings, portions having functions similar to those described above with reference to FIG. 18 are denoted by similar reference numerals.

Figure 45:
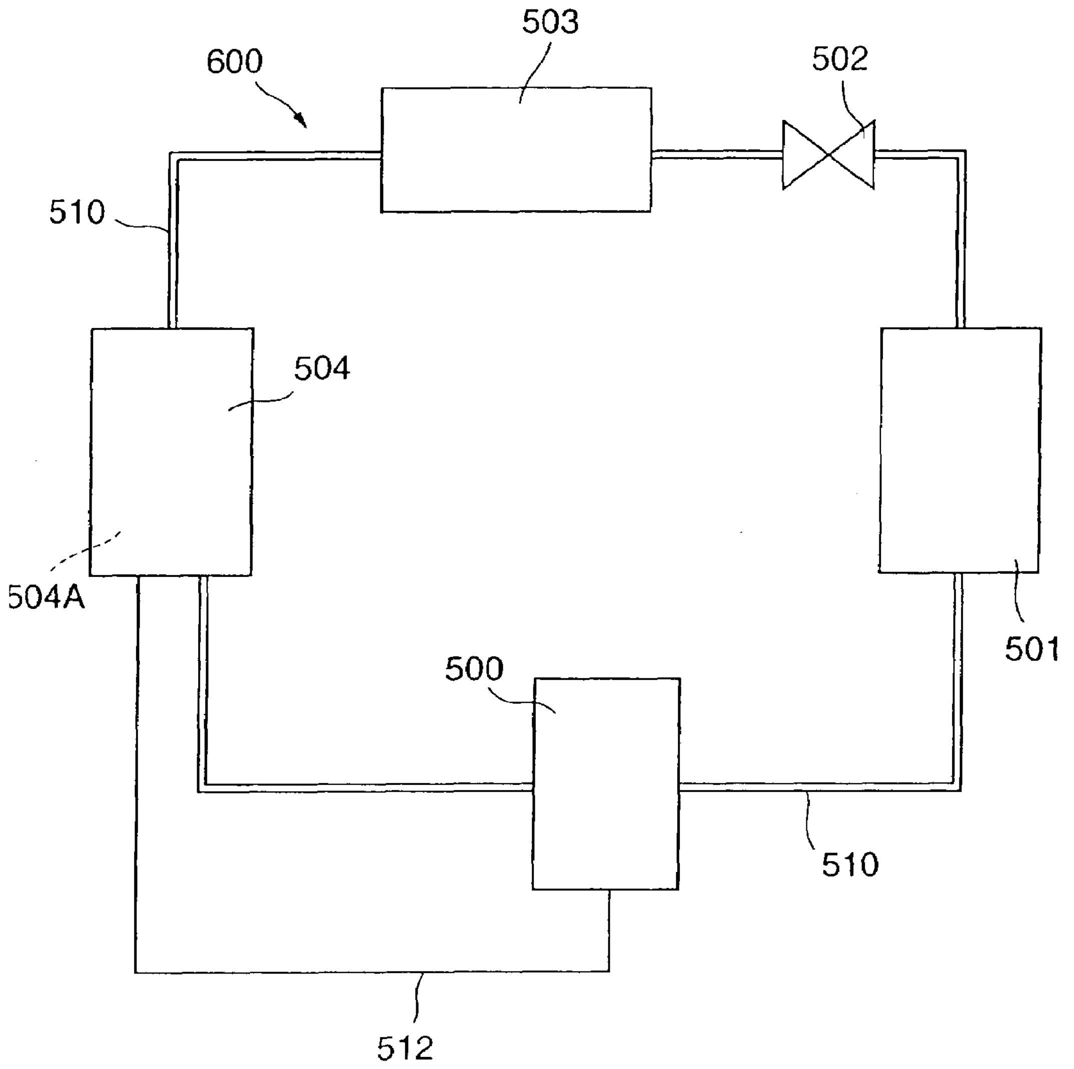
FIG. 45 is an explanatory view showing constitution of a refrigeration unit according to yet another embodiment of the present invention.
Figure 46:
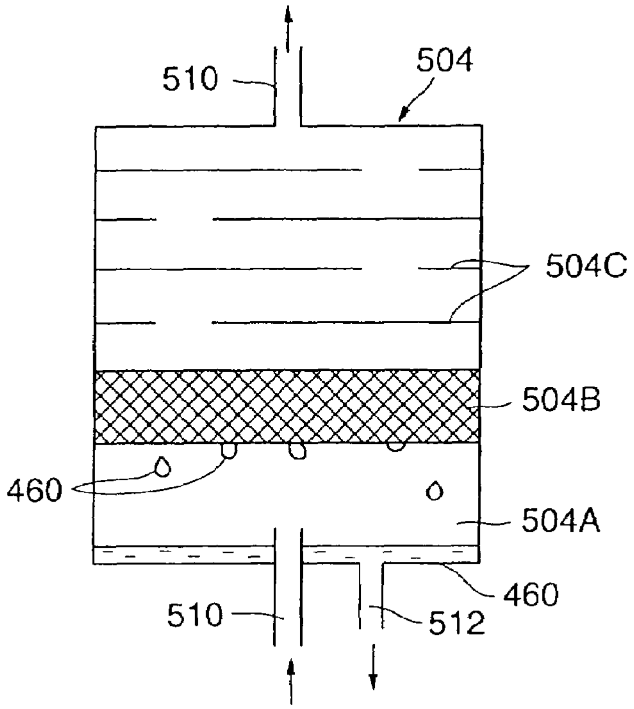
FIG. 46 is an explanatory view showing constitution of an oil separator used in the refrigeration unit of FIG. 45.

In this case, for example as shown in FIG. 45, a refrigeration unit 600 comprises a compressor 500, a radiator 501, an expansion valve 502, an evaporator 503, an oil separator 504, which are connected through a refrigeration tube 510 to form a refrigerant closed circuit. The closed circuit is filled with carbon dioxide as a refrigerant.

An oil storage portion 504A provided on a bottom part of the oil separator 504 is connected to the compressor 500 through a return oil tube 512. That is, as shown in FIG. 46, the oil separator 504 includes the oil storage portion 504A on the bottom side, an oil sticking/separating material 504B on the storage portion 504A, and a plurality of baffle plates 504C further thereon. A refrigerant of gas containing the refrigerator oil 460, which has entered the unit from the refrigerant tube 510 connected to the bottom plate, is passed through the oil sticking/separating material 504B, further through gaps among the baffle plates 504C, and then discharged from the refrigerant tube 510 connected to a top board.

The oil sticking/separating material 504B is made of a laminate of woven metal wires of small meshes, one having gaps such as wire wool, or the like. When the refrigerant of gas containing refrigerator oil 460 is passed through the gaps of the oil sticking/separating material 504B, the refrigerant of gas is directly discharged from the refrigerant tube 510 connected to the top board. However, the refrigerator oil 460 of a large density clashes on the oil sticking/separating material 504B to be gradually reduced in speed, and lastly stuck to the oil sticking/separating material 504B to stay there.

In this case, since the plurality of baffle plates 504C are provided on the oil sticking/separating material 504B, flow velocities of the refrigerant supplied into the lower side of the oil separator 504, and discharged from the upper side, and the refrigerator oil 460 are reduced, further increasing a separating operation effect of the oil sticking/separating material 504B for separating the refrigerator oil from the refrigerant.

When the amount of the refrigerator oil 460 stuck to the oil sticking/separating material 504B to stay there is increased, thus increasing a mass, the refrigerator oil 460 drops from the oil sticking/separating material 504B, and stays in the oil reservoir 504A on the bottom. Since the return oil tube 512 is connected to the bottom plate of the oil separator 504, the refrigerator oil 460 that has dropped from the oil sticking/separating material 504B, and stayed in the oil reservoir 504A is returned passed through the return oil tube 512 to the compressor 500.

Figure 47:
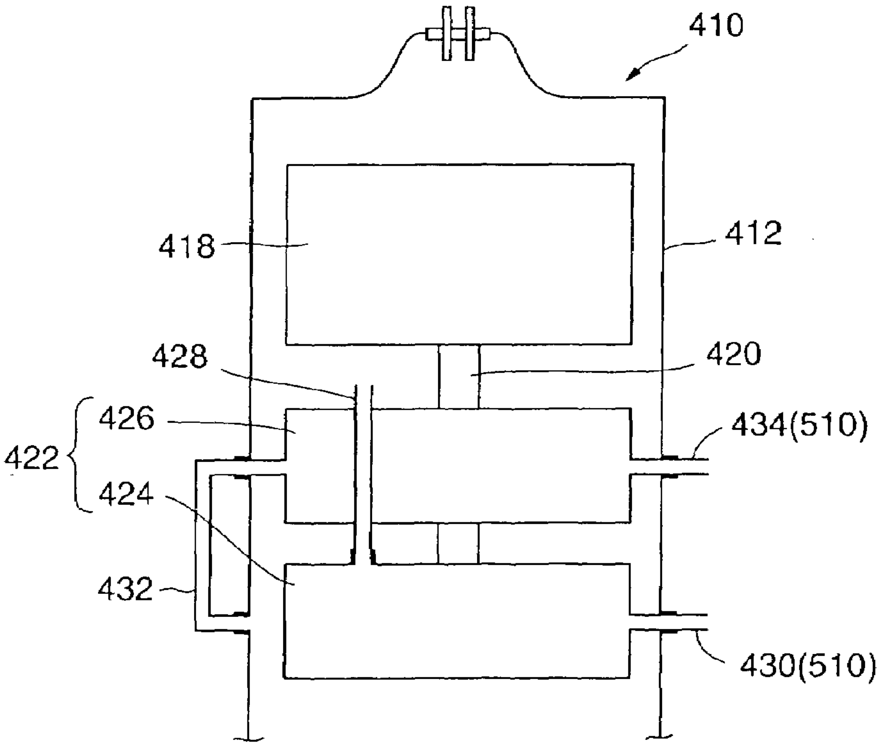
FIG. 47 is an explanatory view showing constitution of a compressor used in the refrigeration unit of FIG. 45.

On the other hand, the compressor 500 is constructed in a manner shown in, for example FIG. 47. That is, the compressor 500 has a structure where no refrigerator oil 460 is stored inside. A tail end of the return oil tube 512 is connected to the lower end of a hollow rotary shaft 420 constructed as in the case of the compressor 50OX shown in FIG. 48. The refrigerator oil 460 returned from the oil separator 504 through thee return oil tube 512 is discharged from a not-shown oil supply hole, and supplied to each sliding portion of the rotary compression mechanism unit 422, thereby improving lubrication and airtightness thereof.

That is, in the compressor 500 of the constitution shown in FIG. 47, since it is not necessary to store the refrigerator oil 460 inside, the hermetically sealed container 412 incorporating the electric element 418 and the rotary compression mechanism unit 422 can be made smaller than the conventional compressor 500C storing the refrigerator oil 460 in the hermetically sealed container 412.

Next, description is made of an operation of the refrigeration unit 600 shown in FIG. 45. When power is supplied to a not-shown stator coil of the electric element 418 through a power terminal 454 and a not-shown wire of the compressor 500, the electric mechanism unit 418 is actuated to rotate its not-shown rotor. This rotation causes a not-shown roller engaged with an eccentric portion provided integrally with the rotary shaft 420 to be eccentrically rotated in the cylinder (see FIG. 47).

Accordingly, lower pressure refrigerant gas sucked through the refrigerant introduction tube 430 (refrigerant tube 510) is compressed to intermediate pressure by the lower first compression mechanism unit 424. Then, it is discharged from an intermediate discharge tube 428 into the hermetically sealed container 412 in a state of containing a very small amount of fog refrigerator oil 460.

At this time, the intermediate discharge tube 428 is directed corresponding to a gap between the adjacent stator coils wound on the stator of, for example the upper electric mechanism unit 418. Refrigerant gas still relatively low in temperature is actively supplied toward the electric mechanism unit 418, suppressing a temperature increase of the electric mechanism unit 418. Therefore, intermediate pressure is set in the hermetically sealed container 412.

The refrigerant gas of intermediate pressure containing the small amount of fog refrigerant oil 460 in the hermetically sealed container 412 is passed through the refrigerant introduction tube 432, and compressed by the upper second compression mechanism unit 426 to become high-temperature and high-pressure refrigerant gas containing the fog refrigerator oil 460, and then flows through the refrigerant discharge tube 434 (refrigerant tube 510) into the radiator 501. At this time, a refrigerant temperature has been increased to about +100° C., heat is radiated from the refrigerant gas of high temperature and high pressure containing the refrigerator oil 460, setting a super critical state containing the refrigerator oil 460, and the refrigerant gas goes out from the radiator 501.

Then, after pressure reduction at the expansion valve 502, the refrigerant flows into the evaporator 503 to evaporate. By heat of evaporation that the refrigerant captures from around during evaporation at the evaporator 503, if the refrigeration unit 600 is used for a car cooler, air in the car is cooled to carry out air conditioning. At the evaporator 503, low boiling point carbon dioxide of the refrigerant is selectively evaporated, while almost no evaporation occurs in the refrigerator oil having a boiling point higher than that of the refrigerant.

The refrigerant steam evaporated at the evaporator 503, and the refrigerator oil 460 flow into the oil separator 504, where the refrigerator oil 460 is separated from the refrigerant by the above-described mechanism. The refrigerant of gas, from which the refrigerator oil 460 was separated at the oil separator 414, repeats a cycle of being sucked from the refrigerant introduction tube 430 (refrigerant tube 510) into the first compression mechanism 424. The refrigerator oil 460 of liquid separated from the refrigerant at the oil separator 414 repeats a cycle of being returned through the return oil tube 512 to the compressor 500.

The oil separator 504 can be installed at an outlet side of the radiator 501. That is, the carbon dioxide of the refrigerant that radiated heat at the radiator 504 is in a super critical state, not becoming complete liquid. On the other hand, since the refrigerator oil 460 has become complete liquid, even if the oil separator 504 is installed at the outlet side of the radiator 501, separation can be made into the refrigerant of gas and the refrigerator oil 460 of liquid by the foregoing mechanism, and the separated refrigerator oil 460 can be returned to the compressor 500.

The compressor 500 may be a compressor where the rotary compression mechanism unit 422 is a one-cylinder type, or a compressor where high-pressure refrigerant steam compressed by the compression mechanism unit is injected into the hermetically sealed container 412, and the high-pressure refrigerant injected into the hermetically sealed container 412 is discharged through a refrigerant discharge tube provided in the upper side of the hermetically sealed container 1 to the outside of the unit.

As described above, the refrigeration unit comprises the refrigerant closed circuit formed by communicating at least the compressor, the radiator and the evaporator through the refrigerant tube, and filled with carbon dioxide, the oil separator provided in the refrigerant closed circuit, the rotary compressor of a first constitution for connecting the oil storage portion of the oil separator and the compressor to each other through the return oil tube, and the rotary compressor of a second constitution for providing the oil separator in the outlet side refrigerant circuit of the radiator or the outlet side refrigerant circuit of the evaporator. Accordingly, it is not necessary to reserve any refrigerator oil in the compressor. Thus, the hermetically sealed container for housing the compression mechanism unit and the electric mechanism unit can be made smaller in size than the compressor storing refrigerator oil inside, making it possible to miniaturize the compressor. Therefore, when the compressor is used fro the car air conditioner, the compressor can be easily installed together with an automobile component such as an engine in an automobile hood limited in capacity.

What is claimed is:

1. A hermetically sealed compressor comprising:

an electric element, and a compression element driven by the electric element, both components being provided in a hermetically sealed container, a $CO_2$ refrigerant sucked from a refrigerant introduction tube into the hermetically sealed container being compressed by the compression element when connected to a refrigerant discharge tube, and then discharged outside from the refrigerant discharge tube;

at least one sleeve provided in the hermetically sealed container, to which the refrigerant introduction tube and/or the refrigerant discharge tube are connectable;

a flange formed round an outer surface of the sleeve to engage a coupler for tube connection; and an airtightness-test pipe, connected to the sleeve and conveying compressed air for an airtightness test of the sealed compressor;

wherein the compressed air is of about 10 MPa.

2. The hermetically sealed compressor according to claim 1, wherein the sleeve comprises an internal bore and wherein the refrigerant introduction tube and/or the refrigerant discharge tube is insertable into the bore end hermetically connectable to the sleeve.

3. A hermetically sealed compressor comprising:

an electric element, and a compression element driven by the electric element, both components being provided in a hermetically sealed container, a $CO_2$ refrigerant sucked from a refrigerant introduction tube into the hermetically sealed container being compressed by the compression element when connected to a refrigerant discharge tube, and then discharged outside from the refrigerant discharge tube;

at least one sleeve provided in the hermetically sealed container, to which the refrigerant introduction tube and/or the refrigerant discharge tube are connectable;

a screw groove formed for pipe connection around an outer surface of the sleeve; and an airtightness-test pipe, connected to the sleeve and conveying compressed air for an airtightness test of the sealed compressor;

wherein the compressed air is of about 10 MPa.

4. The hermetically sealed compressor according to claim 3, wherein the sleeve comprises an internal bore and wherein the refrigerant introduction tube and/or the refrigerant discharge tube is insertable into the bore and hermetically connectable to the sleeve.

5. A hermetically sealed compressor comprising:

an electric element, and a compression element driven by the electric element, both components being provided in a hermetically sealed container, a $CO_2$ refrigerant sucked from a refrigerant introduction tube into the hermetically sealed container being compressed by the compression element when connected to a refrigerant discharge tube, and then discharged outside from the refrigerant discharge tube;

a plurality of sleeves provided in the hermetically sealed container, to which the refrigerant introduction tube and the refrigerant discharge tube are connectable;

a flange formed around an outer surface of one of adjacent sleeves to engage a coupler for tube connection;

a screw groove formed for pipe connection around an outer surface of the other sleeve; and at least one airtightness-test pipe, connected to at least one of the sleeves and conveying compressed air for an airtightness test of the sealed compressor;

wherein the compressed air is of about 10 MPa.

6. The hermetically sealed compressor according to claim 5, wherein the sleeves comprise internal bores and wherein the refrigerant introduction tube and the refrigerant discharge tube are insertable into the bores and hermetically connectable to a respective sleeve.

* * * * *